(12) United States Patent
Chen et al.

(10) Patent No.: US 9,253,511 B2
(45) Date of Patent: Feb. 2, 2016

(54) SYSTEMS AND METHODS FOR PERFORMING MULTI-MODAL VIDEO DATASTREAM SEGMENTATION

(71) Applicants: David Mo Chen, Mountain View, CA (US); Huizhong Chen, Stanford, CA (US); Maryam Daneshi, Menlo Park, CA (US); Andre Filgueiras de Araujo, Stanford, CA (US); Bernd Girod, Stanford, CA (US); Shanghsuan Tsai, Palo Alto, CA (US); Peter Vajda, Menlo Park, CA (US); Matthew Chuck-Jun Yu, Stanford, CA (US)

(72) Inventors: David Mo Chen, Mountain View, CA (US); Huizhong Chen, Stanford, CA (US); Maryam Daneshi, Menlo Park, CA (US); Andre Filgueiras de Araujo, Stanford, CA (US); Bernd Girod, Stanford, CA (US); Shanghsuan Tsai, Palo Alto, CA (US); Peter Vajda, Menlo Park, CA (US); Matthew Chuck-Jun Yu, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 14/325,202

(22) Filed: Jul. 7, 2014

(65) Prior Publication Data

US 2015/0296228 A1    Oct. 15, 2015

Related U.S. Application Data

(60) Provisional application No. 61/978,988, filed on Apr. 14, 2014.

(51) Int. Cl.
*H04N 21/234* (2011.01)
*H04N 21/222* (2011.01)
*H04N 21/233* (2011.01)

(Continued)

(52) U.S. Cl.
CPC ...... *H04N 21/23418* (2013.01); *G06K 9/00718* (2013.01); *H04N 21/222* (2013.01); *H04N 21/233* (2013.01); *H04N 21/23424* (2013.01); *H04N 21/2668* (2013.01); *H04N 21/8126* (2013.01); *H04N 21/8455* (2013.01)

(58) Field of Classification Search
USPC .............................. 725/34, 35, 40
See application file for complete search history.

(56) References Cited

U.S. PATENT DOCUMENTS

| 7,403,910 B1 | 7/2008 | Hastings et al. |
| 7,853,622 B1 | 12/2010 | Baluja et al. |

(Continued)

OTHER PUBLICATIONS

"About Newsy", Newsy, retrieved from: www.newsy.com/about/, retrieved on Dec. 16, 2013, 2 pages.

(Continued)

*Primary Examiner* — Kieu Oanh T Bui
(74) *Attorney, Agent, or Firm* — KPPB LLP

(57) ABSTRACT

Systems and methods are described that can provide users with personalized video content feeds. In several embodiments, a multi-modal segmentation process is utilized that relies upon cues derived from video, audio and/or text data present in a video data stream. In a number of embodiments, video streams from a variety of sources are segmented. Links are identified between video segments and between video segments and online articles containing additional information relevant to the video segments. The additional information obtained by linking a video segment to an additional source of data can be utilized in the generation of personalized playlists. In the context of news programming, the dynamic mixing and aggregation of news videos from multiple sources can greatly enrich the news watching experience. In several embodiments, processes for linking video segments to additional sources of data can be implemented as part of a video search engine service.

20 Claims, 33 Drawing Sheets

(51) Int. Cl.
*H04N 21/845* (2011.01)
*H04N 21/2668* (2011.01)
*H04N 21/81* (2011.01)
*G06K 9/00* (2006.01)

(56) References Cited

U.S. PATENT DOCUMENTS

| | | | |
|---|---|---|---|
| 8,250,070 | B1 | 8/2012 | He et al. |
| 8,265,996 | B2 | 9/2012 | Steelberg et al. |
| 8,402,482 | B2 | 3/2013 | Woodward et al. |
| 8,484,203 | B1 | 7/2013 | Clancy et al. |
| 2010/0186041 | A1 | 7/2010 | Chu et al. |
| 2012/0096487 | A1 | 4/2012 | Wei et al. |
| 2012/0096488 | A1 | 4/2012 | Wei et al. |
| 2012/0143871 | A1 | 6/2012 | Liebald et al. |
| 2012/0143911 | A1 | 6/2012 | Liebald et al. |
| 2012/0143996 | A1 | 6/2012 | Liebald et al. |
| 2013/0007792 | A1 | 1/2013 | Jeon et al. |
| 2013/0013372 | A1 | 1/2013 | Gomez Uribe et al. |
| 2013/0159243 | A1 | 6/2013 | Wei et al. |
| 2013/0325879 | A1 | 12/2013 | Wei et al. |

OTHER PUBLICATIONS

"How are stories selected and edited?", Newsy, retrieved from: www.newsy.com/stories, retrieved on Dec. 16, 2013, 2 pages.
"Integer programming", Wikipedia, the fee encyclopedia, retrieved from: en.wikipedia.org/wiki/Integer_programming, retrieved on Dec. 16, 2013, last modified on Dec. 10, 2013, 6 pages.
"YouTube Analytics", YouTube, retrieved from www.youtube.com/yt/playbook/yt-analytics.html, retrieved on Jan. 10, 2014, 6 pages.
"YouTube Analytics API", Google Developers, search retrieved from: https://developers.google.com/youtube/analytics/v1/dimsmets/mets, retrieved on Jan. 10, 2014, last updated Sep. 30, 2013, 3 pages.
Alghoniemy et al., "Low Complexity Customized Video Playlist Generation", Emerging Signal Processing Applications (ESPA), 2012 IEEE International Conference on Jan. 12-14, 2012, IEEE, 4 pages.
Amatriain et al., "Netflix Recommendations: Beyond the 5 stars (Part 1)", The Netflix Tech Blog, retrieved from: techblog.netflix.com/2012/04/netflix-recommendations-beyond-5-star.html, retrieved on Jan. 10, 2014, Apr. 6, 2012, 7 pages.
Amatriain et al., "Netflix Recommendations: Beyond the 5 stars (Part 2)", The Netflix Tech Blog, retrieved from: techblog.netflix.com/2012/06/netflix-recommendations-beyond-5-stars.html, retrieved on Jan. 10, 2014, Jun. 20, 2012, 6 pages.
Crook, "Glocal, Local Video News Aggregator, Launches Out of Beta With a Bang", TechCrunch, retrieved from: techcrunch.com/2012/11/16/glocal-local-video-news-aggregator-launches-out-of-beta-with-a-bang/, retrieved on Dec. 16, 2013, Nov. 10, 2012, 7 pages.
Davidson et al., "The YouTube Video Recommendation System", RecSys2010, Sep. 26-30, 2010, Barcelona, Spain, ACM, pp. 293-296.
Fratti, "WatchUp: 'Video Centric News Reader' Relaunches With New Features", Mediabistro, retrieved from: http://www.mediabistro.com/10000words/watchup-launches-new-features_b20557, retrieved on Dec. 16, 2013, Jun. 26, 2013, 4 pages.
Garcia-Molina et al., "Virtual Extension Information Seeking: Convergence of Search, Recommendations, and Advertising", Viewpoints, Communication of the ACM, vol. 54, No. 11, Nov. 2011, DOI:10.1145/2018396.2018423, pp. 121-130.
Hauptmann et al., "Informedia at TRECVID 2013: Analyzing and Searching Broadcast News Video", Carnegie Mellon University, Computer Science Department, paper 984, 2003, 16 pages.
Ljungblad, "Online recommendations at web-scale using matrix factorisation", Thesis, Universitat Politecnica de Catalunya, Barcelong, Spain, Jun. 15, 2012, 57 pages.
Schroeder et al., "7 Online Video Aggregators Reviewed", Mashable.com, Jul. 11, 2007, retrieved from: mashable.com/2007/07/12/online-video-aggregators/, retrieved on Dec. 16, 2013, 15 pages.
Smeaton et al., "TV News Story Segmentation, Personalisation and Recommendation", American Association for Artificial Intelligence, 2003, 6 pages.
Smyth et al., "Personalized Electronic Program Guides for Digital TV", American Associate for Artificial Intelligence, AI Magazine, vol. 22, No. 2, Spring 2001, pp. 89-98.
Xiang, "Hulu's Recommendation System", Hulu, retrieved from: tech.hulu.com/blog/2011/09/19/recommendation-system/, retrieved on Jan. 10, 2014, Sep. 19, 2011, 10 pages.
Yang, "Look Ahead: Turn on the News with Watchup", Editor & Publisher, retrieved from: www.editorandpublisher.com/TopStories/ASection/Look-Ahead--Turn-on-the-News0with-Watchup, retrieved on Dec. 16, 2013, 2 pages.

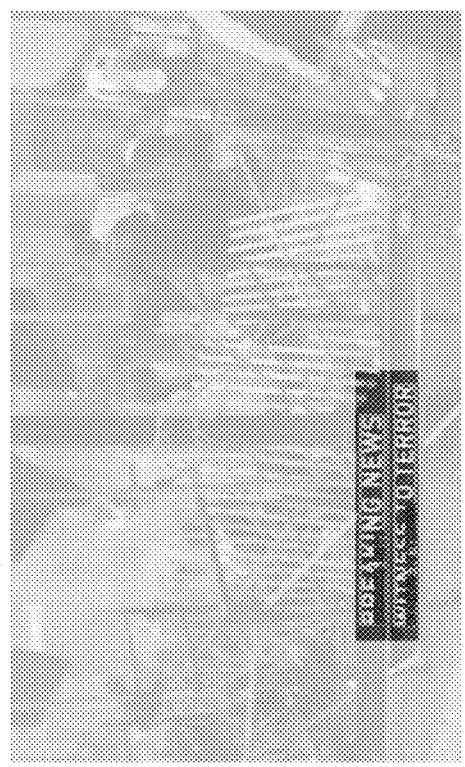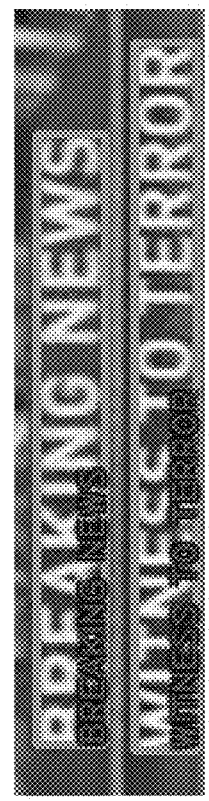
FIG. 13C
FIG. 13D
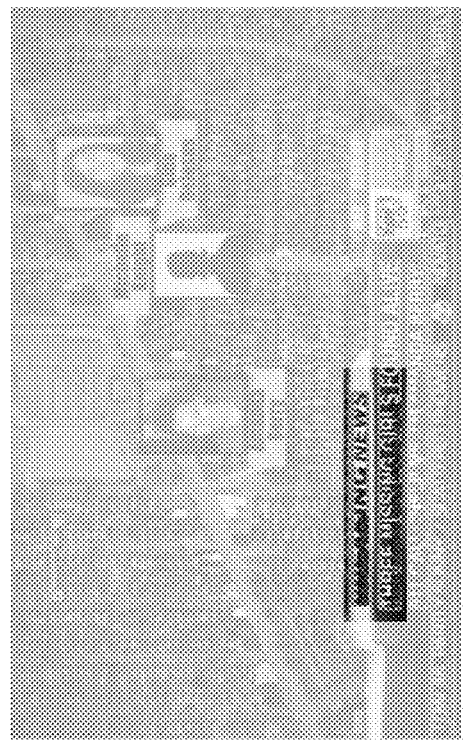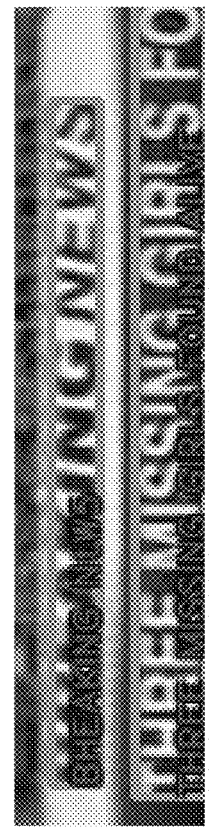
FIG. 13A
FIG. 13B

| actions | time of the action | content id |
|---|---|---|
| playing | 11/28/2012 10:46 | 23628 |
| next_video | 11/28/2012 10:46 | 23629 |
| play | 11/28/2012 10:46 | 23629 |
| overlay_mouseover() | 11/28/2012 10:46 | 23630 |
| overlay_mouseout() | 11/28/2012 10:46 | 23630 |
| overlay_mouseover() | 11/28/2012 10:46 | 23630 |
| play | 11/28/2012 10:46 | 23630 |
| likeclicked | 11/28/2012 10:46 | 23630 |
| show_cc() | 11/28/2012 10:46 | 23630 |
| volumechange | 11/28/2012 10:46 | 23630 |
| setMute() | 11/28/2012 10:46 | 23630 |
| setMute() | 11/28/2012 10:46 | 23630 |
| pause | 11/28/2012 10:46 | 23630 |
| video_order | 11/28/2012 10:46 | 23630 |
| video_order | 11/28/2012 10:46 | 23630 |
| play | 11/28/2012 10:45 | 23634 |
| pause | 11/28/2012 10:17 | 23634 |
| show_cc() | 11/28/2012 10:17 | 23634 |
| play | 11/28/2012 10:16 | 23634 |
| playing | 11/28/2012 10:15 | 23634 |
| playing | 11/28/2012 10:15 | 23627 |
| playing | 11/28/2012 10:15 | 23627 |
| next_video | 11/28/2012 10:15 | 23627 |
| play | 11/28/2012 10:15 | 23627 |
| ended | 11/28/2012 10:15 | 23631 |
| seekPlayback() | 11/28/2012 10:15 | 23631 |

*FIG. 23*

SYSTEMS AND METHODS FOR PERFORMING MULTI-MODAL VIDEO DATASTREAM SEGMENTATION

CROSS-REFERENCE TO RELATED APPLICATIONS

The current application claims priority to U.S. Provisional Patent Application No. 61/978,988, filed Apr. 14, 2014, entitled "Systems and Methods for Generating Personalized Video Playlists", to Chen et al., the disclosure of which is incorporated herein by reference in its entirety.

FIELD OF THE INVENTION

The present invention relates generally to video distribution systems and more specifically to generation of video recommendations based upon user preferences.

BACKGROUND

News aggregation sites such as the Google News service provided by Google, Inc. of Mountain View, Calif. and the Yahoo News service provided by Yahoo, Inc. of Sunnyvale, Calif. have garnered significant attention in recent years. These services provide a user interface via which users can customize the types of news stories they want to read. Furthermore, the sites can progressively learn each user's preferences from their reading history to improve future selections.

A great deal of news information is distributed in the form of video content. Although the term "video content" references video information, the term is typically utilized to encompass a combination of video, audio, and text data. In many instances, video content can also include and/or reference sources of metadata. While video news has traditionally between broadcast over-the-air or transmitted via cable networks, video content is increasingly being distributed via the Internet. Therefore, video news stories can be obtained from a variety of sources.

SUMMARY OF THE INVENTION

Next-generation media consumption is likely to be more personalized, device agnostic, and pooled from many different sources. Systems and methods in accordance with embodiments of the invention can provide users with personalized video content feeds providing the video content that matters most to them. In several embodiments, a multi-modal segmentation process is utilized that relies upon cues derived from video, audio and/or text data present in a video data stream. In a number of embodiments, video streams from a variety of sources are segmented. Links are identified between video segments and between video segments and online articles containing additional information relevant to the video segments. The additional information obtained by linking a video segment to an additional source of data, such as an online article, can be utilized in the generation of personalized video playlists for one or more users. In several embodiments, the personalized video playlists are utilized to playback video segments via a television, personal computer, tablet computer, and/or mobile device such as (but not limited to) a smartphone, or a media player. In many embodiments, viewing histories and user interactions can be utilized to continuously optimize the personalization. In the context of video streams containing news programming, the dynamic mixing and aggregation of news videos from multiple sources can greatly enrich the news watching experience by providing more comprehensive coverage and varying perspectives. In several embodiments, processes for linking video segments to additional sources of data can be implemented as part of a video search engine service that constructs indexes including inverted indexes relating keywords to video segments to facilitate the retrieval of video segments relevant to a search query.

One embodiment includes at least one processor; and memory containing a video segmentation application. In addition, the video segmentation application configures at least one processor to perform a multi-modal segmentation of a video data stream including a sequence of frames of video, at least one audio track time synchronized with the sequence of frames of video, and closed caption textual data by: identifying visual segmentation cues within the sequence of frames of video; identifying audio segmentation cues within the at least one time synchronized audio track; performing automatic speech recognition on an audio track from the at least one audio track to generate audio track textual data that is time synchronized to the sequence of frames of video; identifying textual segmentation cues identified from the closed caption textual data; matching at least a portion of the closed caption textual data with the audio track textual data and time synchronizing the closed caption textual data to the sequence of frames of video data based upon the time synchronization of the matching audio track textual data; fuse the visual segmentation cues, the audio segmentation cues, and the textual segmentation cues to form a stream of segmentation cues time synchronized with the sequence of frames of video; and identify segmentation boundaries between frames of video within the sequence of frames of video using at least one classifier based upon the stream of segmentation cues.

In a further embodiment, at least one of the visual segmentation cues is from the group consisting of anchor frames, logo frames, and dark frames.

In another embodiment, the visual segmentation cues include anchor frames.

In a still further embodiment, the video segmentation application configures the at least one processor to detect anchor frames by: detecting frames in the sequence of frames of video containing a face using a face detector; determining color histograms for the detected faces; clustering the color histograms; and identifying anchor frames as frames that contain a face having a color histogram from within a dominant cluster of color histograms.

In a yet further embodiment, the visual segmentation cues include logo frames.

In yet another embodiment, the video segmentation application configures the at least one processor to detect that a given frame from the sequence of frames of video is a logo frame by performing feature matching between a set of logo images and the given frame.

In a further embodiment again, the video segmentation application configures the at least one processor to detect that a series of frames from the sequence of frames of video is a logo animation by performing feature matching between each of a series of logo animation frames and the corresponding frame in the series of frames.

In another embodiment again, the visual segmentation cues include dark frames.

In a further additional embodiment, the video segmentation application configures the at least one processor to detect that a given frame from the sequence of frames of video is a dark frame by detecting that the mean pixel intensity in at least one color channel of the frame is below a first threshold and the standard deviation of the pixel intensity in the at least one color channel is below a second threshold.

In another additional embodiment, the audio segmentation cues include pauses in speech having a duration exceeding a threshold.

In a still yet further embodiment, the textual segmentation cues include ">>>" markers within the closed caption textual data.

In still yet another embodiment, the textual segmentation cues include the presence of a predetermined transition phrase within the closed caption textual data.

In a still further embodiment again, a plurality of the segmentation cues in the stream of segmentation cues include confidence scores; and the video segmentation application configures the at least one processor to identify segmentation boundaries between frames of video within the sequence of frames of video using at least one classifier based upon the stream of time stamped segmentation cues and the confidence scores.

In still another embodiment again, the at least one classifier is selected from the group consisting of a support vector machine, a neural-network classifier, and a decision tree classifier.

An embodiment of the method of the invention includes: identifying visual segmentation cues within the sequence of frames of video using a video data stream segmentation system; identifying audio segmentation cues within the at least one audio track using the video data stream segmentation system; performing automatic speech recognition on an audio track from the at least one audio track to generate audio track textual data that is time synchronized to the sequence of frames of video using the video data stream segmentation system; identifying textual segmentation cues within the closed caption textual data using the video data stream segmentation system; matching at least a portion of the closed caption textual data with the audio track textual data and time synchronizing the closed caption textual data to the sequence of frames of video data based upon the time synchronization of the matching audio track textual data using the video data stream segmentation system; fusing the visual segmentation cues, the audio segmentation cues, and the textual segmentation cues to form a stream of segmentation cues that is time synchronized with the sequence of frames of video using the video data stream segmentation system; and identifying segmentation boundaries between frames of video within the sequence of frames of video using at least one classifier based upon the stream of segmentation cues using the video data stream segmentation system.

In a further embodiment, at least one of the visual segmentation cues is from the group consisting of anchor frames, logo frames, and dark frames.

In another embodiment, the audio segmentation cues include pauses in speech having a duration exceeding a threshold.

In a still further embodiment, at least one of the textual segmentation cues within the closed caption textual data is from the group consisting of ">>>" markers and a predetermined transition phrase.

In still another embodiment, a plurality of the segmentation cues in the stream of segmentation cues include confidence scores, and identifying segmentation boundaries between frames of video within the sequence of frames of video using at least one classifier based upon the stream of segmentation cues using the video data stream segmentation system includes identifying segmentation boundaries between frames of video within the sequence of frames of video using at least one classifier based upon the stream of time stamped segmentation cues and the confidence scores.

In a yet further embodiment, the at least one classifier is selected from the group consisting of a support vector machine, a neural-network classifier, and a decision tree classifier.

BRIEF DESCRIPTION OF THE DRAWINGS

FIGS. 13A-13D conceptually illustrate extraction of metadata concerning a video segment by detecting and recognizing text contained within frames of the video segment in accordance with embodiments of the invention.

FIG. 23 conceptually illustrates a log file maintained by a playlist generation server based upon user interactions with video segments accessed via a playback device in accordance with an embodiment of the invention.

DETAILED DESCRIPTION

Figure 1:
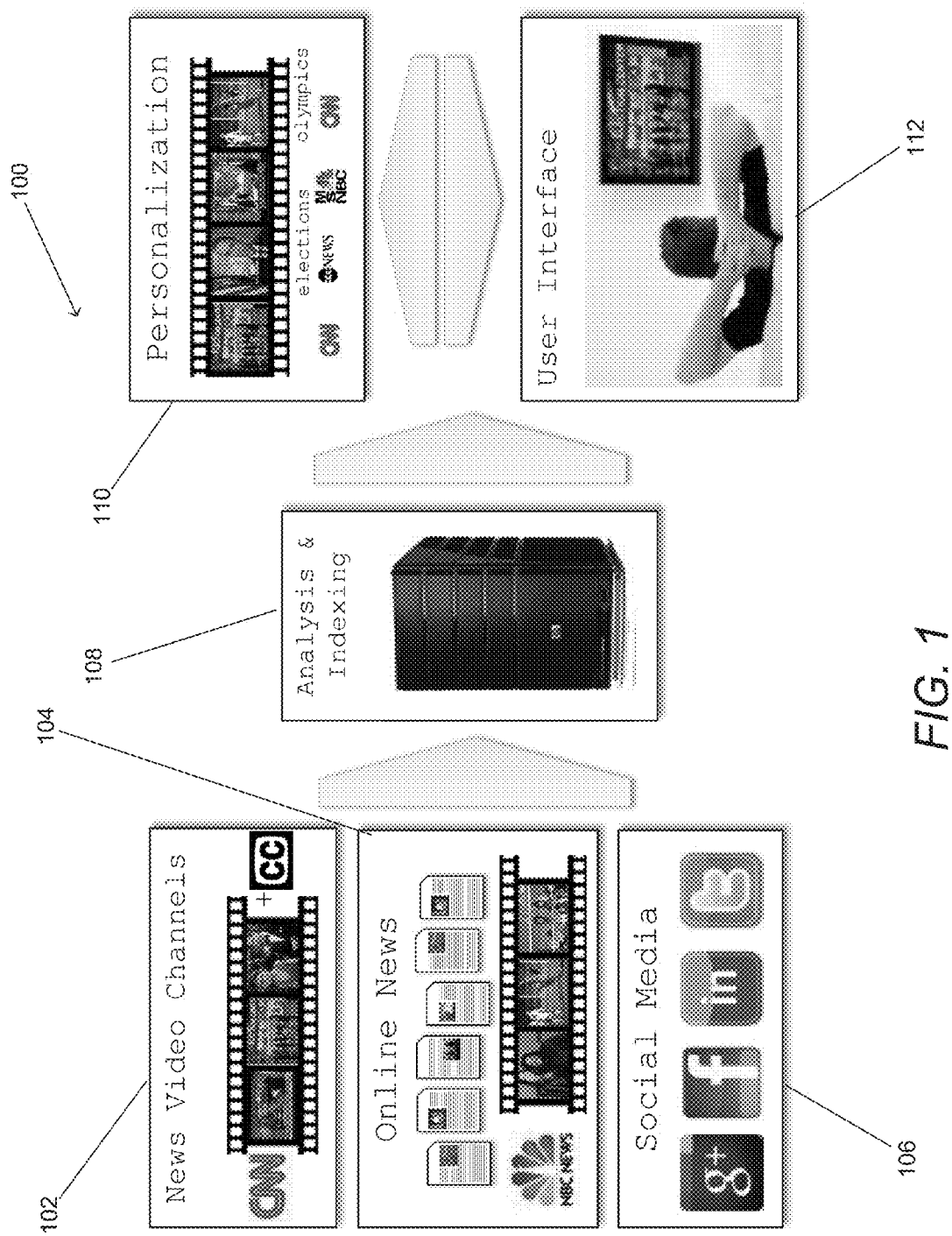
FIG. 1 is a flow chart that conceptually illustrates a process for generating a personalized playlist of video segments in accordance with an embodiment of the invention.

Turning now to the drawings, systems and methods for generating personalized video playlists for video content aggregated from a variety of content sources in accordance with embodiments of the invention are illustrated. In many embodiments, data streams of video content are aggregated from various sources. Relationships are identified between various segments of the video content and/or between segments of the video content and other relevant sources of information including (but not limited to) metadata databases, web pages and/or social media services. Relevant information concerning the video segments can then be utilized to generate personalized playlists of video content based upon each user's viewing history and preferences. Users can then utilize the playlists to playback segments of video content via any of a variety of playback devices. In a number of embodiments, the user interface presented to the user via the playback device and/or via a second screen can display and/or provide users with links to information related to the displayed video segment.

Online sources of video content, such as news websites, typically provide video content in individual segments. By contrast traditional broadcast sources of video content are typically provided in continuous streams. In many embodiments, the process of aggregating video content from various sources can include segmentation of continuous data streams of video content. In the context of a news personalization service, the streams of video content can be segmented into individual news stories. In other contexts, the streams of video content can be segmented in accordance with other criteria including (but not limited to) commercial breaks, repeated events, slow motion sequences, camera shots, sentences, and/or anchor frames. In the specific context of sporting events, repeated sequences, slow motion sequences, and shots of the crowd are often indicative of important activity and can be utilized as segmentation boundaries. In addition, certain camera angles are typically utilized to capture video of important regions of a sports field. Therefore, camera angle can also be utilized as segmentation boundaries. As can readily be appreciated, any of a variety of segmentation cues can be utilized to identify specific segmentation boundaries that are appropriate to the requirements of a given application. In a number of embodiments, the segmentation process is a multi-modal segmentation process that detects segmentation cues in video, audio, and/or text data available in the data stream. Multi-modal segmentation processes in accordance with certain embodiments of the invention utilize specific text segmentation cues contained within closed caption text data. In a number of embodiments, specific video segmentation cues such as the recognition of a recurring face (e.g. an anchorperson), and/or recurring logo or logo animation are utilized to assist video segmentation. In other embodiments, any of a variety of segmentation techniques can be utilized as appropriate to the requirements of specific applications.

In a number of embodiments, segments of video content are analyzed to identify links between the segments and other relevant sources of information including (but not limited to) metadata databases, web pages and/or short messages posted via social media services such as the Facebook service provided by Facebook, Inc. of Menlo Park, Calif. and the Twitter service provided by Twitter, Inc. of San Francisco, Calif. In several embodiments, a multi-modal search for relevant additional data sources is performed that utilizes textual analysis and visual analysis of the video segments to identify relevant sources of additional data. In a number of embodiments, the textual analysis involves extracting keywords from text data such as closed caption and/or subtitles. The extracted keywords can then be utilized to locate relevant text data. In certain embodiments, the visual analysis involves recognizing elements within individual frames of video such as (but not limited to) text, faces, images and/or image patterns (e.g. clothing, scene background). In several embodiments, visual analysis can also involve object detection and/or detection of specific object events (e.g. gestures or specific object movements). Text and faces of named entities can be extracted as metadata describing the video segment and utilized to locate sources of relevant text data. In several embodiments, some or all of a frame of video can be compared to images related to additional sources of data and matching images used to identify relevant sources of additional data. In other embodiments, any of a variety of text and/or visual analysis can be performed to identify relevant sources of additional information.

In a number of embodiments, a multi-modal video search engine service is provided that creates an index of video segments that are relevant to specific keywords based upon relevant keywords identified through the textual and visual analysis of the video segments. In several embodiments, the list of relevant keywords for a particular video segment can be expanded by identifying keywords from in additional sources of data identified through the textual and visual analysis of the video segment. Once generated, the index can be utilized to generate a list of video segments that are relevant to a text search query. In several embodiments, an image, a video segment, and/or a Universal Resource Locator (URL) identifying a data sources such as (but not limited to) an image, a video sequence, a web page, and/or an online article can be provided as an input to the search engine (as opposed to a text query) to generate a list of related video segments. In other embodiments, any of a variety of multi-modal search engine services can be implemented as appropriate to the requirements of specific applications.

With specific regard to the generation of personalized playlists, the ability to identify related video segments can be useful in generating a playlist having a specified duration that provides the greatest coverage of the content of a set of video segments. The ability to identify related and/or duplicate content in a set of video segments can be utilized in the selection of video segments to include in a playlist. In the context of news stories, a personalized playlist can be constructed by selecting video segments of news stories that provide the greatest coverage of the stories taking into consideration an individual user's preferences concerning factors such as (but not limited to) content source, content category, anchorperson and/or any other factors appropriate to specific applications. As discussed further below, many embodiments of the invention utilize an integer linear programming optimization or a suitable approximate solution that employs an objective function that weighs both content coverage and user preferences in the generation of a personalized playlist. However, any of a variety of techniques for recommending video segments can be utilized in accordance with embodiments of the invention including (but not limited to) processes that generate playlists using video segments that do not contain cumulative content.

Systems and methods for generating personalized video playlists, performing multi-modal video data stream segmentation, and generating video search results using multi-modal analysis of video segments in accordance with embodiments of the invention are discussed further below.

Playlist Generation Systems

Playlist generation systems in accordance with embodiments of the invention perform multi-modal analysis of video segments to generate personalized playlists based upon factors including (but not limited to) a user's preferences, and/or viewing history. In a number of embodiments, the user's preferences can touch upon topic, content provider, and total playlist duration. A playlist generation system configured to generate personalized playlists of news stories in accordance with an embodiment of the invention is conceptually illustrated in FIG. 1. The playlist generation system 100 obtains video data streams and video segments from a variety of sources including (but not limited to) over-the-air broadcasts and cable television transmissions (102), online news websites (104), and social media services (106). In several embodiments, continuous data streams such as (but not limited to) over-the-air broadcasts and cable television transmissions (102) are segmented and the video segments stored for later retrieval. In a number of embodiments, a multi-modal segmentation process is utilized that considers a variety of video, audio, and/or text cues in the determination of segmentation boundaries. In other embodiments, the system only sources previously segmented video. In other embodiments, any of a variety of segmentation processes can be utilized as appropriate to the requirements of specific applications. Segmentation processes that are utilized by various playlist generation systems in accordance with embodiments of the invention are described further below.

The playlist generation system 100 analyzes and indexes (108) the video segments. In several embodiments, a multi-modal process that performs textual and visual analysis is utilized to analyze and index the video segments. In a number of embodiments, the multi-modal process identifies keywords from text sources within the video segment including (but not limited to) closed caption, and subtitles. Keywords can also be extracted based upon text recognition, and object recognition. In certain embodiments, various object recognition processes are utilized including facial recognition processes to identify named entities. The set of keywords associated with a video segment can then be utilized to identify additional sources of data. Examples of additional sources of data include (but are not limited to) online articles and websites, and posting to social media services. In certain embodiments, comparisons can be performed between frames of a video segment and images associated with additional sources of data as an additional modality for determining the extent of the relevance of an additional source of data. In other embodiments, any of a variety of analysis and indexing processes can be utilized as appropriate to the requirements of specific applications. Analysis and indexing processes that are utilized by various playlist generation systems in accordance with embodiments of the invention are discussed further below.

The indexed video segments can be utilized by the playlist generation system 100 to generate personalized playlists (110). Any of a variety of processes can be utilized to generate personalized playlists in accordance with embodiments of the invention. Several particularly effective processes for generating personalized playlists are described below. A number of embodiments are directed toward the generation of playlists in the context of news stories and select video segments that provide the greatest coverage of recent news stories in a manner that is informed by user preferences. In several embodiments, the selection process is further constrained by the need to generate a playlist having a playback duration that does not exceed a duration specified by the user.

Personalized playlists can be provided by the playlist generation system to playback devices. In a number of embodiments, the playlist can take the form of JSON playlist metadata. In other embodiments, any of a variety of data transfer techniques can be utilized including the creation of a top level index file such as (but not limited to) a SMIL file, or an MPEG-DASH file. Client applications on playback devices can generate a user interface (112) that enables the user to obtain and playback the video segments identified within the playlist. In many instances, the user may simply enable the playback device to continuously play through the playlist. In several embodiments, the user interface provides the user with the ability to select video segments, express sentiment toward video segments (e.g. like/dislike), skip video segments, reorder and/or delete video segments from the playlist, and share video segments via email, messaging services, and/or social media services. In a number of embodiments, the playlist generation system 100 logs user interactions via the user interface and uses the interactions to infer user preferences. In this way, the system can learn over time information about a user's preferences including (but not limited to) preferred content categories, content services, and/or anchorpeople. In a number of embodiments, playback devices can generate a so-called "second screen" user interface that can enable control of playback of a playlist on another playback device and/or provide information that complements a video segment and/or playlist being played back by another playback device. As can readily be appreciated, the specific user interface generated by a playback device is typically only limited by the capabilities of the playback device and the requirements of a specific application.

Although specific playlist generation systems are described above with reference to FIG. 1, any of a variety of playlist generation systems that produce playlists of video segments from multiple sources that are personalized based upon the preferences of individual users can be utilized as appropriate to the requirements of specific applications in accordance with embodiments of the invention. Personalized video distribution systems that utilize personalized playlists in the distribution of video content in accordance with various embodiments of the invention are discussed further below.

Personalized Video Distribution Systems

Figure 2:
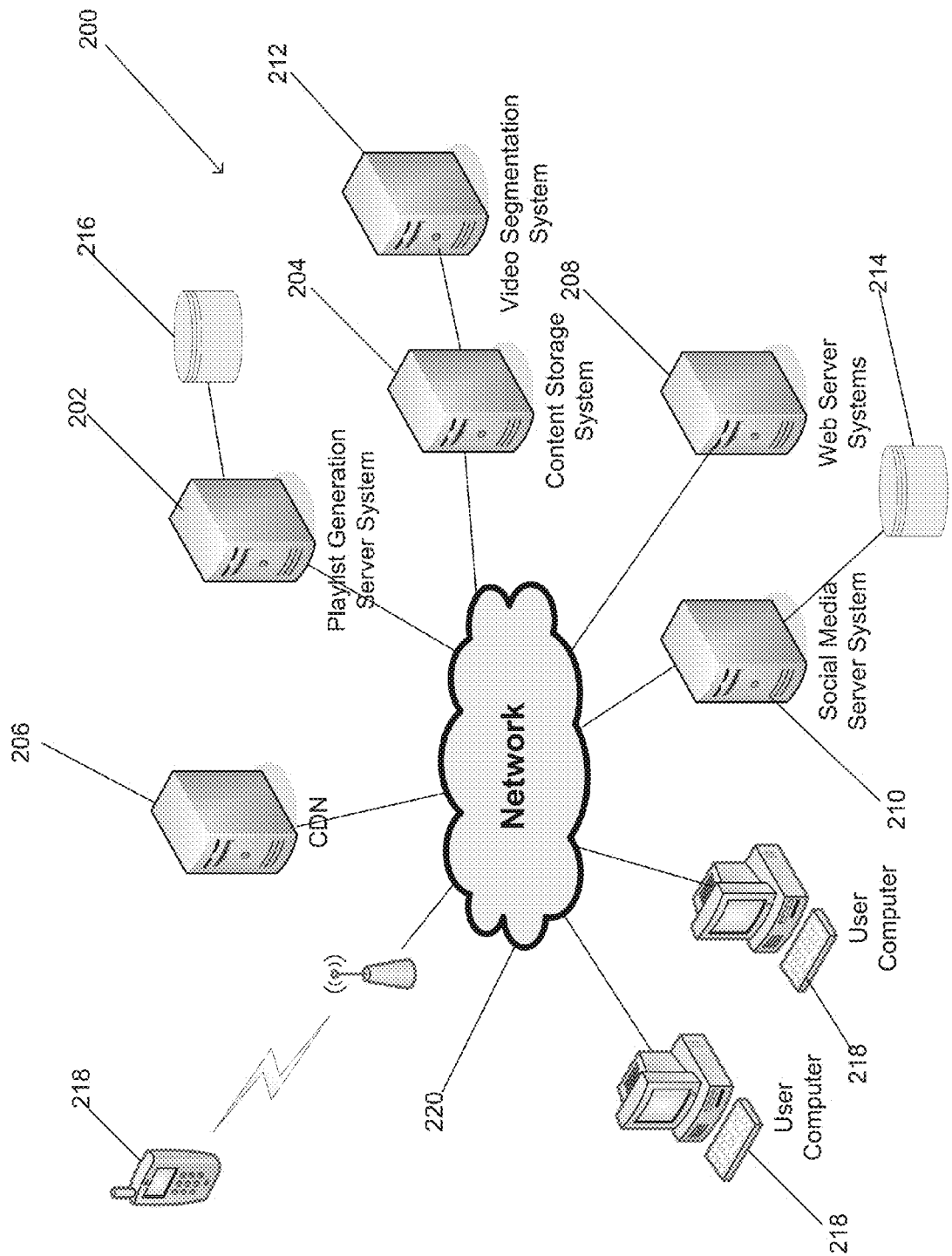
FIG. 2 is a system diagram that conceptually illustrates a system for generating personalized playlists, distributing video segments to users based upon the personalized playlists, and collecting analytic data based upon user interactions with the video segments during playback in accordance with an embodiment of the invention.

A video distribution system incorporating a playlist generation server system in accordance with an embodiment of the invention is illustrated in FIG. 2. The video distribution system 200 includes a playlist generation server system 202 that is configured to index video segments accessible via a content storage system 204, a content distribution network 206, web server systems 208 and/or social media server systems 210, 214. In a number of embodiments, the content storage system 204 contains video segments generated by a video segmentation system 212 that can segment and transcode continuous video data streams obtained from sources including (but not limited to) over-the-air broadcasts and cable television transmissions. Various processes that can be utilized to perform segmentation of continuous data streams in accordance with embodiments of the invention are discussed below.

Playlist generation server systems 202 in accordance with many embodiments of the invention utilize multi-modal analysis of video segments to identify additional relevant sources of data accessible via the content storage system 204, a content distribution network 206, a web server system 208 and/or a social media server system 210. In several embodiments, the playlist generation server system 202 annotates video segments with metadata extracted from the video segment and/or from additional sources of relevant data. The metadata describing the video segments can be stored in a database 216 and utilized to generate personalized playlists based upon user preferences that can also be stored in the database.

Playback client applications installed on a variety of playback devices 218 can be utilized to request personalized playlists from a playlist generation server system 202 via a network 220 such as (but not limited to) the Internet. The playback client applications can configure the playback devices 218 to display a user interface that enables a user to view and interact with the video segments identified in the user's personalized playlist. In a number of embodiments, the playlist generation server system and the playback devices can support multi-screen user interfaces. For example, a first playback device can be utilized to playback video segments identified in the playlist and a second playback device can be utilized to provide a "second screen" user interface enabling control of playback of video segments on the first playback device and/or additional information concerning the video segments and/or playlist being played back on the first playback device. In the illustrated embodiment, the playback devices 218 are personal computers and mobile phones. As can be readily appreciated, playback client applications can be created for any of a variety of playback devices including (but not limited to) network connected consumer electronics devices such a televisions, game consoles, and media players, tablet computers and/or any other class of device that is typically utilized to view video content obtained via a network connection.

Generating Personalized Playlists

Figure 3:
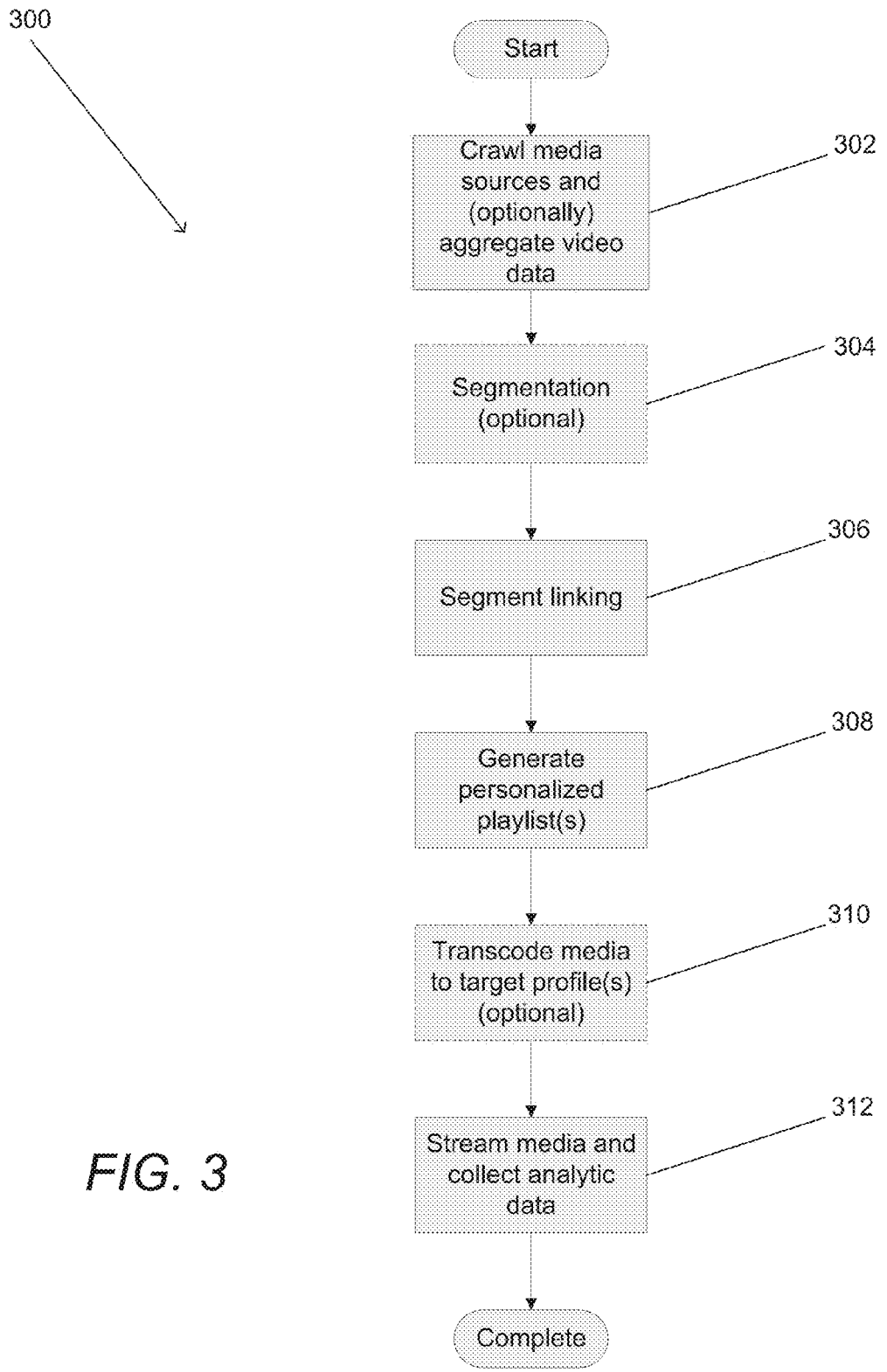
FIG. 3 is a flowchart illustrating a process for generating personalized playlists, distributing video segments to users based upon the personalized playlists, and collecting analytic data based upon user interactions with the video segments during playback in accordance with an embodiment of the invention.

A process for generating a personalized playlist of video segments drawn from different content sources based upon user preferences in accordance with an embodiment of the invention is illustrated in FIG. 3. The process 300 includes crawling (302) the websites of video content sources to identify new video segments. In a number of embodiments, the process of identifying new video segments also includes aggregating video data from a variety of sources including (but not limited to) over-the-air broadcasts and cable television transmissions. In embodiments where video data is aggregated, the aggregated video data may benefit from segmentation (304). The result of the crawling and/or aggregation of video data is typically a list of video segments that can be recommended to a given user.

In order to generate a playlist of video segments personalized to a user's preferences, the process 300 seeks to annotate the video segments with metadata describing the content of the segments. In a number of embodiments, a video segment linking process (306) is performed that seeks to identify additional sources of relevant data that describe the content of the video segment. In a number of embodiments, the video segment linking process (306) also seeks to identify relationships between video segments. In various contexts, including in the generation of personalized playlists of news stories, knowledge concerning the relationship between video segments can be useful in identifying video segments that contain cumulative content and can be excluded from a playlist without significant loss of information or content coverage. Information concerning the number of related stories can also provide an indication of the importance of the story.

Metadata describing a set of video segments can be utilized to generate (308) personalized playlists for one or more users. As is described in detail below, a variety of processes can be utilized in the generation of a personalized playlist based upon the metadata generated by process 300. In the context of news stories, a number of embodiments utilize an integer linear programming optimization and/or an approximation of an integer linear programming optimization that employs an objective function that weighs both content coverage including (but not limited to) measured trending topics (e.g. breaking news, or popular stories) and user preferences in the generation of a personalized playlist. Although, any of a variety of processes for recommending video segments can be utilized as appropriate to the requirements of specific applications in accordance with embodiments of the invention.

In many embodiments, video segments are streamed to playback devices. Many of the standards that exist for encoding video specify profiles and playback devices are typically constructed in a manner that enables playback of content encoded in accordance with one or more of the profiles specified within the standard. The same profile may not, however, be suitable or desirable for playing back content on different classes of playback device. For example, mobile devices are typically unable to support playback of profiles designed for home theaters. Similarly, a network connected television may be capable of playing back content encoded in accordance with a mobile profile. However, playback quality may be significantly reduced relative to the quality achieved with a profile that demands the resources that are typically available in a home theater setting. Accordingly, processes for generating personalized video playlists in accordance with many embodiments of the invention involve transcoding video segments into formats and/or profiles suitable for different classes of device. As can readily be appreciated, the transcoding of media into target profiles can be performed in parallel with the processes utilized to perform video segment linking (306) and personalized playlist generation (308).

As discussed above, personalized playlists can be utilized by playback devices to obtain (312) and playback video segments identified within the playlists. In a number of embodiments, the video segments are streamed to the playback device and any of a variety of streaming technologies can be utilized including any of the common progressive playback or adaptive bitrate streaming protocols utilized to stream video content over a network. In several embodiments, a playback device can download the video segments using a personalized video playlist for disconnected (or connected) playback. The personalized playlists are generated based upon user preferences. Therefore, the process of generating personalized playlists can be continuously improved by collecting information concerning user interactions with video segments identified in a personalized playlist. The interactions can be indicative of implicit user preferences and may be utilized to update explicit user preferences obtained from the user.

Although specific processes for generating personalized video playlists are described above with reference to FIG. 3, any of a variety of processes that annotate video segments from multiple video sources with metadata describing the content of the video segments and utilize the metadata annotations and user preferences to generate a playlist can be utilized as appropriate to the requirements of specific applications in accordance with embodiments of the invention. Video segmentation and playlist generation systems that can be utilized in the generation of personalized video playlists in accordance with embodiments of the invention are discussed further below.

Video Segmentation Systems

In a number of embodiments, computers and television tuners are utilized to continually record media content from over-the-air broadcasts and cable television transmissions. In the context of a playlist generation system configured to generate personalized video playlists of news stories, the recorded programs can include national morning and evening news programs (e.g., TODAY Show, ABC World News), investigative journalism (e.g., 60 Minutes), and late-night talk shows (e.g., The Tonight Show). In many embodiments, the closed caption (CC) and/or any subtitles and metadata that may be available within the broadcast data stream are recorded along with the media content for use in subsequent processing of the recorded media content. In other contexts, content sources appropriate to the requirements of specific applications can be recorded. In several embodiments, segmentation is performed in real-time prior to storage. In a number of embodiments, the video data streams are recorded and segmentation is performed on the recorded data streams.

Figure 4:
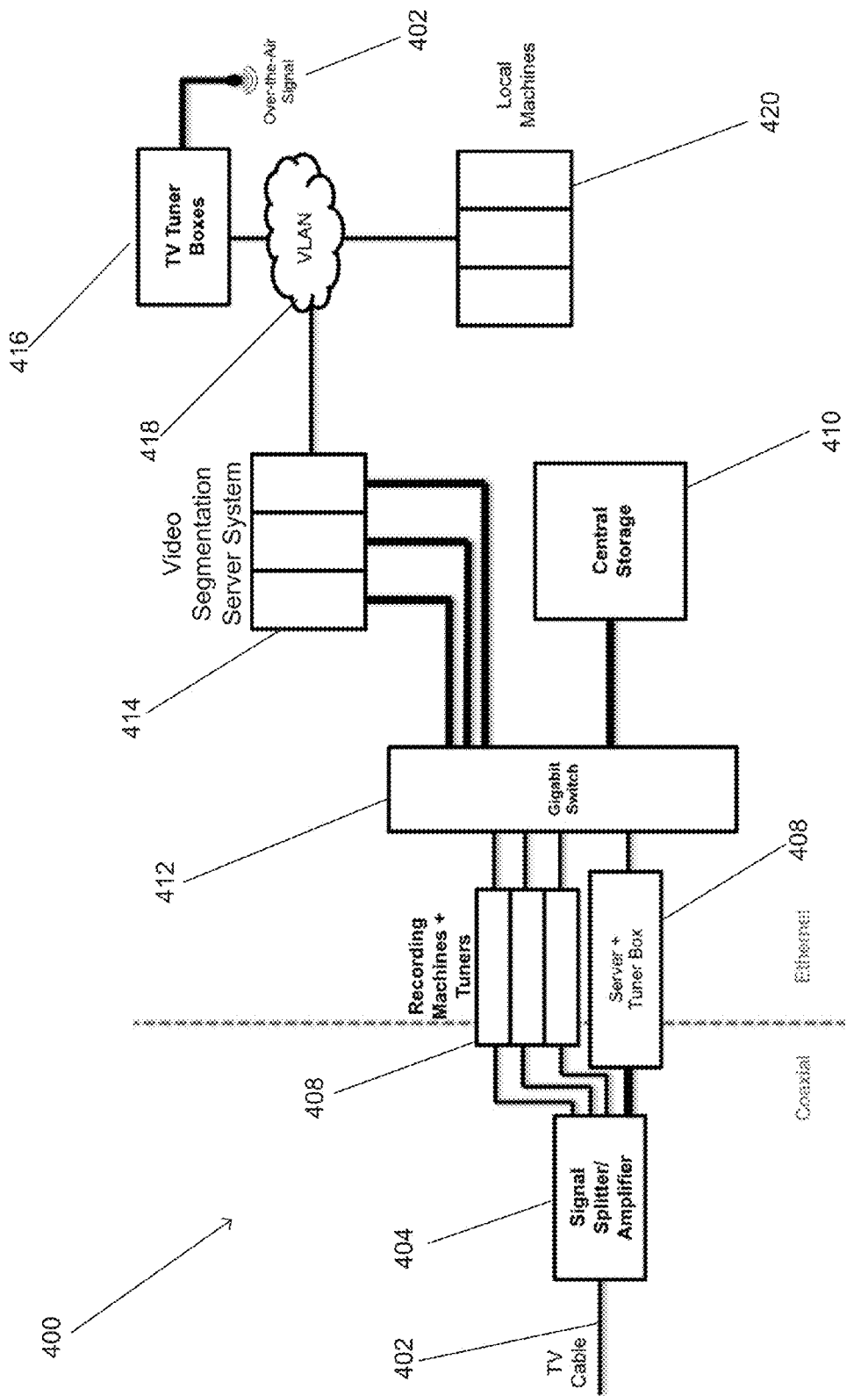
FIG. 4 is a system diagram that conceptually illustrates a system for recording video segments from cable and over-the-air television broadcasts in accordance with an embodiment of the invention.

A video segmentation system configured to aggregate and segment over-the air broadcasts and cable television transmissions in accordance with an embodiment of the invention is illustrated in FIG. 4. The video segmentation system 400 receives video data stream inputs 402 from over-the-air broadcasts and cable television transmissions. In the illustrated embodiment, the video segmentation system 400 uses a signal splitter 404 to split and amplify a signal received via a cable television service. The signal is split into a number of inputs that are provided to a set of tuners 408 that possess the capability to demodulate a digital television signal from the cable television transmission and record the data stream to a storage device. In a number of embodiments, the tuners are controlled by a server based upon program guide information. The server can utilize the program guide information to identify desired content and can control the tuners 408 to tune to the appropriate channel at the appropriate time to commence recording of the content.

In the illustrated embodiment, the tuners 408 connect to a central storage system 410 via a high bandwidth digital switch 412. The data streams are recorded to the central storage system 410 and then a video segmentation server system 414 can commence the process of segmenting the data stream into discrete video segments.

A similar process is utilized to record and segment data streams obtained from over-the-air broadcasts. In the illustrated embodiment, tuner boxes 416 are utilized to tune to and demodulate digital television signals that are provided via a network 418 to the video segmentation server system 414 for segmentation. In many embodiments, the video segmentation server system records the over-the-air data streams to the central storage system 410 and then processes the recorded data streams. In a number of embodiments, the video segmentation server 414 system performs video segmentation in real-time and the video segments are recorded to the central storage system 410. In a number of embodiments, local machines 420 can be utilized to administer the aggregation and segmentation of video and/or view video segments.

Although specific systems for performing video aggregation and segmentation are described above with reference to FIG. 4, any of a variety of video segmentation systems can be utilized to receive and segment video data streams in accordance with embodiments of the invention. Video segmentation server systems and multi-modal segmentation processes that can be utilized in the segmentation of video data streams in accordance with embodiments of the invention are discussed further below.

Multi-Modal Video Segmentation

Due to the diversity of video content generated by various broadcast and online content sources, video segmentation systems in accordance with many embodiments of the invention can utilize a variety of cues to reliably segment content. In a typical data stream of video content, the sources of information concerning the structure of the content include (but are not limited to) image data in the form of frames of video, audio data in the form of time synchronized audio tracks, text data in the form of closed caption and/or subtitles, and/or additional sources of video, audio, and/or text information indicated by metadata contained within the data stream (e.g. in a time synchronized metadata track). In the context of video data streams, the term structure can often be used to describe a common progression of content within a data stream. For example, many data streams include content interrupted by advertising. At a more sophisticated level many news services structure transitions between news stories to incorporate shots of an anchorperson, which can be referred to as anchor frames, and/or transition animations that often include a station logo. The goal of video segmentation is to use information concerning the structure of content to divide a continuous video data stream into logical video segments such as (but not limited to) discrete news stories. In a number of embodiments, video segmentation is performed using multi-modal fusion of a variety of visual, auditory and textual cues. By combining cues from different types of data contained within the data stream, the segmentation process has a greater likelihood of correctly identifying structure within the content indicative of logical boundaries between video segments.

Multi-Modal Video Segmentation Server Systems

Figure 5A:
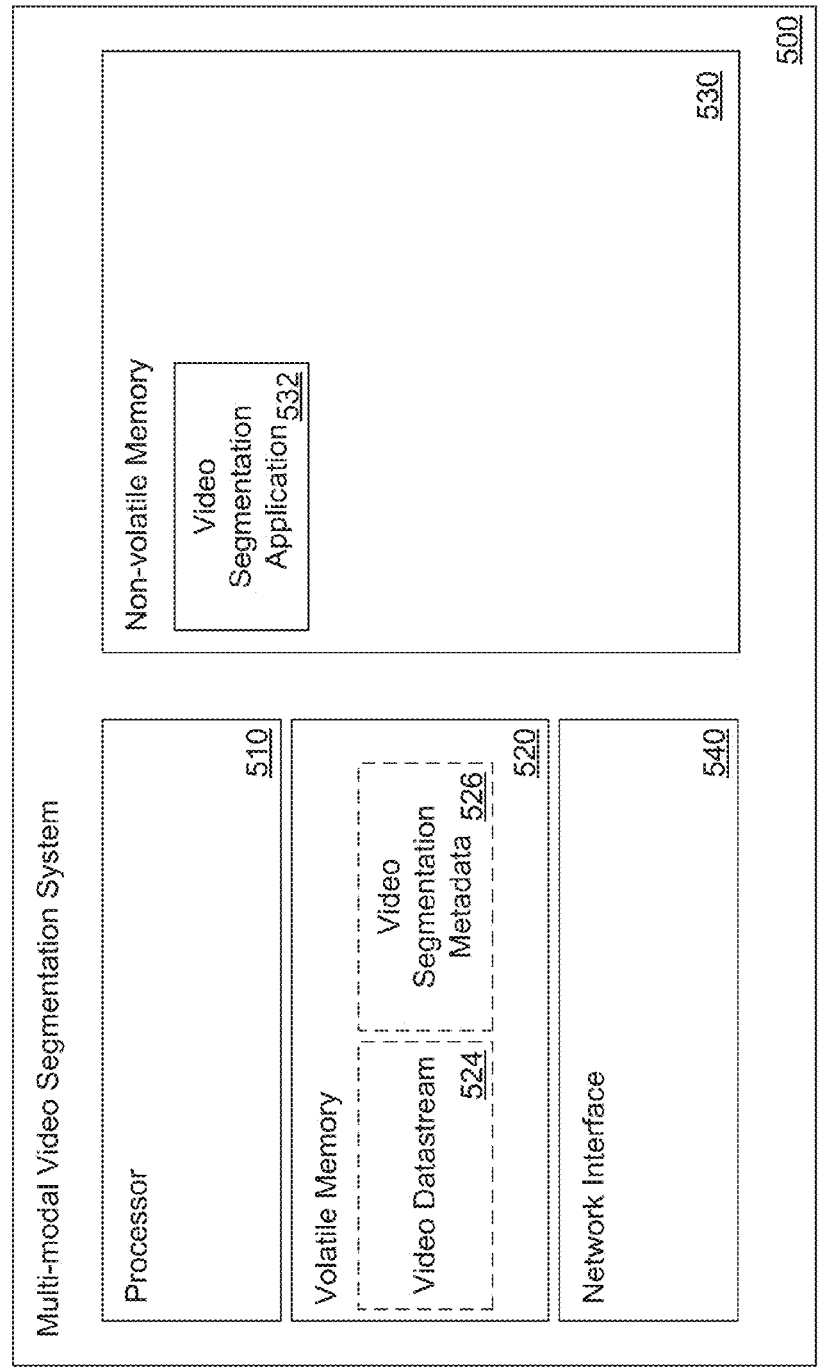
FIG. 5A is a system diagram that conceptually illustrates a multi-modal video data stream segmentation system in accordance with an embodiment of the invention.

A multi-modal video segmentation server system in accordance with an embodiment of the invention is illustrated in FIG. 5A. The multi-modal video segmentation server system 500 includes a processor 510 in communication with volatile memory 520, non-volatile memory 530, and a network interface 540. In the illustrated embodiment, the non-volatile memory includes a video segmentation application 532 that configures the processor 510 to identify video segmentation boundaries in a video data stream 524 retrieved via the network interface 540. In a number of embodiments, the segmentation boundaries are utilized to generate video segmentation metadata 526 that can be utilized in the subsequent transcoding of the video data into one or more target video profiles for distribution to playback devices.

Although specific multi-modal video segmentation server systems are described above with reference to FIG. 5A, any of a variety of architectures can be utilized to implement multi-modal segmentation server systems in accordance with embodiments of the invention. Furthermore, the term processor is used with respect to all of the processing system described herein to refer to a single processor, multiple processors, and/or a combination of one or more general purpose processor and one/or more graphics coprocessors or graphics processing units (GPUs). Furthermore, the term memory is used to refer to one or more memory components that may be housed within separate computing devices. Multi-modal video segmentation processes that can be performed using multi-modal video segmentation processes in accordance with embodiments of the invention are described in detail below.

Multi-Modal Video Segmentation Processes

Figure 5B:
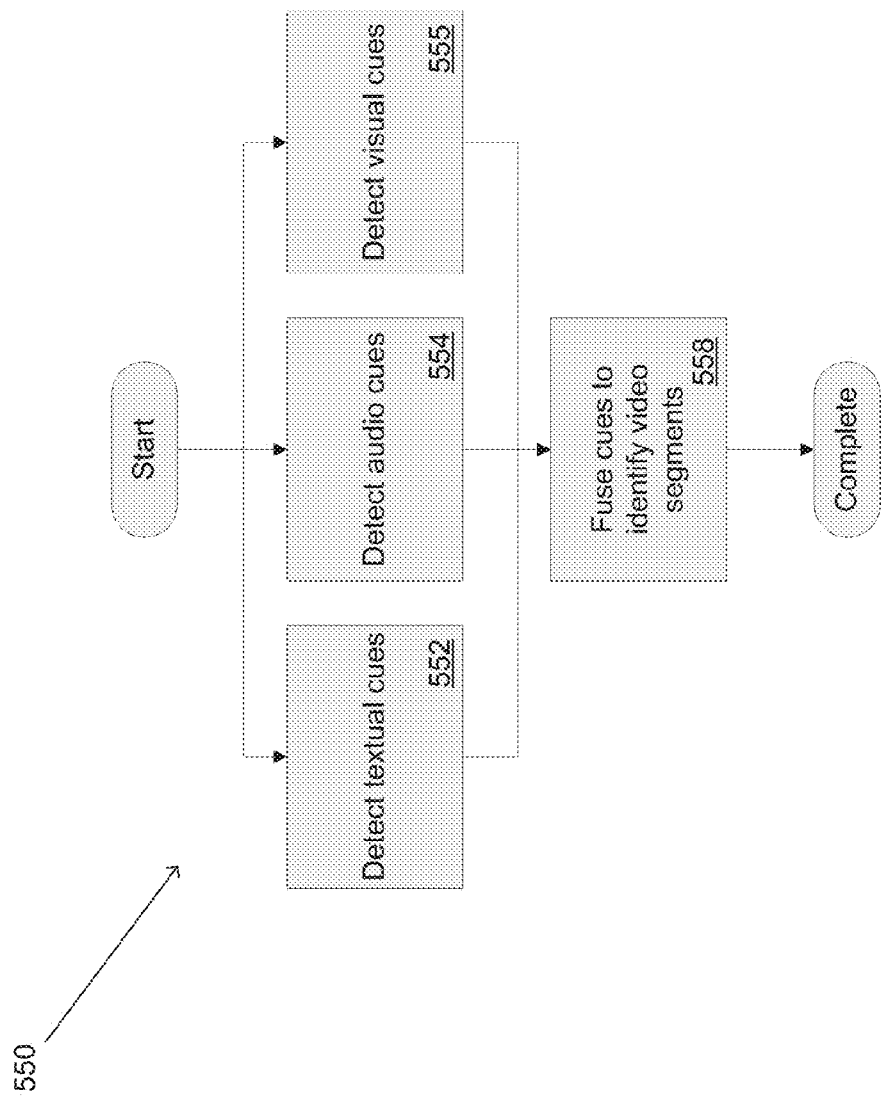
FIG. 5B is a flowchart illustrating a process for performing multi-modal segmentation of a video data stream in accordance with an embodiment of the invention.

Multi-modal video segmentation processes can utilize a variety of different types of data contained within a video data stream to identify cues indicative of the structure of the data stream. A multi-modal video segmentation process that utilizes textual, audio and visual cues to identify segmentation boundaries in accordance with an embodiment of the invention is conceptually illustrated in FIG. 5B. The process 550 involves detecting textual cues (552), audio cues (554), and visual cues (555). The detected cues and their associated timestamps are then fused to identify segmentation boundaries. In several embodiments, machine learning techniques can be utilized to train a system to identify segmentation boundaries based upon a fused stream of segmentation cues. In a number of embodiments, a supervised learning approach such as (but not limited to) the use of techniques including (but not limited to) a support vector machine, a neural network classifier, and/or a decision tree classifier are utilized to implement a segment that can identify segmentation boundaries based upon a training data set of video streams in which segmentation boundaries are manually identified. In other embodiments, any of a variety of techniques including but not limited to supervised and unsupervised machine learning techniques can be utilized to implement systems for identifying segmentation boundaries based upon multi-modal segmentation cues in accordance with embodiments of the invention. The various textual, visual and audio cues that can be utilized in processes similar to those described above with reference to FIG. 5B are discussed further below.

Textual Cues

Some of the most important cues for story boundaries can be found in closed caption textual data incorporated within a video data stream. Often, >>> and >> markers are inserted to denote changes in stories or changes in speakers, respectively. Due to human errors, relying solely on these markers can provide inaccurate segmentation results. Therefore, segmentation analysis of closed caption data can be enhanced by looking for additional cues including (but not limited to) commonly used transition phrases that occur at segmentation boundaries. In several embodiments, string searches are performed within closed caption textual data and all >>> markers and transition phrases are identified as potential segmentation boundaries. In a number of embodiments, the list of transition phrases include "Now, we turn to . . . " and "Stephanie Gross, NBC News, Seattle". In other embodiments, any of a variety of text tags and/or phrases can be utilized as textual segmentation cues as appropriate to the requirements of specific applications.

In many instances, there is a delay between the video and closed caption text that varies randomly even within the same segment of video content. Indeed, delays of the order of tens of seconds have been observed. In a number of embodiments, automatic speech recognition can be performed with respect to the audio track and the timestamps of the audio track used to align the audio track textual data output by the automatic speech recognition process with text in the accompanying closed caption textual data. In several embodiments, the text data output by the automatic speech recognition process can also be analyzed to detect the presence of transition phrases. In other embodiments, the uncertainty in the time alignment between the closed caption text and the video content can be accommodated by the multi-modal segmentation process and a separate time alignment process is not required.

Figure 6:
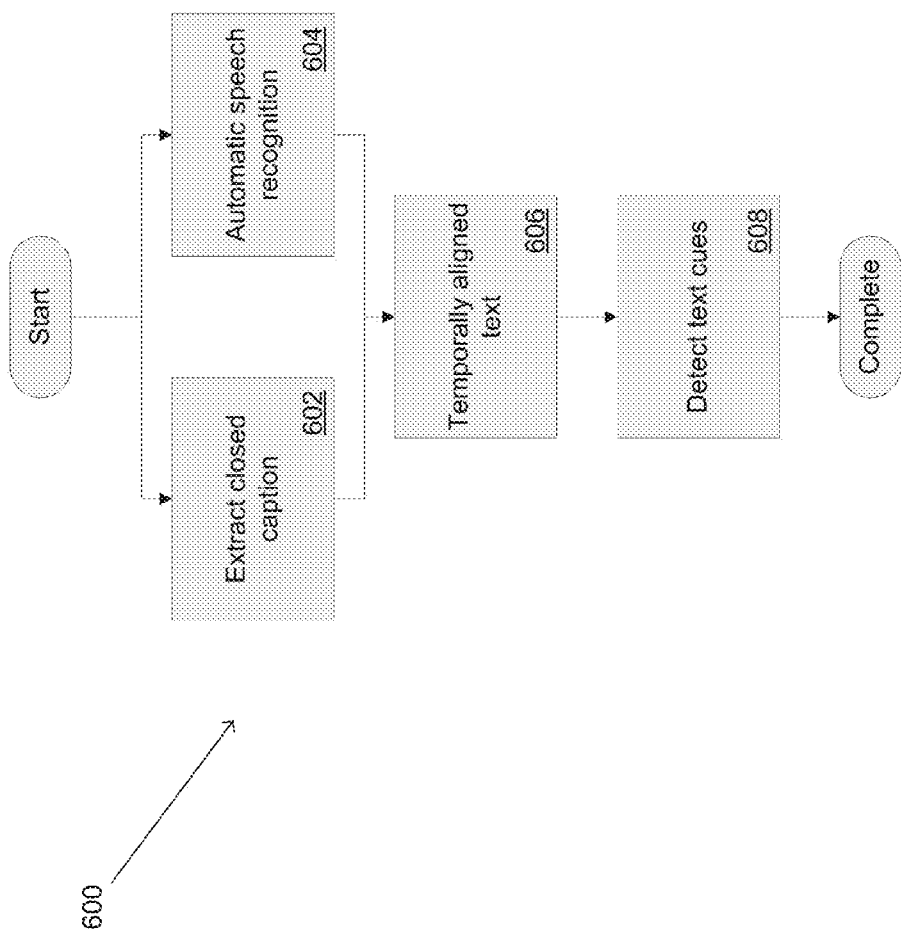
FIG. 6 is a flowchart illustrating a process for detecting text segmentation cues in a video data stream in accordance with an embodiment of the invention.

A process for identifying textual segmentation cues in accordance with an embodiment of the invention is illustrated in FIG. 6. The process 600 includes extracting closed caption textual data (602) and performing automatic speech recognition (604). These processes can be performed in parallel and any of a variety of automatic speech recognition processes typically used to perform automated speech to text conversions can be utilized as appropriate to the requirements of specific applications. In the context of news services, the number of speakers may be limited and speech recognition models that are speaker dependent can be utilized to achieve greater accuracy in the speech to text conversion of speech by recurring speakers such as (but not limited to) news anchors.

Timestamps within the audio track utilized as the input to the automatic speech recognition process can be utilized to time synchronize (606) closed caption textual data with the video track within the video segment. Text segmentation cues can be identified by performing string searches within the closed caption textual data. Information concerning the textual cue and the timestamp associated with the textual cue can then be utilized in the identification of segmentation boundaries. In a number of embodiments, a confidence score is associated with the timestamp assigned to a textual cue and the confidence score can also be considered in the determination of a segmentation boundary.

Visual Cues

Visual boundaries in video content can provide information concerning transitions in content that cannot be discerned from analysis of closed caption textual data alone. In several embodiments, an analysis of video content for visual cues indicative of segmentation boundaries can be utilized to identify additional segmentation boundaries and to confirm and/or improve the accuracy of boundaries identified using closed caption textual data.

In the context of segmentation of news stories, several embodiments of the invention rely upon one or more of a set of visual cues as strong indicators of a segmentation boundary. In a number of embodiments, the set of visual cues includes (but is not limited to) anchor frames, logo frames, logo animation sequences and/or dark frames. In other embodiments and/or contexts, any of a variety of visual cues can be utilized as appropriate to the requirements of specific applications.

Detecting Anchor Frames

Figure 7A:
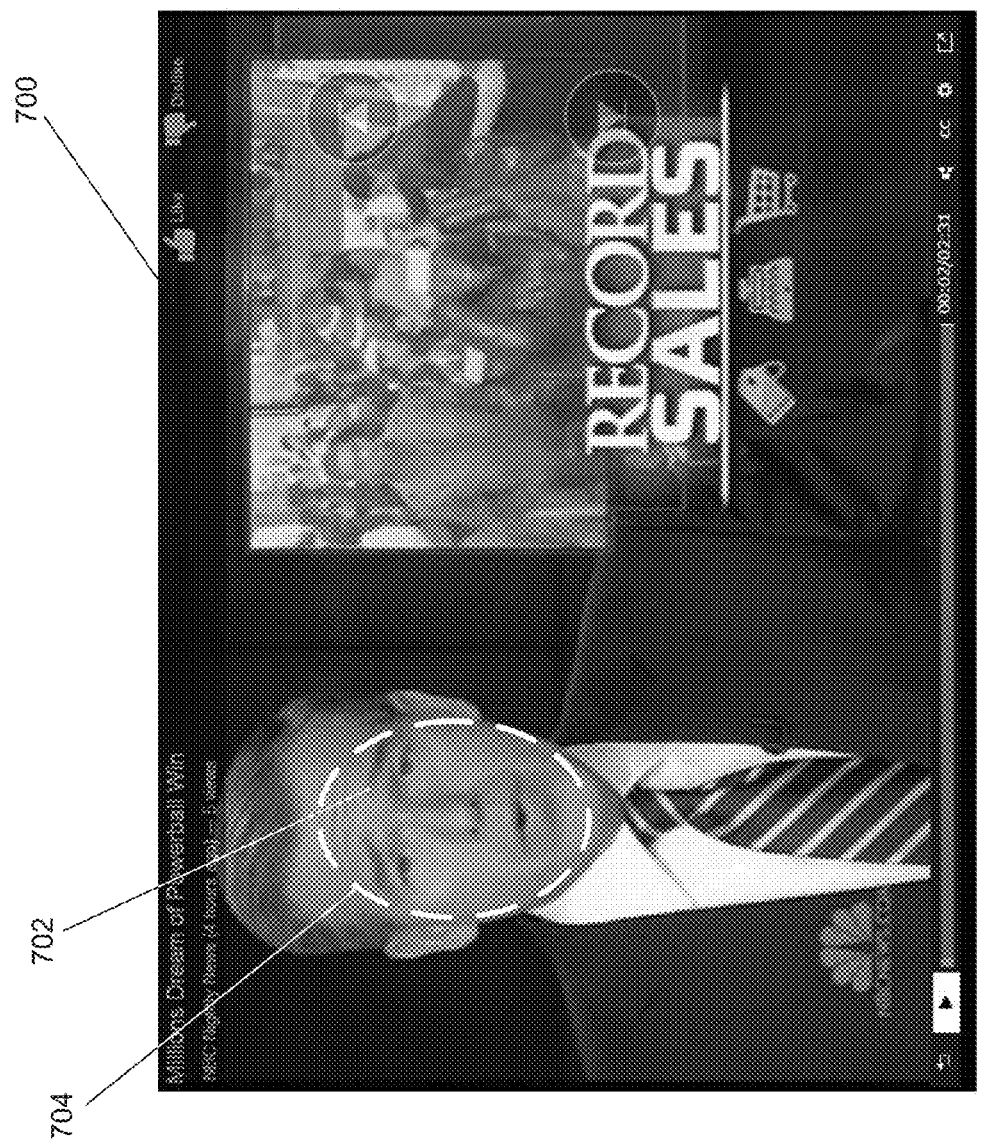
FIG. 7A conceptually illustrates the location of a face within a frame of video as part of a video segmentation process in accordance with an embodiment of the invention.
Figure 7B:
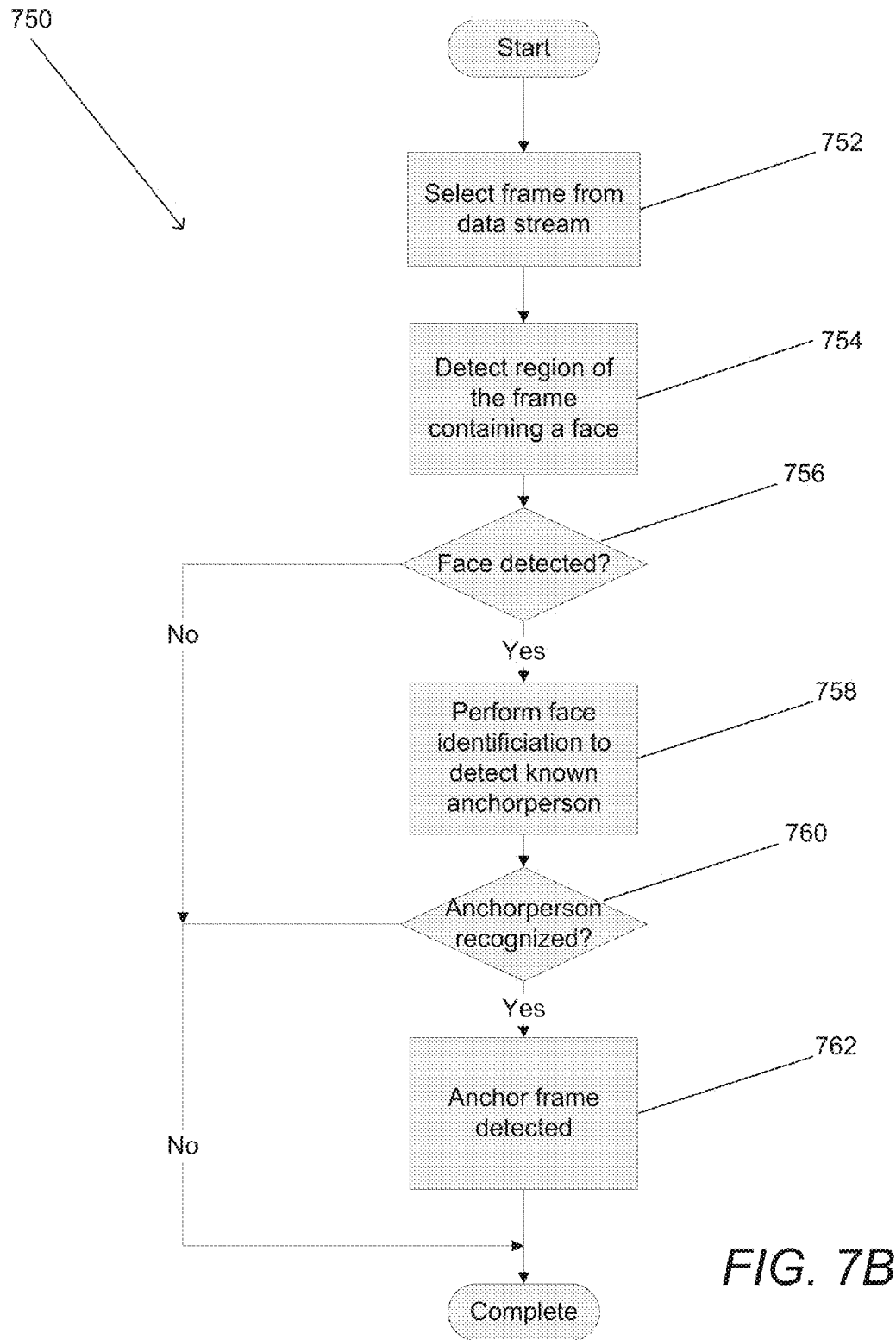
FIG. 7B is a flowchart illustrating a process for detecting an anchor frame segmentation cue in accordance with an embodiment of the invention.

The term anchor frame refers to a frame in which an anchorperson appears. Typically, one or more anchorpersons appear between stories to provide a graceful transition. In several embodiments, a face detector is applied to some or all of the video frames in a video data stream. In certain embodiments, a face detector that can detect the presence of a face (without performing identification) is utilized to identify candidate anchor frames and then a facial recognition process is applied to the candidate anchor faces to detect anchor frames. In other embodiments, any of a variety of techniques can be used to identify the presence of a specific person's face within a frame in a video data stream as appropriate to the requirements of specific applications A process for detecting anchor frames in a data stream in accordance with an embodiment of the invention is conceptually illustrated in FIG. 7A. The frame of video 700 contains an image of the face 702 of NBC News anchor Brian Williams. A process for detecting that a region 704 of the frame 700 contains the face of a known anchorperson identifying the frame as an anchor frame is illustrated in FIG. 7B. The process 750 includes selecting (752) a frame from the video data stream and detecting (754) a region of the frame containing a face. In several embodiments, a Viola-Jones or cascade of classifiers based face detector is utilized. In other embodiments, any of a variety of face detection techniques can be utilized as appropriate to the requirements of a specific application.

When no faces are detected (756), then the frame is determined not to be an anchor frame. When a determination (756) is made that a face is present, then a face identification process (758) can be performed within the region containing the detected face. In several embodiments, face identification is performed by generating a color histogram for a region containing a candidate face. In several embodiments, an elliptical region is utilized. In a number of embodiments, confidence information generated by the face detection process is utilized to define the region from which to form a histogram. The color histograms can be clustered from candidate anchor frames across the video data stream and dominant clusters identified as corresponding to an anchorperson. The dominant clusters can then be used to identify candidate anchor frames that contain a face with a face having a color histogram that is close to one of the dominant "anchor" color histograms. In certain embodiments, similarity is determined using the L1 distance between the color histograms. In other embodiments, any of a variety of metrics can be utilized as appropriate to the requirements of specific applications including metrics that consider the color histogram of a potential anchor face over more than one frame as appropriate to the requirements of specific application.

When a determination (760) that an anchorperson's face is present, an anchor frame is detected (762). In several embodiments, factors including (but not limited to) the L1 distance, and the number of adjacent frames in which the anchor face are detected are utilized to generate a confidence score that can be used by a multi-modal segmentation process in combination with information concerning other cues to determine the likelihood of a transition indicative of a segmentation boundary.

Detecting Logo Frames

Many news programs insert a program logo or transition animation between stories or segments. Logo appearance and position can vary unpredictably over time. In a number of embodiments, feature matching is performed between a set of logo images and frames from a video data stream. A set of logo images can be obtained by periodically crawling the websites of news organizations and/or other appropriate sources. Feature matching can also be performed between sequences of images in a transition animation and frames from a video data stream. Similarly, new transition animations can be periodically observed in video data streams generated by specific content sources and added to a library of transition animations.

Figure 8A:
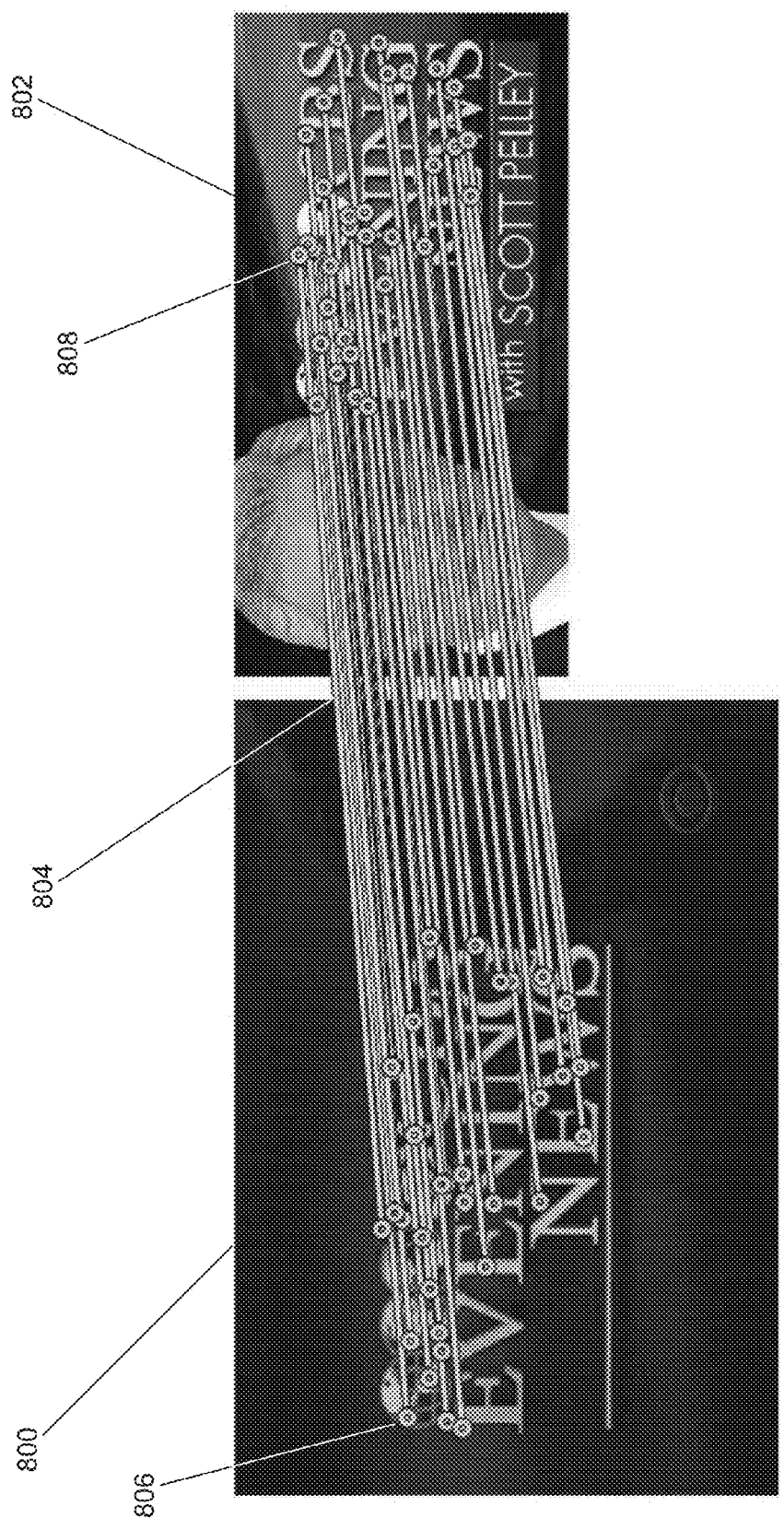
FIG. 8A conceptually illustrates the matching of a logo image to content within a frame of video in accordance with an embodiment of the invention.
Figure 8C:
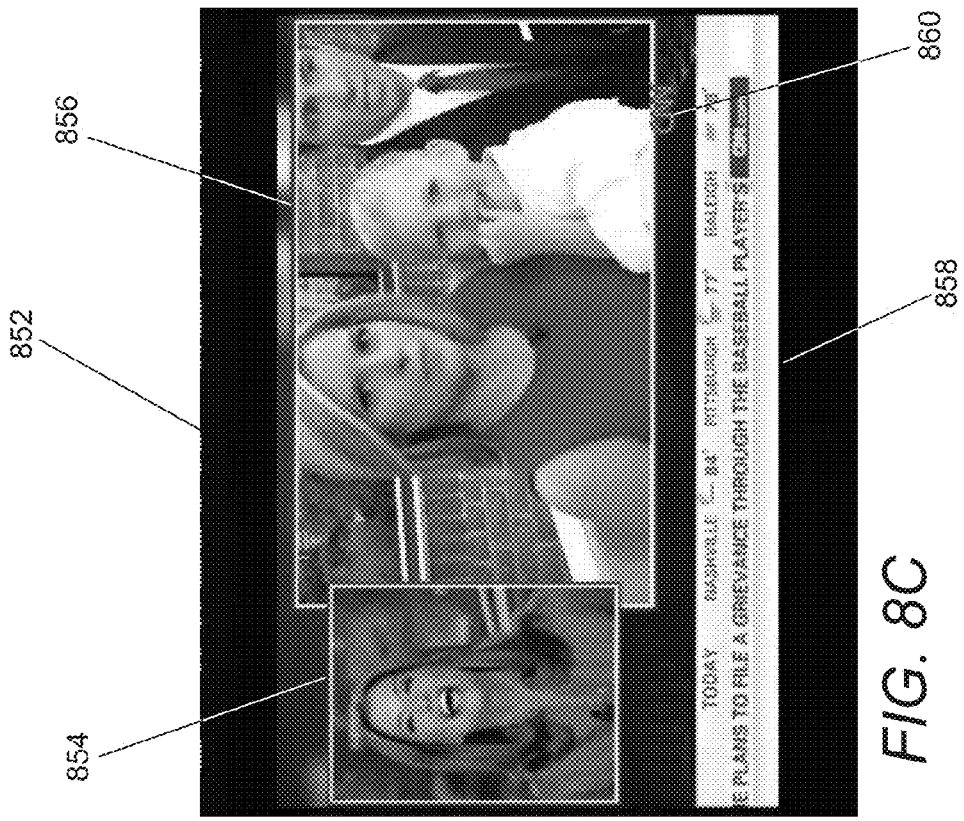
FIGS. 8B and 8C conceptually illustrate the identification of a transition animation segmentation cue in accordance with an embodiment of the invention.
Figure 8B:
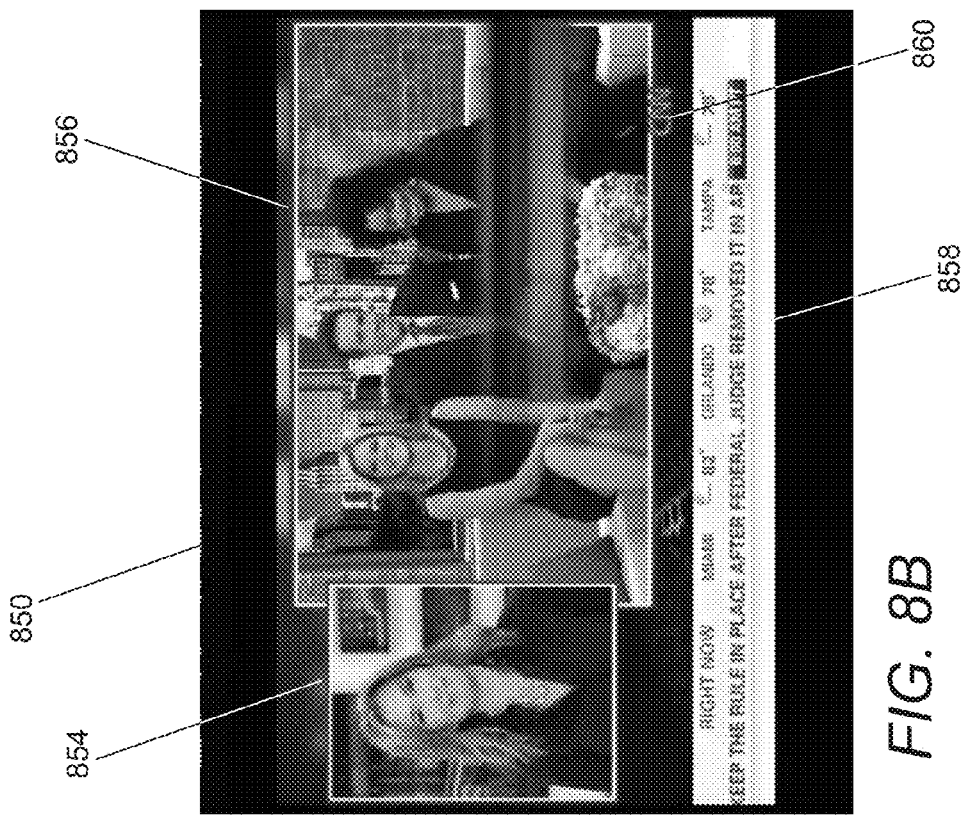

Feature matching between logo images and frames of video in accordance with an embodiment of the invention is illustrated in FIG. 8A. The process involves comparing a logo image 800 with a frame of video 802 and identifying matches 804 between local features in the logo image 806 and in the frame of video 808. When a sufficiently large number of local features are present, a match is identified and factors including (but not limited to) the similarity of the local features can be used to generate a confidence score indicating the reliability of the match. A similar process can be utilized to identify a sequence of frames of video that match a sequence of frames in a transition animation. Local feature matching between frames in transition animations and sequences of frames of video in accordance with embodiments of the invention are illustrated in FIGS. 8B and 8C. A frame from a transition animation that has previously been identified as indicative of a segmentation boundary is illustrated in FIG. 8B. The frame 850 from the transition animation shows two framed pictures 854 and 856, a white ticker bar 858 positioned below the two framed pictures and a logo 860 in the larger (856) of the two frames. Identification of the same features in the frame of video 852 can be indicative of the frame of video 852 belonging to a transition animation. As can readily be appreciated the content within the framed pictures and the ticker differ, however, the presence of a sufficiently large number of local features can be utilized to detect a match between the two frames. In a number of embodiments, additional features such as the presence of an anchorpersons face in the smaller of the two framed pictures can also be utilized in the detection of a frame of a transition animation. In other embodiments, any of a variety of features can be utilized to detect transition animations as appropriate to the requirements of specific applications including (but not limited to) analysis of an audio track to detect a musical accompaniment to a transition animation.

Figure 9:
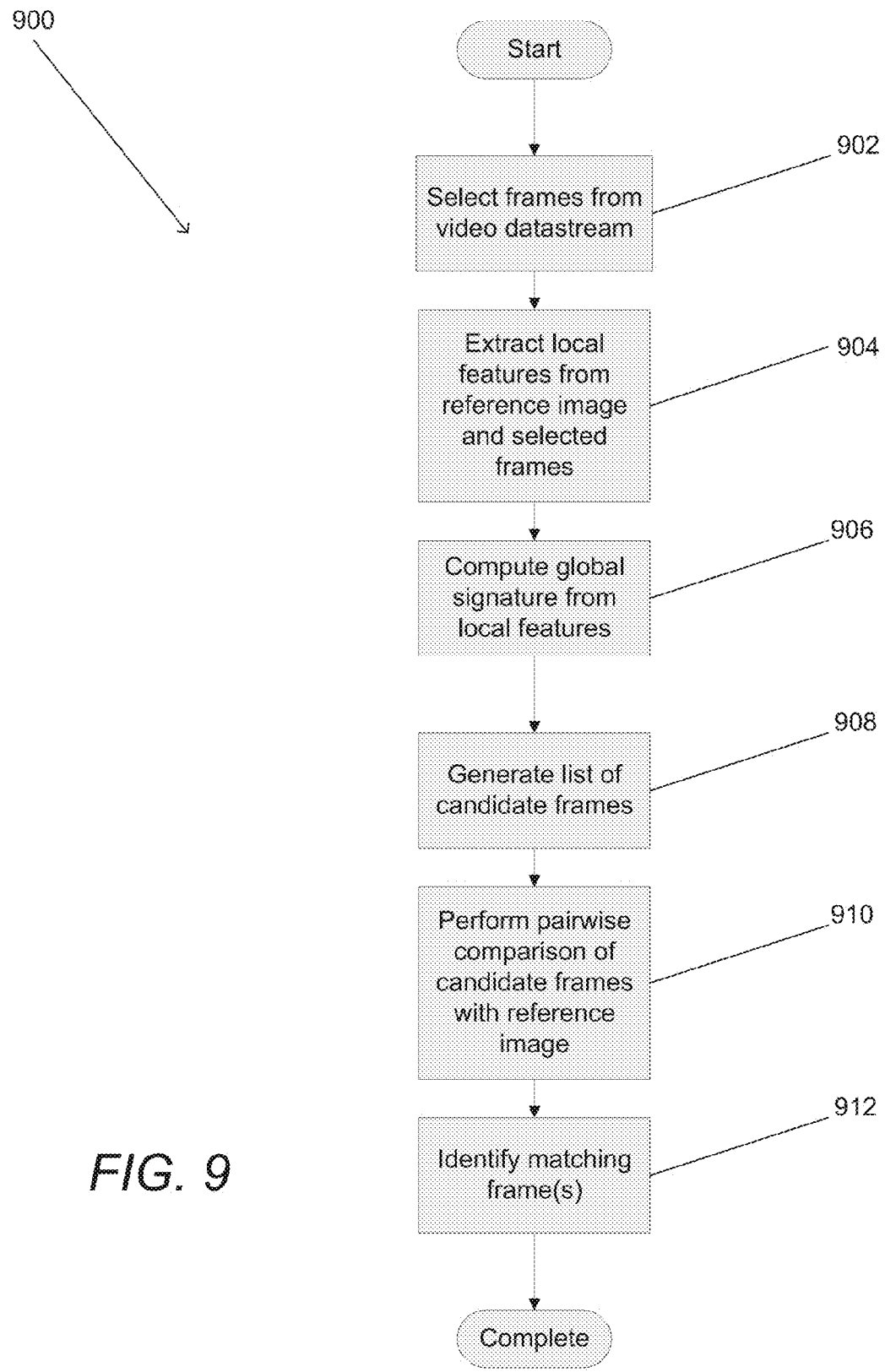
FIG. 9 is a flowchart illustrating a process for identifying a logo and/or transition animation segmentation cue in accordance with an embodiment of the invention.

A specific process for performing feature matching is illustrated in FIG. 9. The process 900 involves selecting (902) frames from a video data stream. Local features can be extracted (904) from a reference image and the selected frames of video. In a number of embodiments, SURF features are extracted using processes similar to those described in H. Bay, A. Ess, T. Tuytelaars, and L. V. Gool, "Speeded-up robust features (SURF)," *Computer Vision and Image Understanding*, vol. 110, no. 3, pp. 346-359, 2008. In other embodiments, any of a variety of processes can be utilized to extract localized features in accordance with embodiments of the invention.

The localized features can be utilized to generate (906) global signatures and the selected frames ranked by comparing their global signatures to the global signature of the reference image. The ranking can be utilized to select (908) a set of candidate frames that are compared in a pairwise fashion (910) with the logo image. In several embodiments, the pairwise comparisons can utilize the techniques described in D. Chen, S. Tsai, V. Chandrasekhar, G. Takacs, R. Vedantham, R. Grezeszczuk, and B. Girod, "Residual enhanced visual vector as a compact signature for mobile visual search," *Signal Processing*, 2012. When the pairwise comparison yields a match exceeding a predetermined threshold, a match is identified (912). As noted above, a match may represent that the candidate frame incorporates a logo and/or that the candidate frame corresponds to a frame from a transition animation. In many embodiments, the process of determining a match also involves determining a confidence metric that can also be utilized in the segmentation of a video data stream.

Although specific processes are described above with references to FIGS. 8A-8C and FIG. 9, any of a variety of processes for comparing features within images can be utilized to detect logos, animations, and/or other features indicative of segmentation boundaries as appropriate to the requirements of specific applications in accordance with embodiments of the invention. Furthermore, as discussed below, the processes described above with respect to FIG. 9 can also be utilized in the indexing of video segments to identify the presence of images associated with additional sources of data within a video segment. While logos and transition animations can be strong indicators of segmentation boundaries in a video data stream, they are not the only visual cues that can be utilized to detect segmentation boundaries. Additional visual cues including dark frames that are indicative of segmentation boundaries are discussed further below.

Detecting Dark Frames

Dark frames are frequently inserted at the boundaries of commercials and hence provide another valuable visual cue for segmentation. In several embodiments, dark frames are detected by converting some or all frames in a video data stream to gray scale and comparing the mean and standard deviation of the pixel intensities. In many embodiments, a frame is determined to be a dark frame if the mean is below $\mu_b$ and the standard deviation is below $\sigma_b$. In several embodiments, values of $\mu_b=40$ and $\sigma_b=10$ can be utilized for gray levels in the range [0, 255]. In other embodiments, any of a variety of processes can be utilized to identify dark frames in accordance with embodiments of the invention, including (but not limited to) processes that identify sequences of multiple dark frames and/or processes that provide a confidence measure that can be utilized by a multi-modal segmentation process in combination with information concerning other cues to determine the likelihood of a transition indicative of a segmentation boundary.

Auditory Cues

In a number of embodiments, an audio track within a data stream can also be utilized as a source of segmentation cues. Anchorpersons commonly pause momentarily or take a long breath before introducing a new story. In several embodiments, significant pauses in an audio track are utilized as a segmentation cue. In many embodiments, a significant pause is defined as a pause in speech having a duration of 0.3 seconds or longer. In other embodiments, any of a variety of classifiers can be utilized to detect pauses indicative of a segmentation boundary in accordance with embodiments of the invention including processes that provide a confidence measure that can be utilized by a multi-modal segmentation process in combination with information concerning other cues to determine the likelihood of a transition indicative of a segmentation boundary. Pauses are not the only auditory cues that can be utilized in the detection of segmentation boundaries. In many embodiments, specific changes in tone and/or pitch can be utilized as indicative of segmentation boundaries as can musical accompaniment that is indicative of a transition to a commercial break and/or between segments.

Although various systems and methods that utilize a variety of segmentation cues in the multi-modal segmentation of video data streams are described above with reference to FIGS. 5A-9, any segmentation process that can be utilized to segment a video data stream in a manner that enables indexing of the video segments for the purposes of generating personalized playlists can be utilized in accordance with embodiments of the invention. Processes for generating personalized video playlists based upon user preferences in accordance with embodiments of the invention are described further below.

Personalized Video Playlist Generation

Playlist generation systems in accordance with many embodiments of the invention are configured to index sets of video segments and generate personalized playlists based upon user preferences. The user preferences can be explicit preferences specified by the user, and/or can be inferred based upon user interactions with previously recommended video segments (i.e. the user's viewing history). In many embodiments, the playlist generation system also generates playlists that are subject to time constraints in recognition of the limited time available to a user to consume content.

Figure 10:
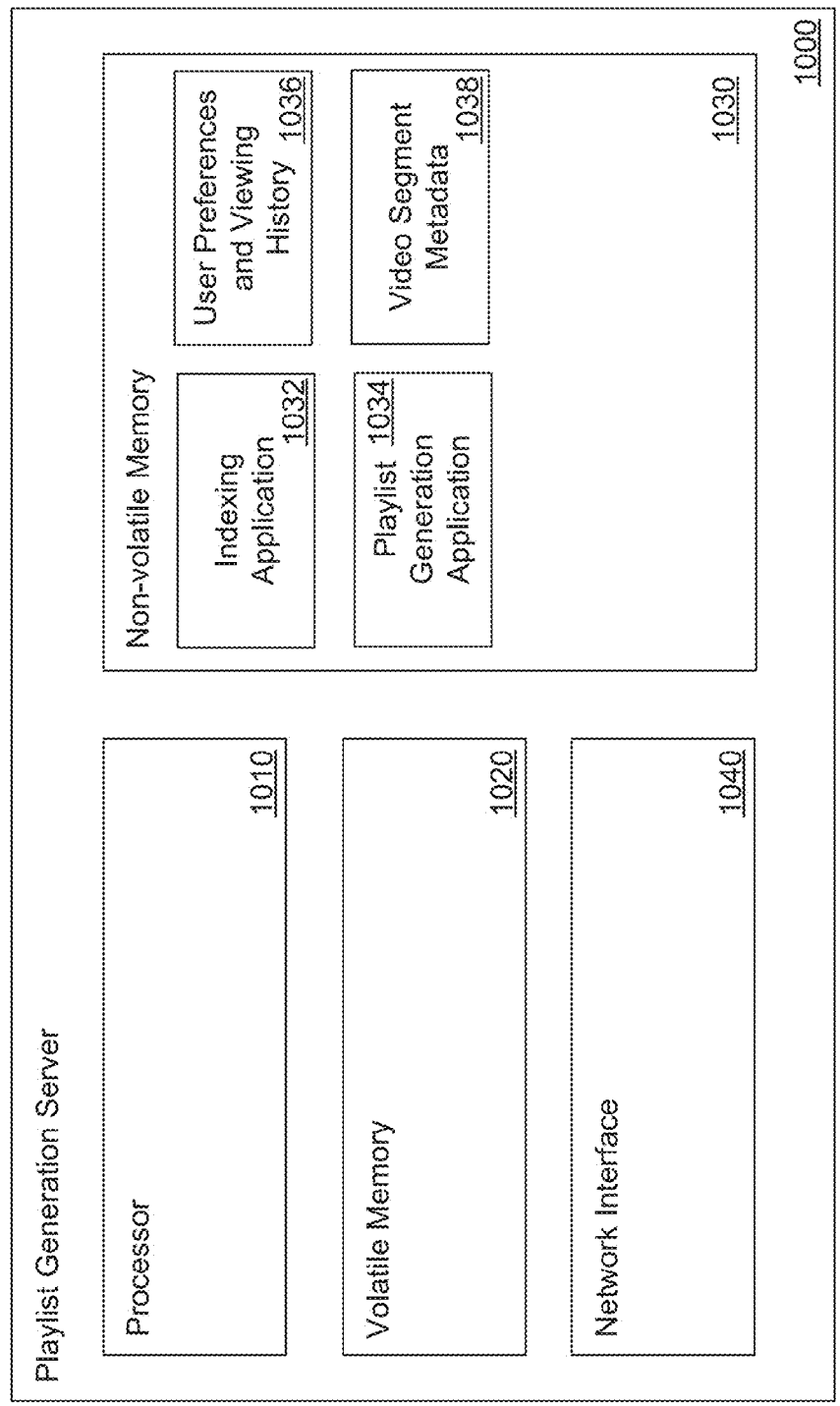
FIG. 10 is a system diagram that conceptually illustrates a playlist generation server in accordance with an embodiment of the invention.

A playlist generation server system configured to index video segments and generate personalized playlists in accordance with an embodiment of the invention is illustrated in FIG. 10. The playlist generation server system 1000 includes a processor 1010 in communication with volatile memory 1020, non-volatile memory 1030, and a network interface 1040. In the illustrated embodiment, the non-volatile memory 1030 includes an indexing application 1032 that configures the processor 1010 to annotate video segments with metadata 1038 describing the content of video segment and generate an index relating video segments to keywords. In several embodiments, the indexing application 1032 configures the processor 1010 to extract metadata from textual analysis of textual data contained within a video segment and visual analysis of video data contained within the video segment. In a number of embodiments, the indexing application 1032 configures the processor 1010 to identify additional sources of relevant data that can be used to further annotate the video segment based upon textual and visual comparisons of the video segment and sources of additional data. In other embodiments, any of a variety of techniques including (but not limited to) manual annotation of video segments can be utilized to associate metadata with individual video segments.

The non-volatile memory 1030 can also contain a playlist generation application 1034 that configures the processor 1010 to generate personalized playlists for individual users based upon information collected by the playlist generation server system 1000 concerning user preferences and viewing histories 1036. Various processes for generating personalized video playlists in accordance with embodiments of the invention are discussed further below.

Although specific playlist generation server system implementations are described above with reference to FIG. 10, any of a variety of architectures including architectures where the indexing application and playlist generation application execute on different processors and/or on different server systems can be utilized to implement network clients in accordance with embodiments of the invention. Processes for annotating and indexing video segments and processes for generating personalized video playlists in accordance with various embodiments of the invention are discussed separately below.

Automated Video Segment Annotation

Metadata describing video segments can be utilized as inputs to a personalized video playlist generation system and to populate the user interfaces of playback devices with descriptive information concerning the video segments. A great deal of metadata describing a video segment can be derived from the video segment itself. Analysis of text data such as closed caption and subtitle text data can be utilized to identify relevant keywords. Analysis of visual data using techniques such as (but not limited to) text recognition, object recognition, and facial recognition can be utilized to identify the presence of keywords and/or named entities within the content. In many instances video segments can also include a metadata track that describes the content of the video segment.

Metadata describing video segments can also be obtained by matching the video segments to additional sources of relevant data. In the context of news stories, video segments can be matched to online articles related to the content of the video segment. In a number of embodiments, visual analysis is used to match portions of images associated with online articles to frames of video as an indication of the relevance of the online article. These sources of additional data (e.g. online news articles or Wikipedia pages) can be used to identify additional keywords describing the content. In addition, online articles matched to specific video segments can be utilized to generate titles for video segments and provide thumbnail images that can be used within user interfaces of playback devices. Hyperlinks to the online articles can also be provided via the user interfaces to enable a user to link to the additional content. In other contexts, any of a variety of data sources appropriate to the requirements of the specific application can be utilized in the generation of user interfaces and/or personalized playlists in accordance with embodiments of the invention.

Figure 11:
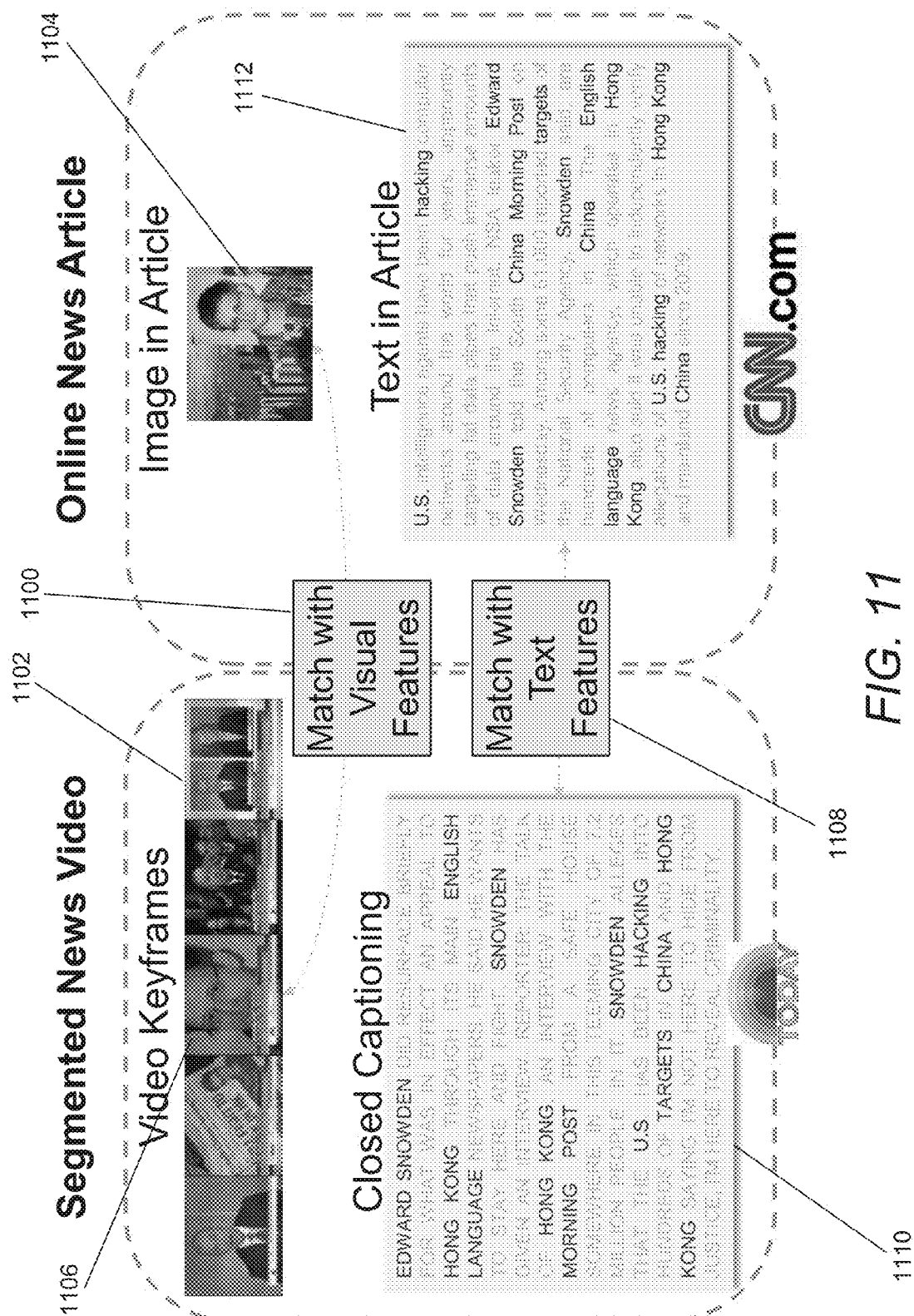
FIG. 11 conceptually illustrates a process for matching video segments to additional sources of data by matching visual and/or text features of the video segments to relevant additional data sources in accordance with an embodiment of the invention.

In several embodiments, visual analysis and text analysis is utilized to match video segments to additional sources of data. A process for matching a segment of video to an online news article in accordance with an embodiment of the invention is conceptually illustrated in FIG. 11. The process involves matching (1100) visual features, which can involve comparing a video segment 1102 to images 104 associated with additional sources of data to identify the presence of at least a portion of the image within at least one frame of video within the video segment. The process can also involve matching (1108) text features. In several embodiments, keywords found in closed caption text data 1110 can be compared to keywords contained in text data 1112 present within additional sources of data.

In a number of embodiments, computational complexity can be reduced by initially performing text analysis to identify candidate sources of additional data. Images related to the candidate sources of additional data can then be utilized to perform visual analysis and the final ranking of the candidate sources of additional data determined based upon the combination of the text and visual analysis. In other embodiments, the text and visual analysis can be performed in alternative sequences and/or independently. Processes for performing text analysis and visual analysis to identify additional sources of data relevant to the content of video segments in accordance with embodiments of the invention are discussed further below.

Text Analysis

In a number of embodiments, sources of text within a video segment including (but not limited to) closed caption, subtitles, text generated by automatic speech recognition processes, and text generated by text recognition (optical character recognition) processes can be utilized to annotate video segments and identify additional sources of relevant data. In the context of video segments that have a temporal relevancy component (e.g. news stories), time stamp metadata associated with additional sources of data and/or dates and/or times contained within text forming part of an additional source of data can be utilized in limiting the sources of additional data considered when determining relevancy. In many instances, the presence of common dates and/or times in text extracted from a video segment and text from an additional data source can be considered indicative of relevance.

In a number of embodiments, bag-of-words histogram comparisons enable matching of text segments with similar distributions of words. In certain embodiments, a term frequency-inverse document frequency (tf-idf) histogram intersection score ($S(H_a, H_b)$) is computed as follows:

$$S(H_a, H_b) = \sum_w idf(w) \cdot \min(H_a(w), H_b(w))$$

$$idf(w) = \log\left(\max_x f(x)\right) - \log(f(w))$$

where, $H_a(w)$ and $H_b(w)$ are the L1 normalized histograms of the words in the two sets of words (i.e. the text from the video segment and the additional data source); and $\{f(w)\}$ is the set of estimated relative word frequencies.

In many embodiments, a candidate additional data source is considered to have been identified when the tf-idf histogram intersection score ($S(H_a, H_b)$) exceeds a predetermined threshold.

In a number of embodiments, the process of identifying relevant sources of additional data places particular significance upon named entities. A database of named entities can be built using sources such as (but not limited to) Wikipedia, Twitter, the Stanford Named Entity Recognizer, and/or Open Calais. String searches can then be utilized to identify named entities in text extracted from a video segment and a potential source of additional data, such as an online article. In several embodiments, the presence of a predetermined number of common named entities is used to identify a source of additional data that is relevant to a video segment. In certain embodiments, the presence of five or more named entities in common is indicative of a relevant source of additional data. In other embodiments, any of a variety of processes can be utilized to determine relevancy based upon named entities including processes that utilize a variety of matching rules such as (but not limited to) number of matching named entities, number of matching named entities that are people, number of matching named entities that are places and/or combinations of numbers of matching named entities that are people and number of matching named entities that are places.

Figure 12:
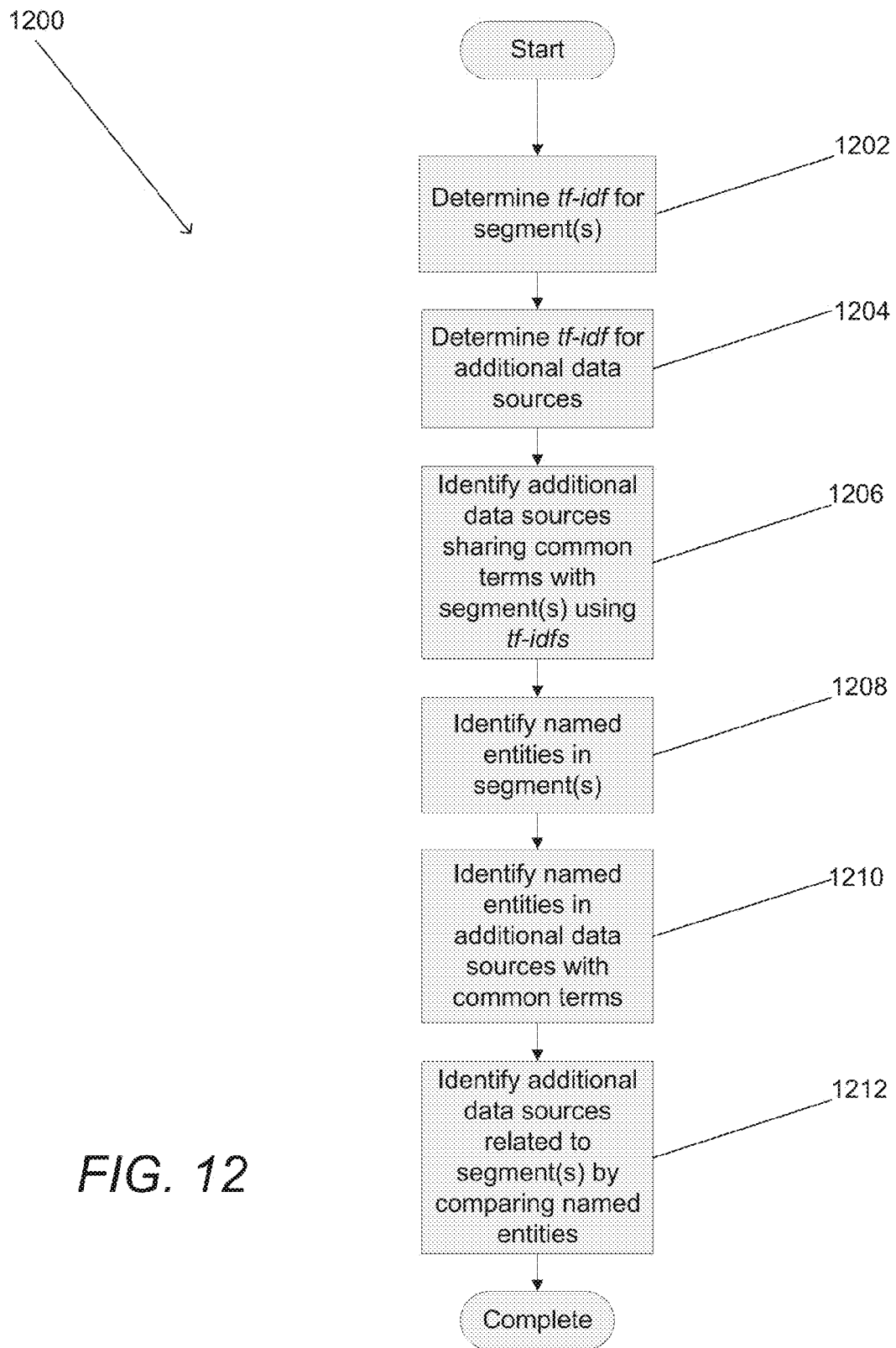
FIG. 12 is a flowchart that illustrates a process for identifying sources of additional data that are relevant to a video segment using text analysis in accordance with an embodiment of the invention.

A process for performing text analysis of video segments to identify relevant sources of additional data in accordance with an embodiment of the invention is illustrated in FIG. 12. The process 1200 includes determining (1202) tf-idf for the annotated video segment(s). Similar processes can be utilized to determine (1204) tf-idf for additional sources of data such as online articles. Processes similar to those outlined above can be utilized to determine (1206) the similarity of the tf-idf histograms of the video segments and the additional sources of data.

In a number of embodiments, the relevancy of additional sources of data to specific video segments can be confirmed by identifying (1208) named entities in text data describing a video segment, identifying (1210) named entities referenced in candidate additional sources of data that share common terms with the video segment, and determining (1212) that an additional source of data relates to the content of a video segment when a predetermined number of named entities are referenced in the text data extracted from the video segment and the additional source of data. As is discussed further below, named entities associated with a video segment can be identified within text data extracted from the video segment and/or by performing object detection and/or facial recognition processes with respect to frames from the video segment.

Although specific processes are described above with reference to FIG. 12, any of a variety of processes can be utilized to identify relevant sources of additional data based upon text extracted from a video segment and the text associated with the additional data source as appropriate to the requirements of specific applications in accordance with embodiments of the invention.

Use of Visual Analysis to Extract Additional Keywords

The frames of a video segment can contain a variety of visual information including images, faces, and/or text. In a number of embodiments, the text analysis processes similar to those described above can be augmented using relevant keywords identified through analysis of the visual information (as opposed to text data) within a video segment. In several embodiments, text recognition processes are utilized to identify text that is visually represented within a frame of video and relevant keywords can be extracted from the identified text. In a number of embodiments, additional relevant keywords can also be extracted from a video segment by performing object detection and/or facial recognition.

Text Recognition

Text extraction processes can be used to detect and recognize letters forming words within frames in a video segment. In several embodiments, the text can be utilized to identify keywords that annotate the video segment. In the context of news stories, keywords such as (but not limited to) "breaking news" can be utilized to categorize news stores both for the purpose of detecting additional sources of data and during the generation of personalized playlists.

In a number of embodiments, text is extracted from frames of video and filtered to identify text that describes the video segment. News stories commonly include title text and identification of the title text can be useful for the purpose of incorporating the title into a user interface and/or for using keywords in the title to identify relevant additional sources of data. In many embodiments, an extracted title is provided to a search engine to identify additional sources of potentially relevant data. In the context of video segments within a specific category or vertical (e.g. news stories), the title can be provided as a query to a vertical search engine (e.g. the Google News search engine service provided by Google, Inc. of Mountain View, Calif.) to identify additional sources of potentially relevant data. In many embodiments, the ranking of the search results is utilized to determine relevancy. In several embodiments, the search results are separately scored to determine relevancy.

Processes for extracting relevant keywords from video segments for use in the annotation of video segments in accordance with embodiments of the invention are illustrated in FIGS. 13A-13D. FIG. 13A is a frame of video containing visual representations of text. As can be seen in FIG. 13B, the text includes the words "BREAKING NEWS" and "THREE MISSING GIRLS FOUND ALIVE", which can be identified using common text recognition processes. In FIG. 13C, another frame of video is shown containing visual representations of text. As can be seen in FIG. 13D, the frame also includes the words "BREAKING NEWS" and the words "WITNESS TO TERROR" that can be identified using common text recognition processes. As can be readily appreciated, the presence of text information such as (but not limited to) scrolling tickers, and logos can introduce a great deal of textual "clutter" in a frame of video. Therefore, processes in accordance with many embodiments of the invention apply filters to recognized text in an effort to identify meaningful keywords. Furthermore, the regions within a frame of video searched using text recognition processes can be restricted to regions likely to contain text descriptive of the content of the video segments.

Figure 14:
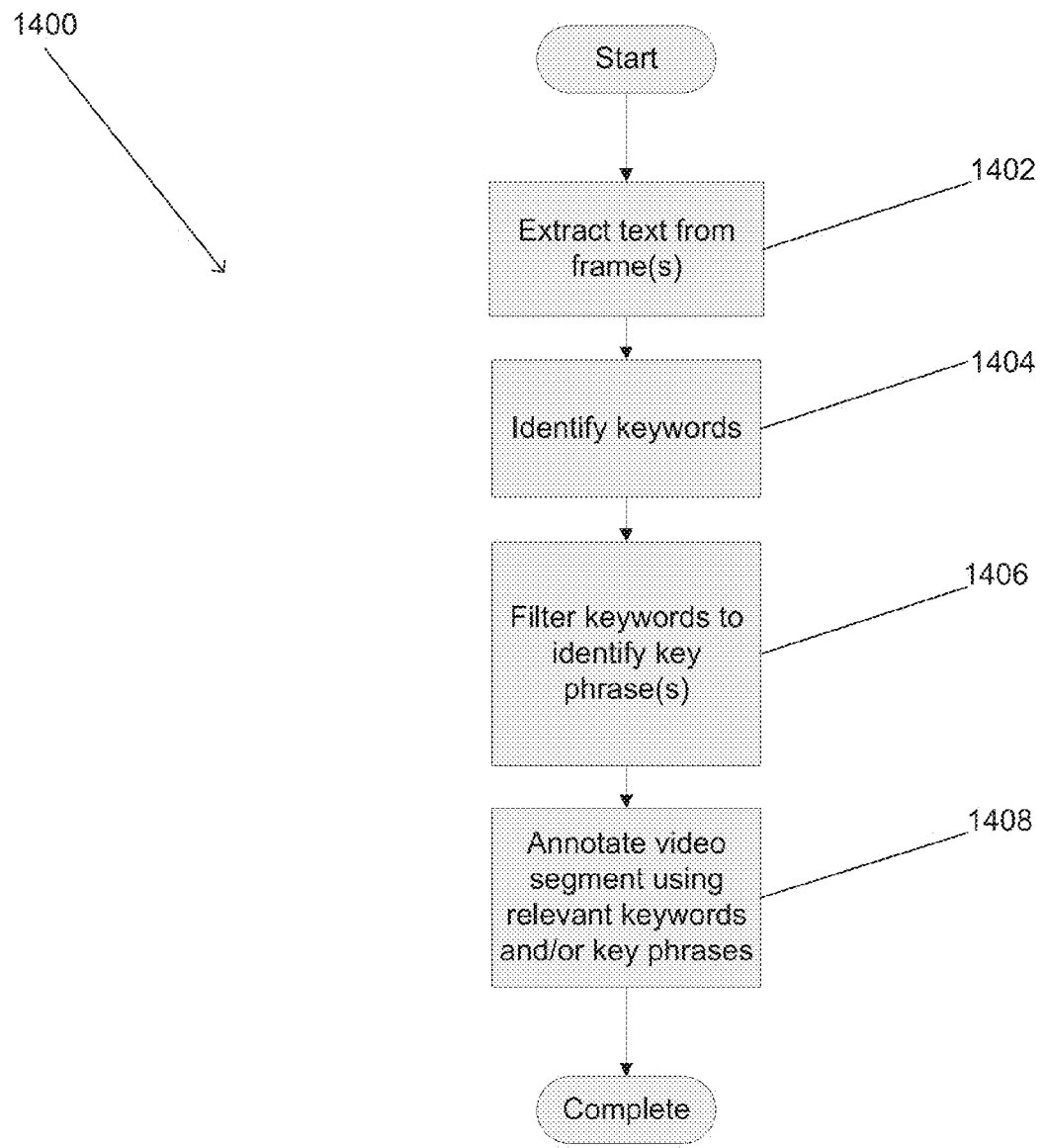
FIG. 14 is a flowchart illustrating a process for obtaining metadata concerning a video segment and/or identifying relevant sources of additional data based upon text extracted from one or more frames of video in accordance with an embodiment of the invention.

A process for extracting relevant keywords from frames of video using automatic text recognition in accordance with an embodiment of the invention is illustrated in FIG. 14. The process 1400 includes extracting (1402) text from one or more frames of video. With the exception of logos, the amount of time that text appears within a video segment can be highly correlated with the importance of the text. Therefore, many embodiments of the invention analyze multiple frames of video and filter text and/or keywords based upon the duration of the time period in which text and/or keywords are visible.

Referring again to the process 1400 shown in FIG. 14, the extracted (1402) text can be analyzed to identify (1404) keywords. The keywords can be filtered (1406) to identify relevant keywords and a library of key phrases, which can be utilized to annotate (1408) the video segment. In several embodiments, the text is filtered for "stop words" and a "stemming" process is applied to the remaining words to increase the matching results. In other embodiments, any of a variety of filtering and/or keyword expansion processes can be applied to recognized text to identify relevant keywords in accordance with embodiments of the invention.

Although specific processes for extracting additional relevant keywords from frames of video by performing automatic text recognition are described above with reference to FIG. 14, any of a variety of processes for annotating video segments using keywords identified by analyzing frames of a video segment using automatic text recognition processes can be utilized as appropriate to the requirements of specific applications in accordance with embodiments of the invention. Additional automatic recognition tasks that can be performed to identify faces and objects during the annotation of video segments in accordance with various embodiments of the invention are discussed further below.

Face Recognition

A variety of techniques are known for performing object detection including various face recognition processes. Processes for detecting anchor faces are described above with respect to video segmentation. As can readily be appreciated, recognizing the people appearing in video segments can be useful in identifying additional sources of data that are relevant to the content of the video segments. In a number of embodiments, similar processes can be utilized to identify a larger number of faces (i.e. more named entities than simply anchorpeople). In other embodiments, any of a variety of processes can be utilized to perform face recognition including processes that have high recognition precision across a large population of faces.

Figure 15:
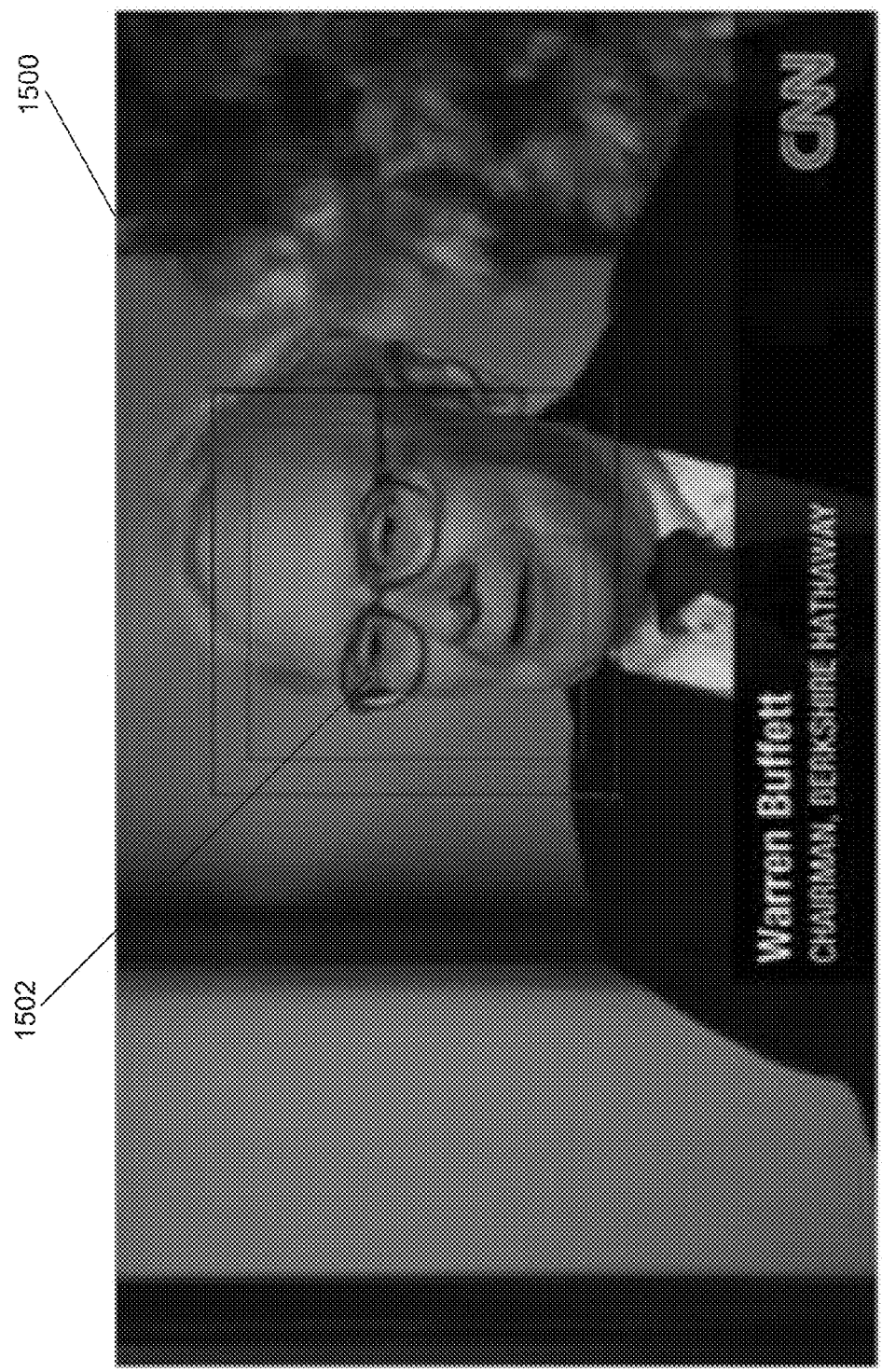
FIG. 15 conceptually illustrates a process for obtaining metadata concerning a video segment by performing face recognition in accordance with an embodiment of the invention.
Figure 16:
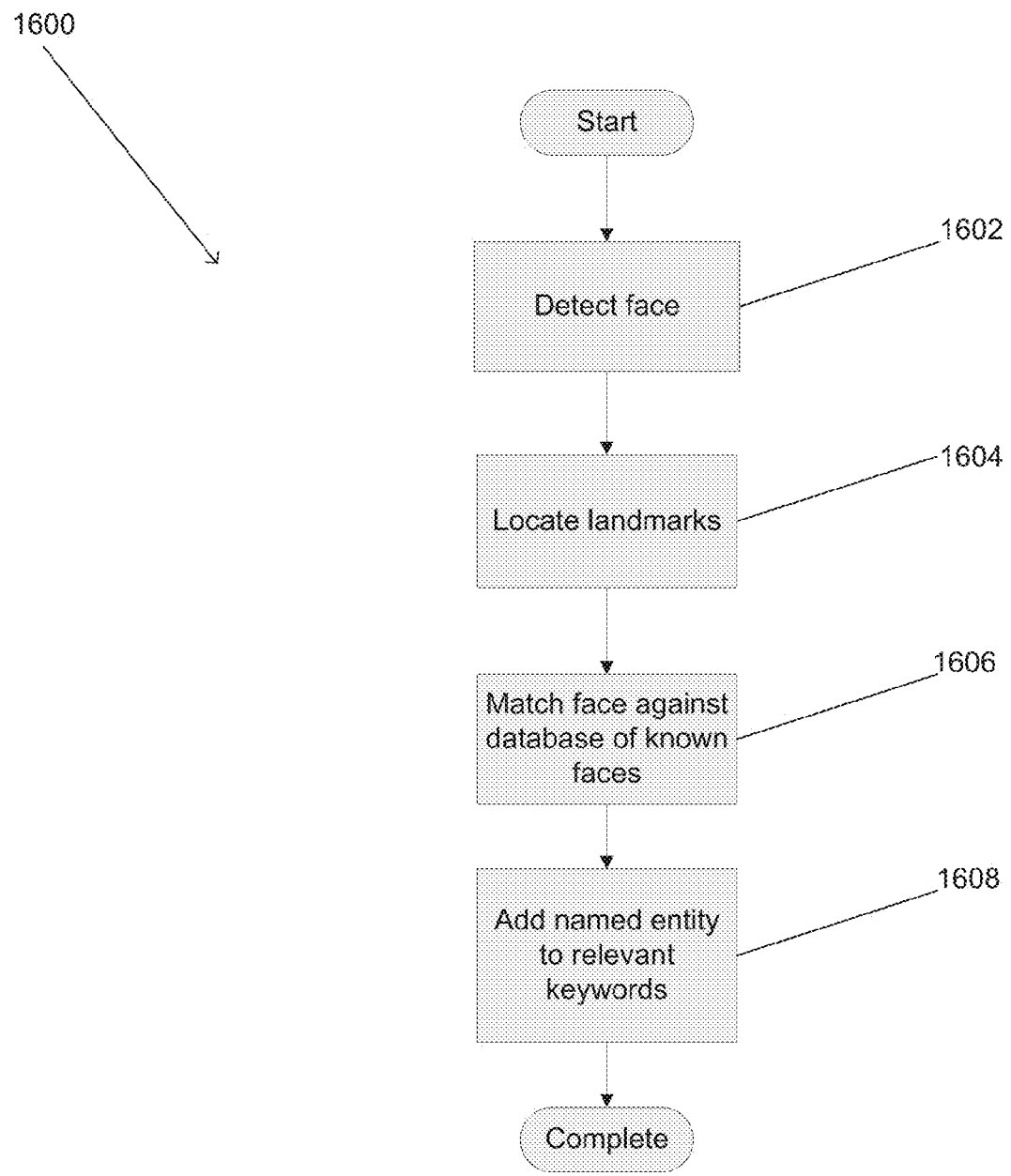
FIG. 16 is a flowchart illustrating a process for obtaining metadata concerning a video segment and/or identifying relevant sources of additional data by performing face recognition in accordance with an embodiment of the invention.

A process for performing face recognition based upon localized features during the annotation of a video segment in accordance with an embodiment of the invention is conceptually illustrated in FIGS. 15 and 16. The frame of video 1500 shown in FIG. 15 is a shot of Warren Buffett, Chairman of Berkshire Hathaway. As can readily be appreciated, the subject of the shot can be ascertained by performing automated text recognition. Alternatively, the presence of Mr. Buffett's face can be identified by performing a process 1600 involving initially performing (1602) a face detection process. A region determined to contain a face can then be analyzed (1604) to locate landmark features 1502 such as the corners of the face's eyes, the tip of the face's nose, and the edges of the face's mouth. As is well known, such features can be utilized to perform facial recognition by matching (1606) the relationship of the landmark features against a database of facial landmark feature geometries. Once a face is recognized, the identity of the person visible in the frame of video can be utilized to annotate (1608) the video segment with a keyword corresponding to a named entity. A confidence score can also be associated with the name entity annotation and utilized in weighting the named entity keyword when identifying additional sources of data.

Although specific processes for annotating video segments with named entity keywords by performing automatic face recognition are described above with reference to FIGS. 15 and 16, any of a variety of object detection processes can be utilized to annotate video segments with relevant keywords as appropriate to the requirements of specific applications in accordance with embodiments of the invention. While the processes described above with reference to FIGS. 13A-16 involve the analysis of visual information contained within frames of a video segment in order to identify keywords that are relevant to the content of the video segment, visual analysis can also be utilized to identify images that are relevant to the content of a video segment. Processes that utilize visual analysis to identify relationships between video segments and images in accordance with various embodiments of the invention are discussed further below.

Using Visual Analysis to Perform Image Linking

Video segments and additional sources of data, such as online articles, often utilize the same image, different portions of the same image, or different images of the same scene. In a number of embodiments, an image portion within one or more frames in a video segment can be matched to an image associated with additional sources of information to assist with establishing the relevancy of additional sources of data. In several embodiments, matching is performed by determining whether the frame of video contains a region that includes a geometrically and photometrically distorted version of a portion of an image obtained from the additional data source. As noted previously, processes similar to those described above with reference to FIG. 9 can be utilized to determine a match between a portion of an image associated with an additional data source and a portion of a frame of video. In other embodiments, any of a variety of techniques can be utilized to determine whether portions of a frame of video and an image associated with an additional data source correspond.

Personalized Playlist Generation

Once a set of video segments is annotated, and index can be generated using keywords extracted from the video segment and/or additional sources of data that are relevant to the content of the video segment. The resulting index and metadata can be utilized in the generation of personalized video playlists. Playlist personalization is a complex problem that can consider user preferences, viewing history, and/or story relationships in choosing the video segments that are most likely to form the set of content that is of most interest to a user. In many embodiments, processes for generating personalized playlists for users involve consideration of a recommended set of content in recognition of the limited amount of time an individual user may have to view video segments. Accordingly, processes in accordance with a number of embodiments of the invention can attempt to select a set of video segments having a combined duration less than a predetermined time period and spanning the content that is most likely to be of interest to the user. In several embodiments, the video segments can be further sorted into a preferred order. In a number of embodiments, the order can be determined based upon relevancy and/or based upon heuristics concerning sequences of content categories that make for "good television". In certain embodiments, the process of generating playlists involves the generation of multiple playlists including a personalized playlist and "channels" of content filtered by categories such as "technology" or keywords such as "Barack Obama". Within categories, user preferences can still be considered in the generation of the playlist. Effectively, the process for generating a personalized video playlist is simply applied to a smaller set of video segments. In the context of news stories, processes for generating personalized playlists in accordance with many embodiments of the invention attempt to provide a comprehensive view of the day's news in a way that avoids duplicate or near-duplicate stories. Additionally, more recent video segments can receive higher weightings. Intuitively, this formulation chooses trending video segments, which originated from news programs the user prefers, and are also associated with categories in which the user is interested.

In many embodiments, the process of generating a personalized playlist is treated as a maximum coverage problem. A maximum coverage problem typically involves a number of sets of elements, where the sets of elements can intersect (i.e. a single element can belong to multiple sets). Solving a maximum coverage problem involves finding the fixed number of elements that cover the largest number of sets of elements. In the context of generating a personalized playlist, the elements are the video segments and video segments that relate to the same content are treated as belonging to the same set. Therefore, the concept of content coverage can be used to refer to the amount of different content covered by a set of video segments. As noted above, video segments can be compared to determine whether the content is related or unrelated. In the context of news stories, many embodiments attempt to span the major news stories of the day and an objective function for solving the maximum coverable problem can be weighted by a linear combination of several personalization factors. These factors can include (but are not limited to) explicit preferences specified by a user, personal information provided by the user and/or obtained from secondary sources including (but not limited to) online social networks, and implicit preferences obtained by analyzing a user's viewing history. Information concerning implicit preferences may be derived by analyzing a user's viewing history with respect to playlists generated by a playlist generation server system. In other embodiments, implicit preferences can be derived from additional sources of information including (but not limited to) a user's browsing activity (especially with respect to online articles relevant to video segment content), activity within an online social network, and/or viewing history with respect to video and/or audio content provided by one or more additional services.

Figure 17:
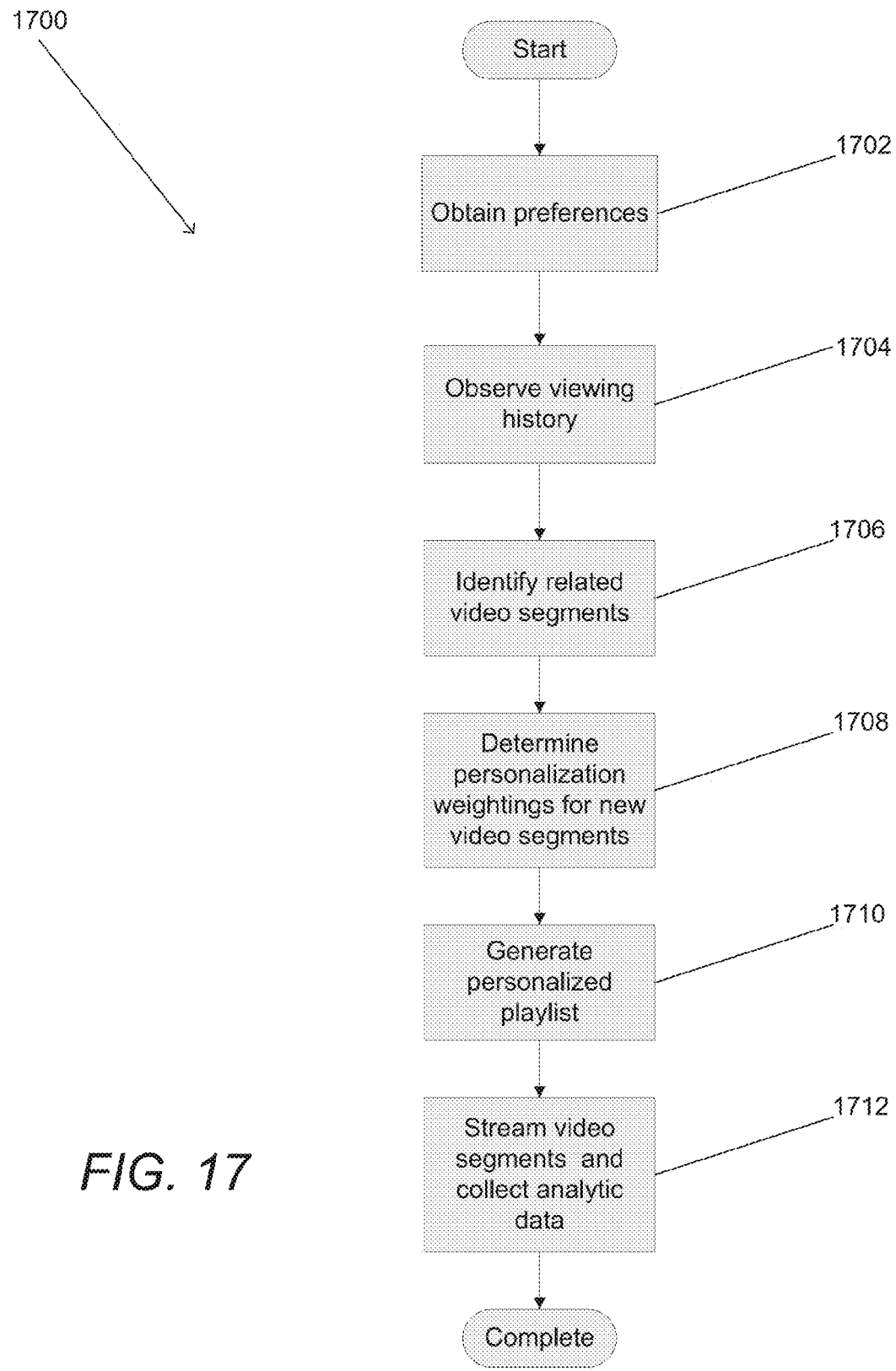
FIG. 17 is a flowchart illustrating a process for generating a personalized playlist based upon a set of video segments, user preferences, and/or a user's viewing history in accordance with an embodiment of the invention.

A process for generating personalized playlists from metadata describing a set of video segments based upon user preferences in accordance with an embodiment of the invention is illustrated in FIG. 17. The process 1700 involves obtaining (1702) user preferences, which can involve observing (1704) a user's viewing history. In many embodiments, the process of generating personalized playlists utilizes metadata identifying video segments having related content or cumulative content. In a number of embodiments, related video segments are identified (1706) and personalization weightings can be determined (1708) for a new set of video segments form which the personalized playlists will be generated based upon metadata describing the video segments. In several embodiments, metadata describing the relationships between video segments and the personalization weightings are utilized to generate (1710) personalized playlists. In a number of embodiments, the process of generating a personalized playlist can be constrained by a specified cumulative playback duration of the video segments identified in the playlist.

Personalized playlists can be provided to playback devices, which can utilize the playlists to stream (1712), or otherwise obtain, the video segments identified in the playlist and to enable the user to interact with the video segments. In several embodiments, the playback devices and/or the playlist generation server system to collect analytic data based upon user interactions with the video segments and/or additional data sources identified within the playlist. The analytic information can be utilized to improve the manner in which personalization ratings are determined for specific users so that the playlist generation process can provide more relevant content recommendations over time.

Although specific processes for performing personalized playlist generation with respect to a set of video segments based upon user preferences are described above with reference to FIG. 17, any of a variety of processes can be utilized to perform playlist generation based upon metadata describing a set of video segments and information concerning user preferences in accordance with embodiments of the invention. As noted above, information concerning relationships between video segments and specifically with respect to the cumulative nature of video segments can be highly relevant in the generation of personalized playlists for certain types of video content including (but not limited to) news stories. Processes for identifying related and/or cumulative content in accordance with various embodiments of the invention are discussed further below.

Identifying Related Video Segments

As is discussed in further detail below, playlist generation processes in accordance with many embodiments of the invention rely upon information concerning the relationships between the content in video segments to identify the greatest amount of information that can be conveyed within the shortest or a specified time period. In the context of video segments extracted from news programming, related video segments can be considered to be video segments that relate to the same news story. In many embodiments, care is taken when classifying two video segments relating to the same content as "related" to avoid classifying a video segment that includes updated information as related in the sense of being cumulative. In many embodiments, a video segment that contains additional information can be identified as a primary video segment and a video segment containing an earlier version of the content and/or a subset of the content can be classified as a related or cumulative video segment. In this way, a related classification can be considered hierarchical or one directional. Stated another way, the classification of a first segment as related to a second segment does not imply that the second segment is related to (cumulative of) the first segment. In many embodiments, however, only bidirectional relationships are utilized.

Figure 18:
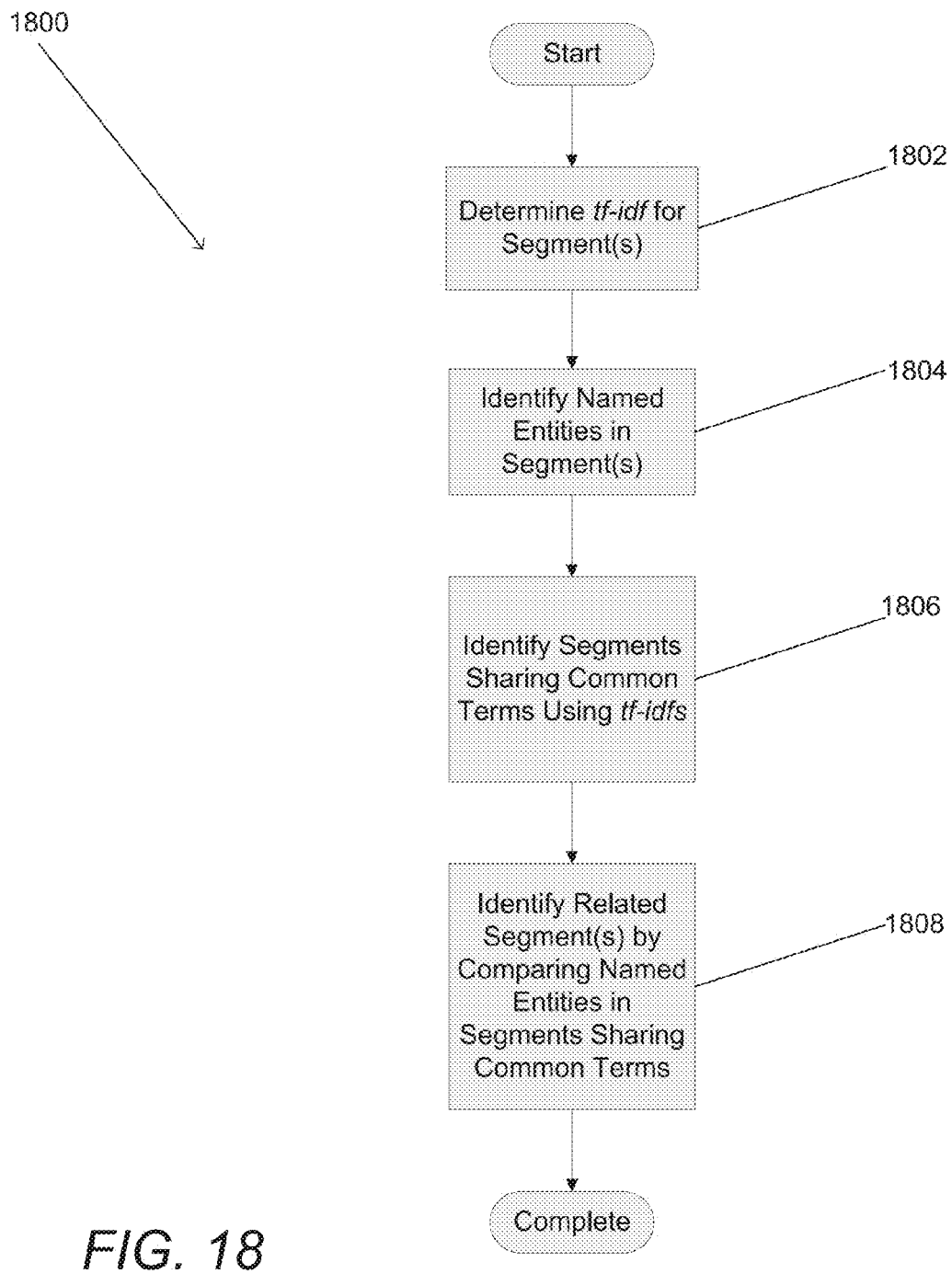
FIG. 18 is a flowchart illustrating a process for identifying related video segments in accordance with an embodiment of the invention.

A process for identifying whether a first video segment is cumulative of the content in a second video segment based upon keywords associated with the video segments in accordance with an embodiment of the invention is illustrated in FIG. 18. The process 1800 includes determining (1802) the tf-idf histograms for both of the video segments and (1804) lists of named entities associated with each of the segments. A decision concerning whether one of the video segments is cumulative of the other can be made by comparing the tf-idf histograms in the manner described above with respect to FIG. 12. In the event that the tf-idf histograms are determined to be sufficiently similar, a determination that one of the video segments is cumulative of the other video segment (or that both video segments are cumulative of each other) can be determined by comparing (1808) whether the number of shared named entities exceeds a predetermined threshold.

Although specific processes for identifying whether one video segment is cumulative of another are described above with respect to FIG. 18, any of a variety of processes for determining whether the content of a first video segment is cumulative of a second video segment can be utilized as appropriate to the requirements of specific applications in accordance with embodiments of the invention. Furthermore, processes that identify relationships other than the cumulative nature of video segments such as processes that determine visual similarity between shots can be utilized to identify appealing and/or dominant shots for within video segments can be utilized in a variety of contexts. The manner in which metadata describing the relationships between video segments can be utilized in the generation of personalized video playlists in accordance with various embodiments of the invention is discussed further below.

Generating Personalize Playlists Using Integer Linear Programming Optimization

In several embodiments, personalized playlists are generated by formalizing the problem of generating a playlist for a user as an integer linear programming optimization problem, or more specifically a maximum coverage problem, as follows:

$$\text{maximize } w_{coverage} \sum_{i=1}^{n} y_i + c^T x$$

$$\text{subject to } Rx \geq y$$

$$d^T x \leq t$$

where n is the number of today's videos, $w_{coverage}$ represents a weighting applied to the news story coverage relative to user preferences, x is a vector including an element for each identified video segment, where for $i \in [1 \ldots n]$, $x_i \in \{0,1\}$ is 1 if the $i^{th}$ video segment is selected, y is a vector including an element for each identified video segment, where for $i \in [1 \ldots n]$, $y_i \in \{0,1\}$ is 1 if $x_i$ is covered by a video segment that has been already selected, c is a vector representing a set of personalization weights $c_i$ determined with respect to each video segment $x_i$ based upon user preferences, and $R \in \{0,1\}^{n \times n}$ denotes an adjacency matrix, where 1 represents a link between news stories.

In the above formulation, duration of the news story and time limitations are represented by $d_i$ and t accordingly. As can readily be appreciated, the above objective function maximizes a weighted combination of the coverage of the day's new stories achieved within a specified time period ($w_{coverage} \Sigma_{i=1}^{n} y_i$) and the user's preferences ($c^T x$).

In a number of embodiments, factors including (but not limited to) a user's preferences with respect to sources and/or categories of video segments ($s_{source}$, $s_{category}$), recency ($s_{time}$), and viewing history ($s_{history}$) are considered in calculating the personalization weights c. In several embodiments, viewing history ($s_{history}$) can be determined based upon the number of related news stories, which were watched previously by the user. In several embodiments, processes for detecting related and/or similar stories similar to those described above with respect to FIG. 18, but with relaxed matching criteria, can be utilized to identify similar video segments previously watched by a user. In a number of embodiments, a separate novelty metric is determined as part of the process of identifying similar stories and the novelty metric can be used to assess the extent to which the content of two similar video segments differs. In a number of embodiments, the novelty metric is related to the number of words that are not common between the two video segments. In other embodiments, any of a variety of factors can be considered in the calculation of a novelty metric. The overall weightings $c_i$ for a video segment $v_i$ from the set of n recent video segments v can be expressed as follows:

$$c_i = w_{source} \cdot s_{source}(v_i) + w_{category} \cdot s_{category}(v_i) + w_{time} \cdot s_{time}(v_i) + w_{history} \cdot s_{history}(v_i)$$

As can readily be appreciated, the weights can be selected arbitrarily and updated manually and/or automatically based upon user feedback.

In certain embodiments, $s_{time}(v_i)$ and $s_{history}(v_i)$ are defined as follows:

$$s_{time}(v_i) = time_{v_i} - time_{current}$$

$$s_{history}(v_i) = \sum_{w \in Videos} related(v_{i,w})$$

where, Videos is a set of all video segments (i.e. not just the recent segments v).

The function $related(v_i, w) \in \{0,1\}$ is 1 if video segments $v_i$ and w are linked. In several embodiments, a process similar to any of the processes described above with respect to FIG. 18 can be utilized to determine whether stories are cumulative. As can readily be appreciated, the links identified by such processes are very specific in the sense that the process is intended to identify video segments that contain the same or very similar content. Accordingly, processes in accordance with many embodiments of the invention may (also) attempt to draw more general conclusions concerning viewing history such as keyword preferences, topic preferences, and source preferences. In certain embodiments, video segments can be marked as related (i.e. $related(v_i, w) = 1$) based upon preferences identified in this manner. Alternatively, more general preferences can be utilized to modify source and/or category preference scores that are separately used to weight video segments. As can readily be appreciated, any of a variety of processes for scoring a specific video segment based upon viewing history can be utilized in accordance with embodiments of the invention.

Once a set of video segments is identified, a variety of choices can be made with respect to the ordering of the set of video segments to generate a playlist. In a number of embodiments, the "importance" of a video segment can be scored and utilized to determine the order in which the video segments are presented in a playlist. In several embodiments, importance can be scored based upon factors including (but not limited to) the number of related video segments. In the context of news stories, the number of related video segments within a predetermined time period can be indicative of breaking news. Therefore, the number of related video segments to a video segment within a predetermined time period can be indicative of importance. In other embodiments, any of a variety of techniques can be utilized to measure the importance of a video segment as appropriate to the requirements of specific applications. In a number of embodiments, the content of the video segments is utilized to determine the order of the video segments in a personalized video playlist. In several embodiments, sentiment analysis of metadata annotating a video segment can be utilized to estimate the sentiment of the video segment and heuristics utilized to order video segments based upon sentiment. For example, a playlist may start with the most important story. Where the story has a negative sentiment (a dispatch from a warzone), the process can select a second story that has more uplifting sentiment. As can readily be appreciated, machine learning techniques can be utilized to determine processes for ordering stories from a set of stories to create a personalized playlist as appropriate to the requirements of specific applications in accordance with embodiments of the invention.

Although specific processes are described above for generating personalized video playlist using integer linear programming optimization process, any of a variety of processes can be utilized to generate personalized video playlists using a set of video segments based upon user preferences in accordance with embodiments of the invention including processes that indirectly consider viewing history by modifying source and category weightings. Furthermore, processes in accordance with many embodiments of the invention consider other user preferences including (but not limited to) keyword and/or named entity preferences.

Playback Devices

Personalized video playlists can be provided to a host of playback devices to enable viewing of video segments and/or additional data sources identified in the playlists. In a number of embodiments a playback device is configured via a client application to render a user interface based upon metadata describing video segments obtained using the playlist. Playback devices can also be configured to provide a "second screen" display that can enable control of playback of video segments on another playback device and/or viewing of additional video segments and/or data related to the video segment being played back on the other playback device. As can readily be appreciated, the user interfaces that can be generated by playback devices are largely only limited by the capabilities of the playback device and the requirements of specific applications.

Figure 19:
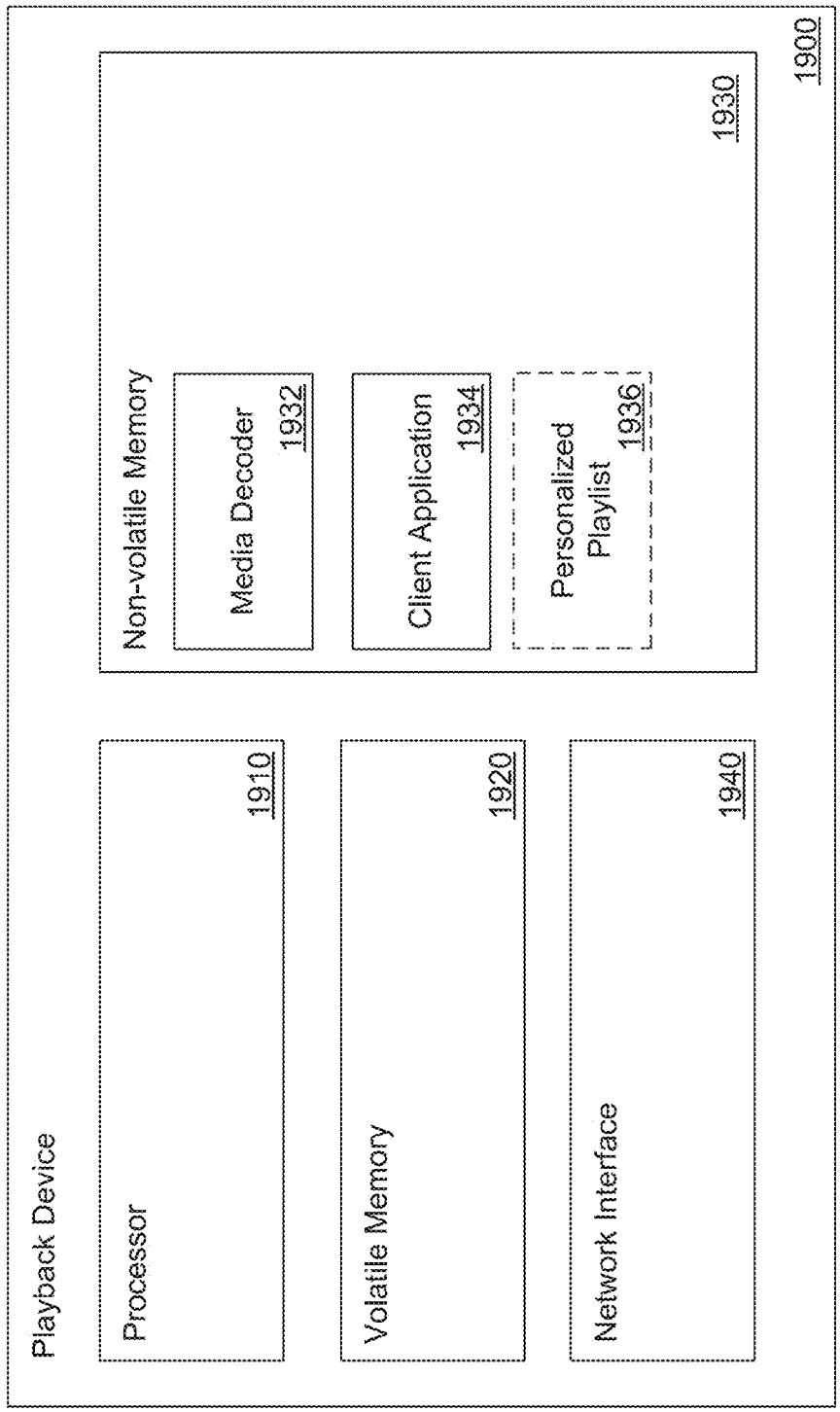
FIG. 19 is a system diagram that conceptually illustrates a playback device configured to retrieve a personalized playlist and select video segments for playback utilizing the personalized playlist in accordance with an embodiment of the invention.

A playback device in accordance with an embodiment of the invention is illustrated in FIG. 19. The playback device 1900 includes a processor 1910 in communication with volatile memory 1920, non-volatile memory 1930, and a network interface 1940. In the illustrated embodiment, the non-volatile memory 1930 includes a media decoder application 1932 that configures the processor 1010 to decode video for playback via display device a client application 1934 that configures the processor to render a user interface based upon metadata describing video segments contained within a personalized playlist 1926 retrieved from a playlist generation server system via the network interface 1940.

Although specific playback device implementations are illustrated in FIG. 19, any of a variety of playback device architectures can be utilized to playback video segments identified in a personalized playlists in accordance with embodiments of the invention. User interfaces generated by playback devices that enable viewing and interaction with video segments identified in personalized playlists in accordance with embodiments of the invention are described further below.

User Interfaces

The user interface generated by a playback device based upon a personalized playlist is typically determined by the capabilities of a playback device. In many embodiments, instructions for generating a user interface can be provided to a playback device by a remote server. In several embodiments, the instructions can be in a markup and/or scripting language that can be rendered by the rendering engine of a web browser application on a computing device. In a number of embodiments, the remote server provides structured data to a client application on a playback device and the client application utilizes the structured data to populate a locally generated user interface. In other embodiments, any of a variety of approaches to generating a user interface can be utilized in accordance with an embodiment of the invention.

Figure 20A:
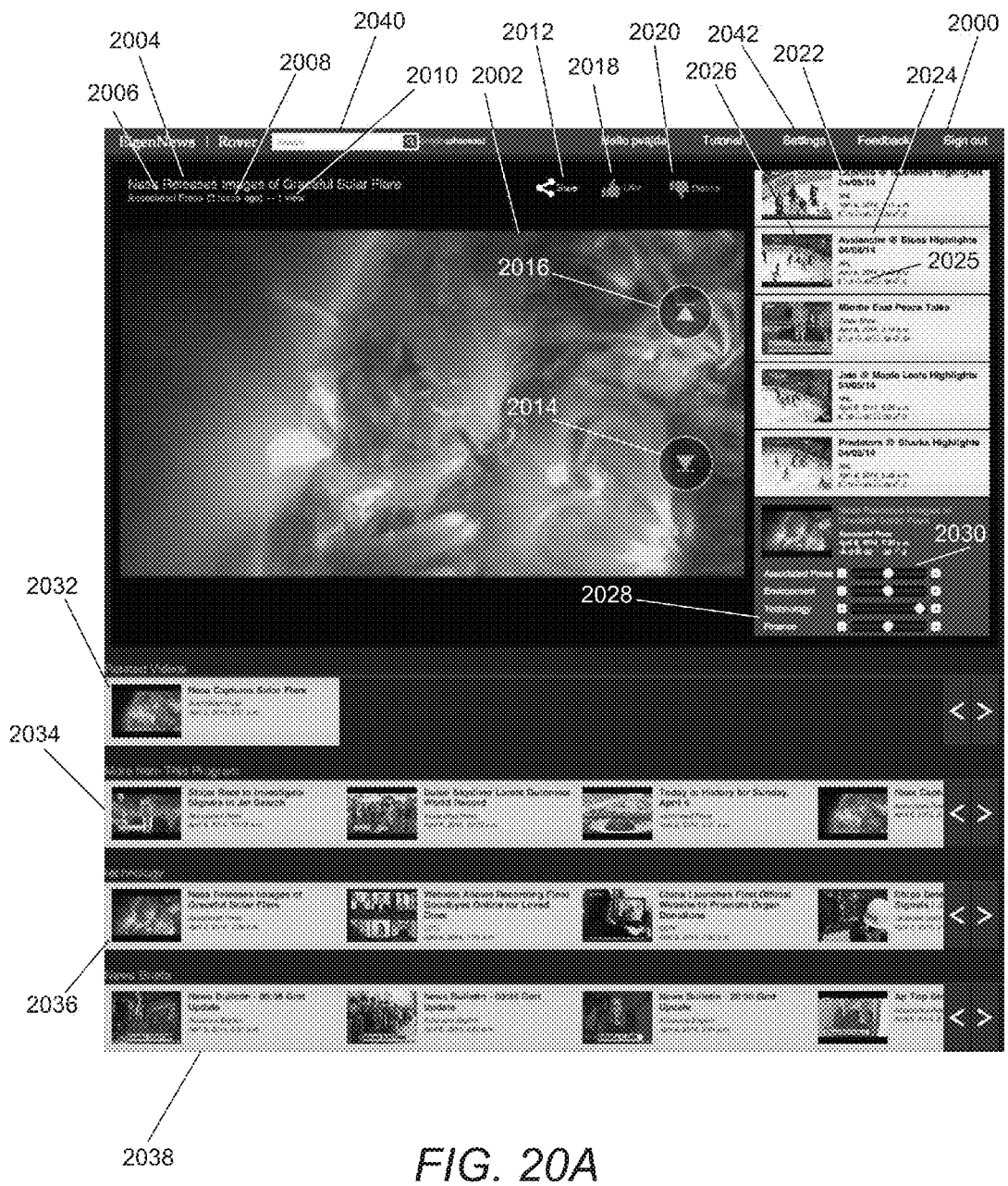
FIG. 20A conceptually illustrates a user interface generated by a playback device using a personalized playlist in accordance with an embodiment of the invention.

A user interface rendered by the rendering engine of a web browser application in accordance with an embodiment of the invention is illustrated in FIG. 20A. The user interface 2000 includes a player region 2002 in which a video segment is played back. The video segment being played back via the user interface is described by displaying the video segment's title 2004, source 2006, recency 2008, and number of views 2010 above the player region 2002. As can readily be appreciated, any of a variety of information describing a video segment being played back within a player region can be displayed in any location(s) within a user interface as appropriate to the requirements of specific applications.

In the illustrated embodiment, the player region 2002 includes user interface buttons for sharing a link to the current story 2012, skipping to the previous 2014 or next story 2016 and expressing like 2018 or dislike 2020 toward the story being played back within the player region 2002. In other embodiments, additional user interface affordances can be provided to facilitate user interaction including (but not limited to) user interface mechanisms that enable the user to select an option to follow stories related to the story currently being played back within the player region 2002.

The user interface also includes a personalized playlist 2022 filled with tiles 2024 that each include a description 2025 of a video segment intended to interest the user and an accompanying image 2026. In many embodiments, tiles 2024 in the playlist 2022 can also be easily reordered or removed. In the illustrated embodiment, the tile at the bottom of the list 2028 contains a description of the video segment being played back in the player region. The tile also contains sliders 2030 indicating categories, sources, and/or keywords for which a user has or can provide an explicit user preference. In this way, the user is prompted to modify previously provided user preference information and/or provide additional user preference information during playback of the video segment. In other embodiments, any of a variety of affordances can be utilized to directly obtain user preference information via a user interface in which video segments identified within a playlist are played back as appropriate to the requirements of specific applications.

Beneath the player region 2002, there are several menus for video segment exploration showing: video segments related to the current video segment 2032, other (recent) video segments from the same source 2034, video segments from "channels" (i.e. playlists) generated around a specific category and/or keyword(s) 2036, and news briefs 2038 (i.e. aggregations of video segments across one or more sources to provide a news summary). As can readily be appreciated, any of a variety of playlists can be generated utilizing video segment metadata annotations generated in accordance with embodiments of the invention. Various processes for generating news brief video segments in accordance with embodiments of the invention are discussed further below.

At the top of the displayed user interface 2000, there is a search bar 2040 for receiving a search query. In several embodiments, the query is executed by comparing keywords from the query to keywords contained within the segment of video content (e.g. speech, closed caption, metadata). In a number of embodiments, the query is executed by also considering the presence of keywords in additional sources of information that were determined to be related to the video segment during the process of generating the personalized playlist. As can readily be appreciated, indexes relating keywords to video segments that are constructed as part of the process of generating personalized playlists can also be utilized to generate lists of video segments in response to text based search queries in accordance with embodiments of the invention. Implementation of various video search engines in accordance with embodiments of the invention are described further below.

Figure 20B:
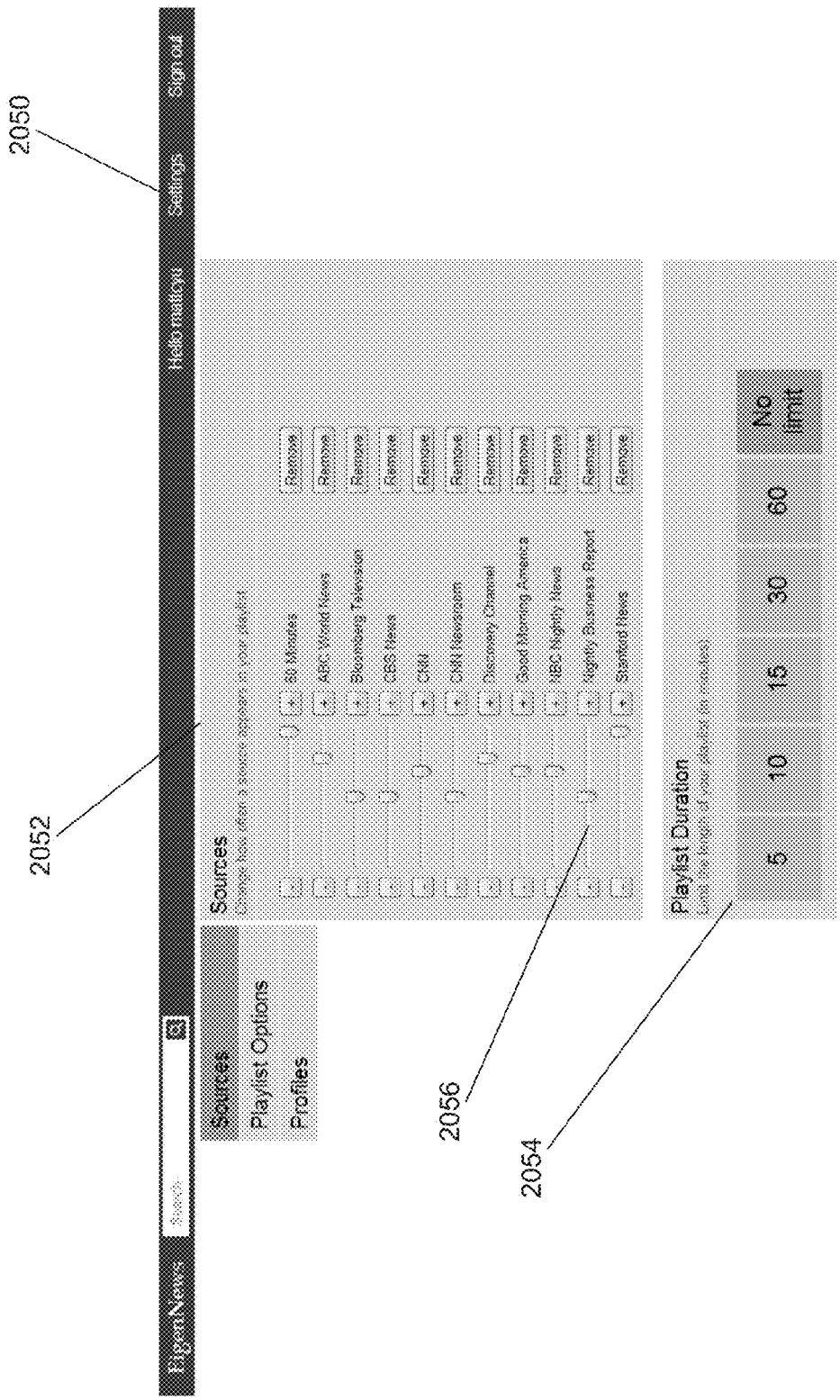
FIG. 20B conceptually illustrates a user interface generated by a playback device that enables a user to specify a preferred duration and user preferences with respect to specific categories, sources of video content, and/or keywords in accordance with an embodiment of the invention.

The displayed user interface 2000 also includes an option 2042 to enter a settings menu for adjusting preferences toward different categories of video content and/or sources of video content. A settings menu user interface in accordance with an embodiment of the invention is illustrated in FIG. 20B. The settings menu user interface 2050 includes a set of sliders 2052 indicating user preferences provided and/or inferred based upon a user's viewing history. A user can adjust an individual slider 2046 to modify the weighting attributed to the corresponding attribute of a video segment. In several embodiments, the user can add and/or remove any of a variety of factors to the list of factors considered by a playlist generation system. In several embodiments, the settings menu user interface can include a set of options 2056 that a user can select to specify a playlist duration. As noted above, playlist duration is a factor that can be considered in the selection of video segments to incorporate within a personalized playlist. In other embodiments, user preference information can be obtained via any of a variety of affordances provided via a user interface of a playback device as appropriate to the requirements of a specific application.

Mobile User Interfaces

Figure 21A:
FIG. 21A conceptually illustrates a user interface generated by a playback device that employs a gesture based user interface during playback of a video segment in accordance with an embodiment of the invention.
Figure 21B:
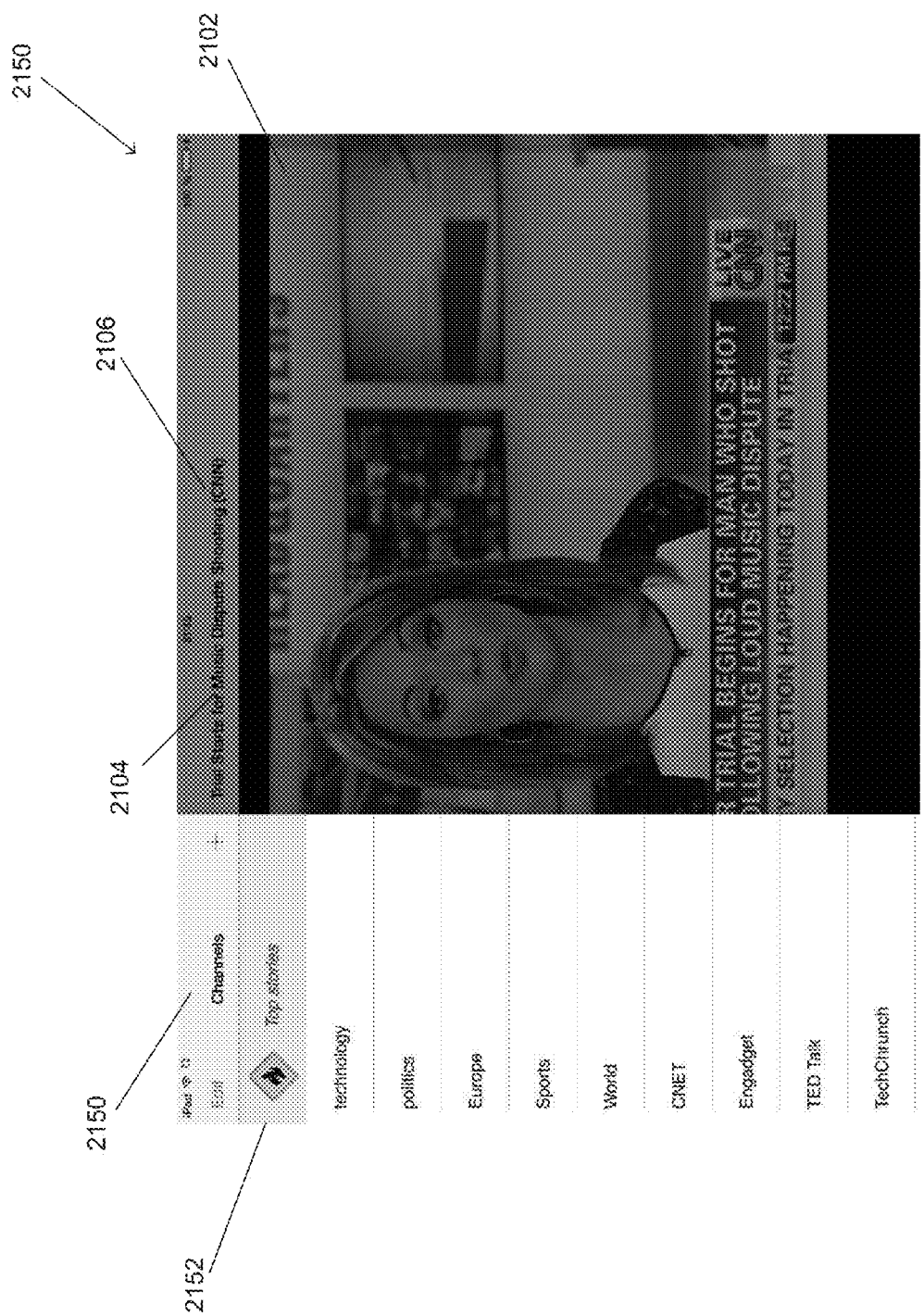
FIG. 21B conceptually illustrates a user interface generated by a playback device that employs a gesture based user interface displaying available channels of video segments in accordance with an embodiment of the invention.

The display and input capabilities of a playback device can inform the user interface provided by the playback device. A user interface for a touch screen computing device, such as (but not limited to) a tablet computer, in accordance with an embodiment of the invention is illustrated in FIG. 21. The user interface 2100 includes a player region 2102 in which a video segment is played back. Due to the limited display size, the majority of the display is devoted to the playback region, however, the title 2104 and source 2016 of the video segment being played back is displayed above the player region 2102. The user interface also includes a channels button 2108 that can be selected to display a list of available playlists. A screen shot of a user interface in which channels are displayed in accordance with an embodiment of the invention is illustrated in FIG. 21B. The channels list 2150 includes the personalized playlist of video segments 2152 and selections for personalized playlists generated by filtering video segments based upon specific categories, sources, and/or keywords.

Figure 22A:
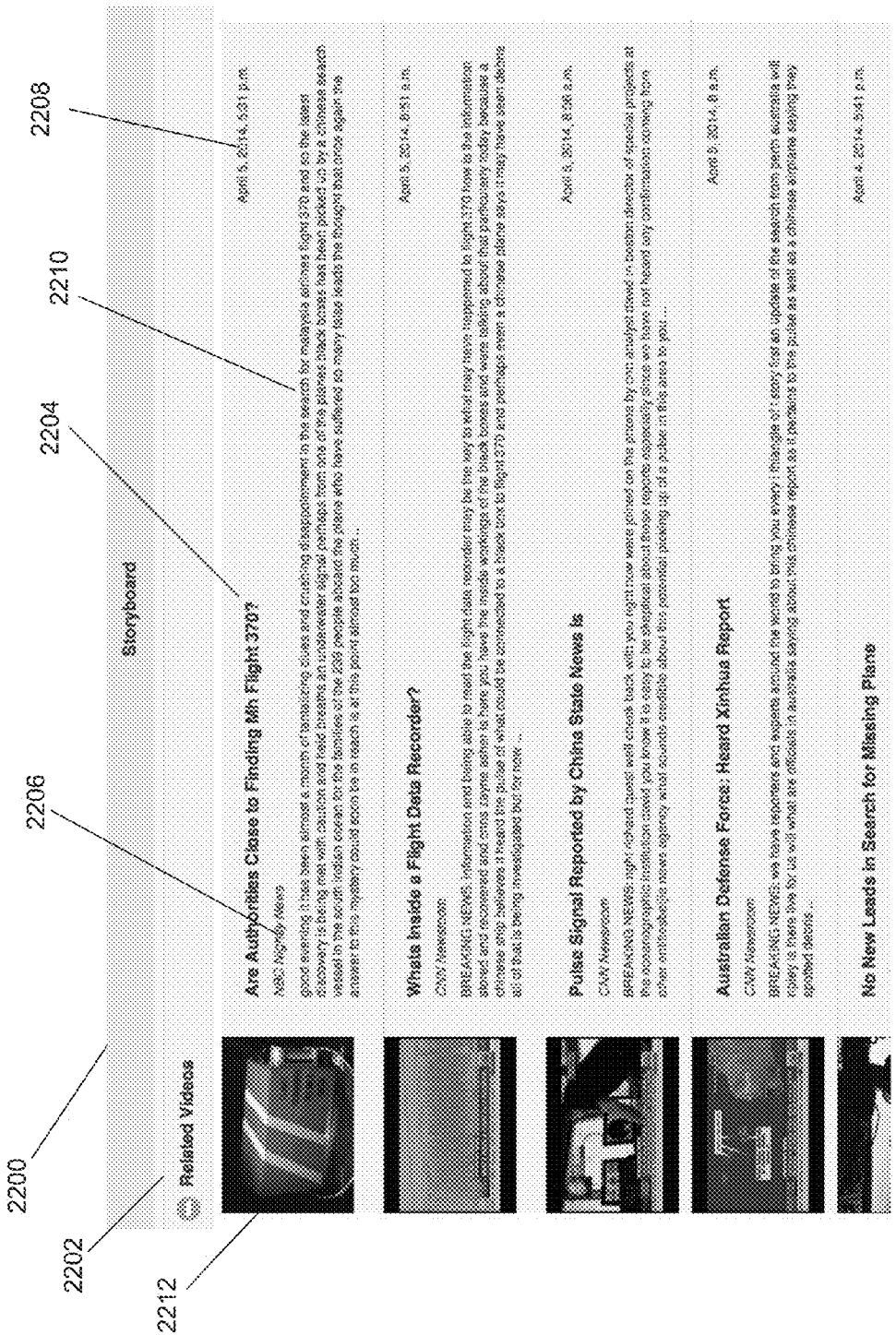
FIG. 22A conceptually illustrates a "second screen" user interface generated by a playback device that provides information concerning related video segments to a video segment being played back on another playback device in accordance with an embodiment of the invention.

In a number of embodiments, a mobile computing device such as (but not limited to) a mobile phone or tablet computer can act as a second display enabling control of playlist playback on another playback device and/or providing additional information concerning a video segment being played back on a playback device. A screen shot of a "second screen" user interface generated by a tablet computing device in accordance with an embodiment of the invention is illustrated in FIG. 22A. The user interface 2002 includes a listing 2202 of video segments that are related to a video segment identified in a personalized playlist that is being played back on another playback device. In the illustrated embodiment, title 2204, source 2208, release data 2208, text summaries 2206 and one or more images 2212 are provided to describe each video segment in the listing 2202. In other embodiments, any of a variety of information can be presented to a user via a user interface to provide information concerning a video segment being played back on another playback device and/or related video segments.

Figure 22B:
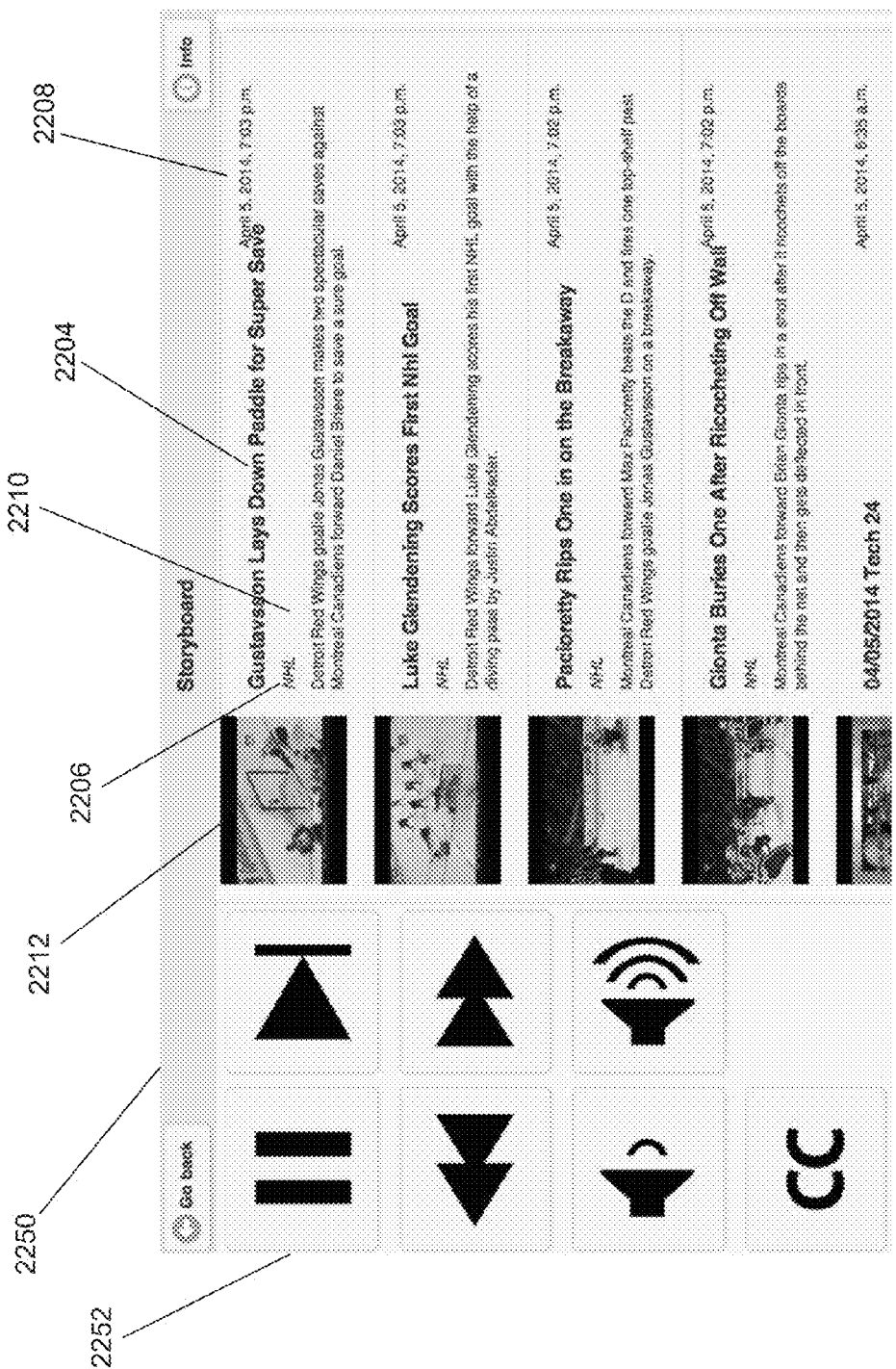
FIG. 22B conceptually illustrates a "second screen" user interface generated by a playback device that provides information concerning related video segments to a video segment being played back on another playback device and playback controls that can be utilized by a user to control playback of video segments on another playback device in accordance with an embodiment of the invention.

A screen shot of a "second screen" user interface generated by a tablet computing device enabling control of playback of video segments identified in a personalized playlist on another playback device in accordance with an embodiment of the invention is illustrated in FIG. 22B. The user interface 2252 includes information (2204-2012) describing related videos and a set of controls 2252 that can be utilized to control playback of video segments identified in a personalized playlist on another playback device.

Although specific user interfaces are illustrated in FIGS. 20A-22B, any of a variety of user interfaces can be generated using numerous techniques based upon personalized playlists obtained from playlist generation systems as appropriate to the requirements of specific applications in accordance with embodiments of the invention. For example, appropriate user interfaces can be generated for wearable computing devices including (but not limited to) augmented reality headsets, and smart watches. In a number of embodiments, user interactions with a user interface and the user's viewing history can be logged into a database to update and/or infer user preferences. In several embodiments, logged user interactions can be analyzed to refine the manner in which future recommendations are generated. Processes for collecting and analyzing information concerning user interactions with video segments in accordance with embodiments of the invention are discussed further below.

Analytics

The user interaction information that can be logged by a personalized playlist generation system in accordance with embodiments of the invention is typically only limited by the user interface generated by a playback device and the input modalities available to the playback device. An example of a user interaction log generated based upon user interactions with a user interface generated to enable playback of video segments identified within a personalized playlist in accordance with an embodiment of the invention is illustrated in FIG. 23. The log includes information concerning video segments played by the user, the duration of playback, reordering of videos and other interactions related to the playback experiences such as volume control and display of closed caption text. In a number of embodiments, information concerning playback of video segments can be utilized to obtain metrics indicative of user interest such as (but not limited to) the percentage of a video segment played back. The illustrated log also includes information concerning user mouse activity such as mouse over events. In other embodiments, any manner in which a user interacts with a user interface can be logged and/or a subset of interactions can be logged as appropriate to the needs of a specific playlist generation system including but not limited to user interactions indicating sentiment (e.g. "like", or "dislike"), sharing of content, skipping of content, rearranging and/or deleting video segments from a playlist and percentage of video segment watched. In a number of embodiments, playlist generation considers some or all user interactions contained within a log file and techniques including (but not limited to) linear regressions can be utilized to determine weighting parameters to apply to each category of user interactions considered during playlist generation. In other embodiments, any of a variety of techniques can be utilized to consider user history as appropriate to the requirements of specific applications.

Although specific processes are described above with respect to the logging of user interactions with user interfaces and the use of user interaction information to continuously update and improve personalized video playlist generation, any of a variety of techniques can be utilized to infer user preferences from user interactions and incorporate the user preferences in the generation of personalized playlists as appropriate to the requirements of specific applications in accordance with embodiments of the invention.

Generation of News Briefs

The ability to identify related video segments enables the generation of summaries of a number of related video segments or news briefs. Text data extracted from video segments in the form of closed caption, or subtitle data or through use of automatic speech recognition can be utilized to identify sentences that include keywords that are not present in related video segments. The portions of some or all of the related video segments in which the sentences containing the "unique" keywords occur can then be combined to provide a summary of the related video segments. In the context of news stories, the news brief can be constructed in time sequence order so that the news brief provides a sense of how a particular story evolved over time. In several embodiments, the video segments that are combined can be filtered based upon factors including (but not limited to) user preferences and/or proximity in time. In other embodiments, any of a variety of criteria can be utilized in the filtering and/or ordering of related video segments in the creation of a video summary sequence.

Figure 24:
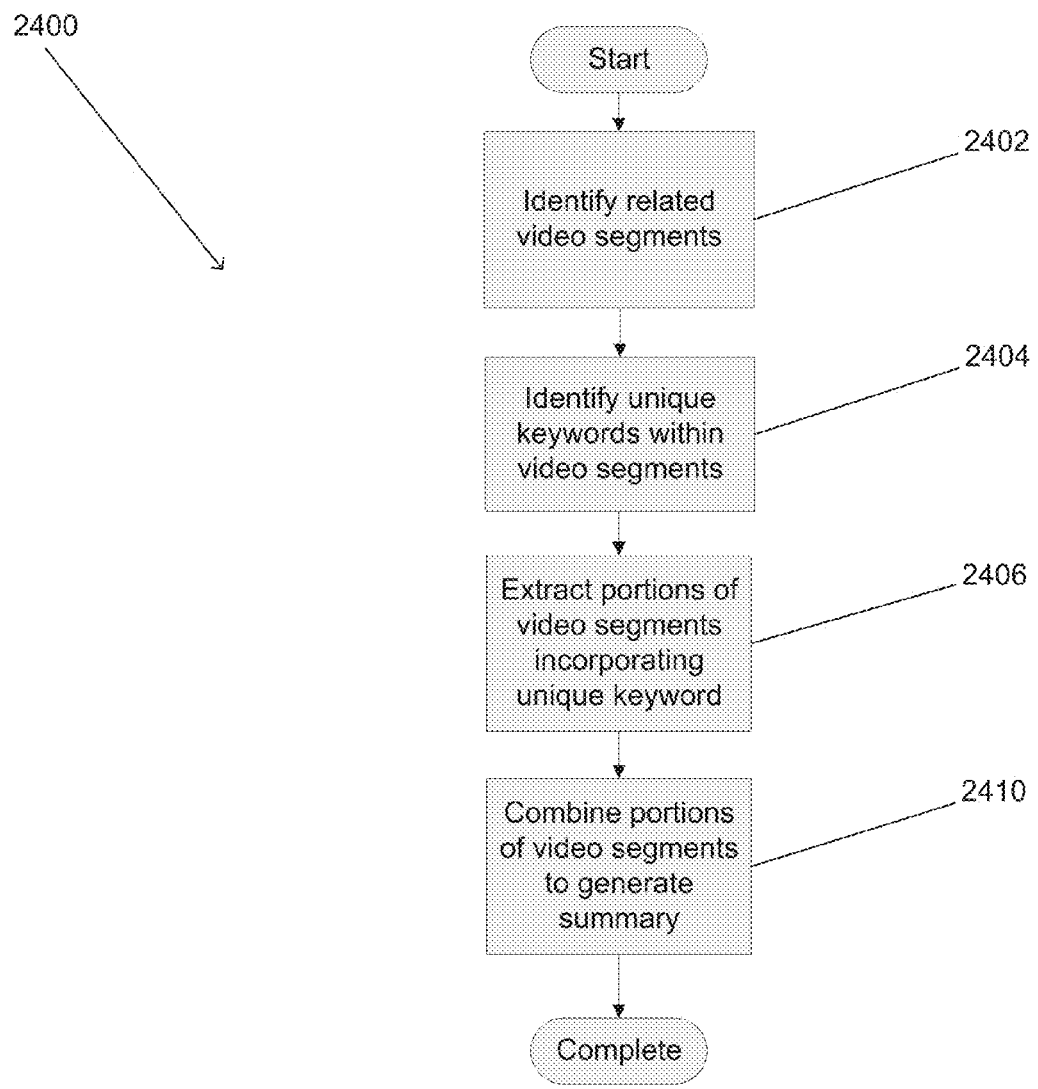
FIG. 24 is a flowchart illustrating a process for generating a summary of video segments by combining portions of video segments based upon the content of the portions of the video segments in accordance with an embodiment of the invention.

A process for generating a summary of related video segments in accordance with an embodiment of the invention is illustrated in FIG. 24. The process 2400 includes (2402) identifying related video segments and identifying (2404) unique keywords related to the video segments. In a number of embodiments, the unique keywords are extracted from text data contained within the video segment and/or through the use of automatic speech recognition. In this way, timestamps are associated with the keywords and a portion of the video segment such as (but not limited to) a sentence can be extracted (2406) from at least some of the related video segments. The extracted portions of the video segments can then be combined (2410) and encoded to create a video segment that is a summary of all of the related video segments. As noted above any of a variety of criteria can be utilized to determine the ordering of the portions of video segments and/or to filter the portions of video segments that are included in the video summary as appropriate to the requirements of specific applications in accordance with embodiments of the invention.

Video Search Engines

Figure 25:
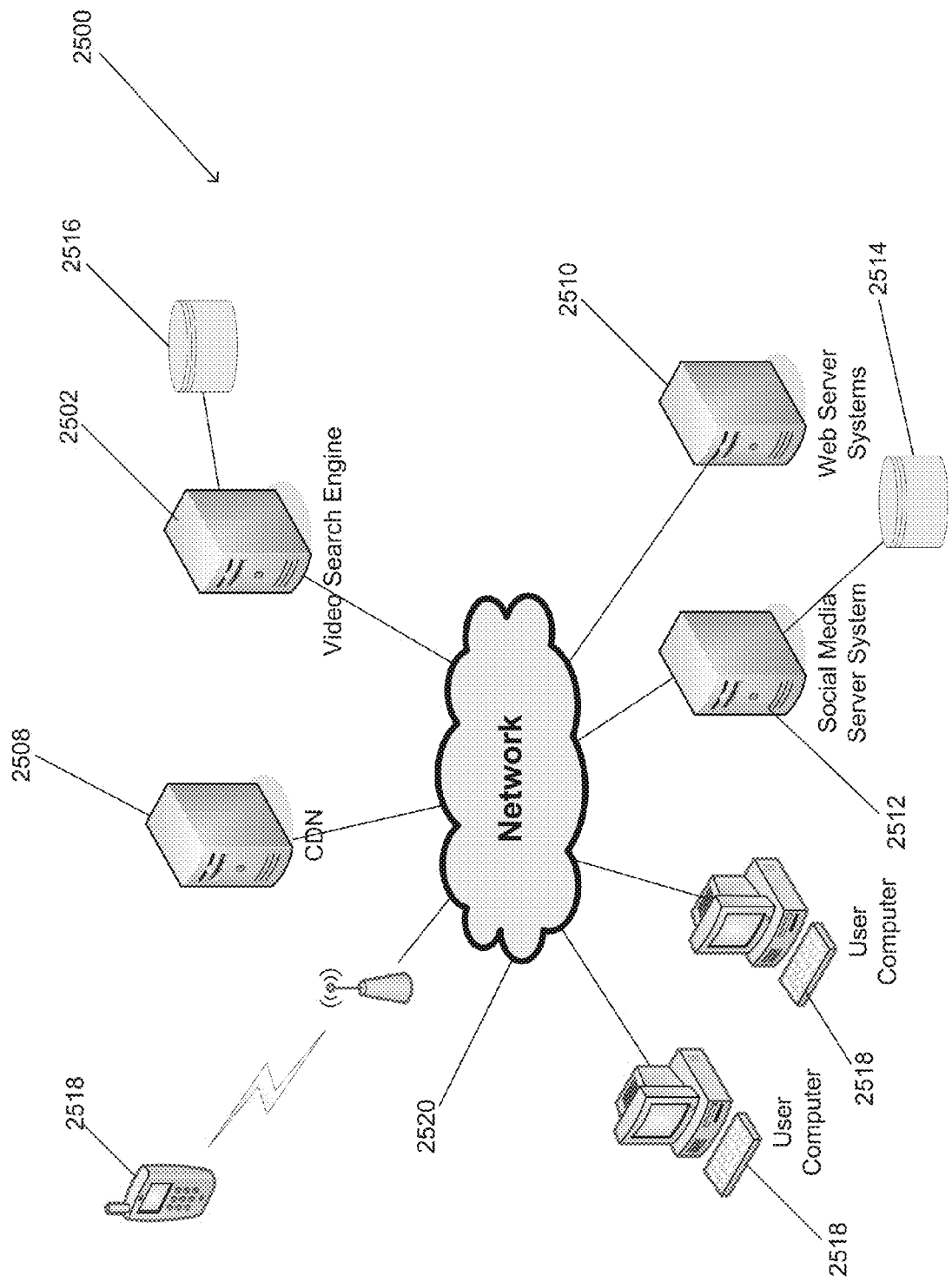
FIG. 25 is a system diagram that conceptually illustrates a multi-modal video search engine system in accordance with an embodiment of the invention.

The techniques described above for annotating video segments and utilizing the annotations to generate indexes relating keywords to video segments are not limited to the generation of personalized playlists, but can be utilized in a myriad of applications including the provision of a video search engine service. A system for accessing video segments utilizing a video search engine service in accordance with an embodiment of the invention is illustrated in FIG. 25. The system 2500 includes a video search engine server system 2502 that is configured to crawl various servers including (but not limited to) content distribution networks 2508, web servers 2510, and social media server systems 2512, 2514 to identify video segments. The video search engine server can annotate the identified video segments using keyword and/or image metadata extracted from the video segment and/or from additional data sources identified as relevant utilizing processes similar to those described above with reference to FIGS. 11-18. The metadata annotations can be stored in a database 2516 and utilized to generate an inverted index relating keywords to identified video segments. The video search engine server system 2502 can then utilize the inverted index to identify video segments in response to a search query received from a user device 2518 via a network connection 2520. In a number of embodiments, the techniques described above for identifying the presence of image portions within a frame of a video segment can be utilized to provide a video search service that can accept images and/or video sequences as search query inputs.

Figure 26:
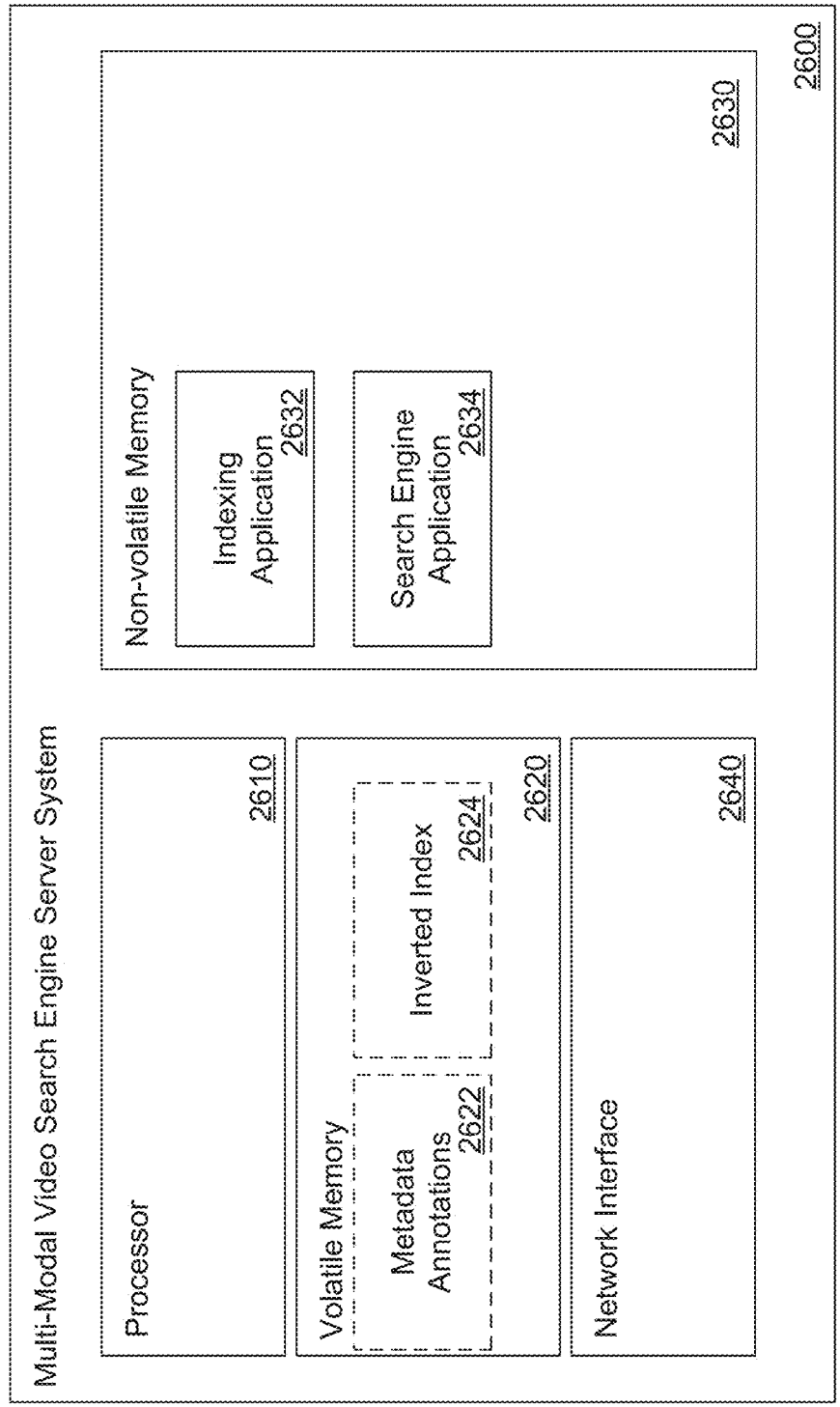
FIG. 26 is a system diagram that conceptually illustrates a multi-modal video search engine server system in accordance with an embodiment of the invention.

A multi-modal video search engine server system that can be utilized to index video segments and respond to search queries in accordance with an embodiment of the invention is illustrated in FIG. 26. The multi-modal video search engine server system 2600 includes a processor 2602 in communication with volatile memory 2620, non-volatile memory 2630, and a network interface 2640. In the illustrated embodiment, the non-volatile memory 2630 includes an indexing application 2632 that configures the processor 2610 to annotate video segments with metadata 2622 describing the content of video segment and generate an inverted index 2624 relating video segments to keywords. In several embodiments, the indexing application 2632 configures the processor 2610 to extract metadata from textual analysis of text data contained within a video segment and visual analysis of video data contained within the video segment. In a number of embodiments, the indexing application 2632 configures the processor 2610 to identify additional sources of relevant data that can be used to annotate the video segment based upon textual and visual comparisons of the video segment and sources of additional data. In other embodiments, any of a variety of techniques including (but not limited to) manual annotation of video segments can be utilized to associate metadata with individual video segments.

The non-volatile memory 2630 can also contain a search engine application 2634 that configures the processor 2610 to generate a user interface via which a user can provide a search query. As noted above, a search query can be in the form of a text string, an image, and/or a video sequence. The search engine application can utilize the inverted index to identify video segments relevant to text queries and can utilize the processes described above for locating image portions within frames of video to identify video segments relevant to images and/or video segments provided as search queries. In a number of embodiments, relevant video segments can also be found by comparing query images, or frames to images, or frames o video obtained from additional data sources known to be relevant to one or more video segments. In several embodiments, text data can be extracted from images and/or video sequences provided as search queries to the search engine application and a multi-modal search can be performed utilizing the extracted text and searches for portions of images within frames of indexed video segments. As can readily be appreciated, identification of a video segment can also be utilized to identify other relevant video segments using the processes for identifying relationships between video segments described above with reference to FIG. 18.

As can readily be appreciated, the functions of crawling, indexing, and responding to search queries can be distributed across a number of different servers in a video search engine server system. Furthermore, depending upon the number of video segments indexed, the size of the database(s) utilized to store the metadata annotations and/or the inverted index may be sufficiently large as to necessitate the splitting of the database table across multiple computing devices utilizing techniques that are well known in the provision of search engine services. Accordingly, although specific architectures for providing online video search engine services are described above with reference to FIGS. 25 and 26, any of a variety of system implementations can be utilized as appropriate to the requirements of specific applications in accordance with embodiments of the invention.

Figure 27:
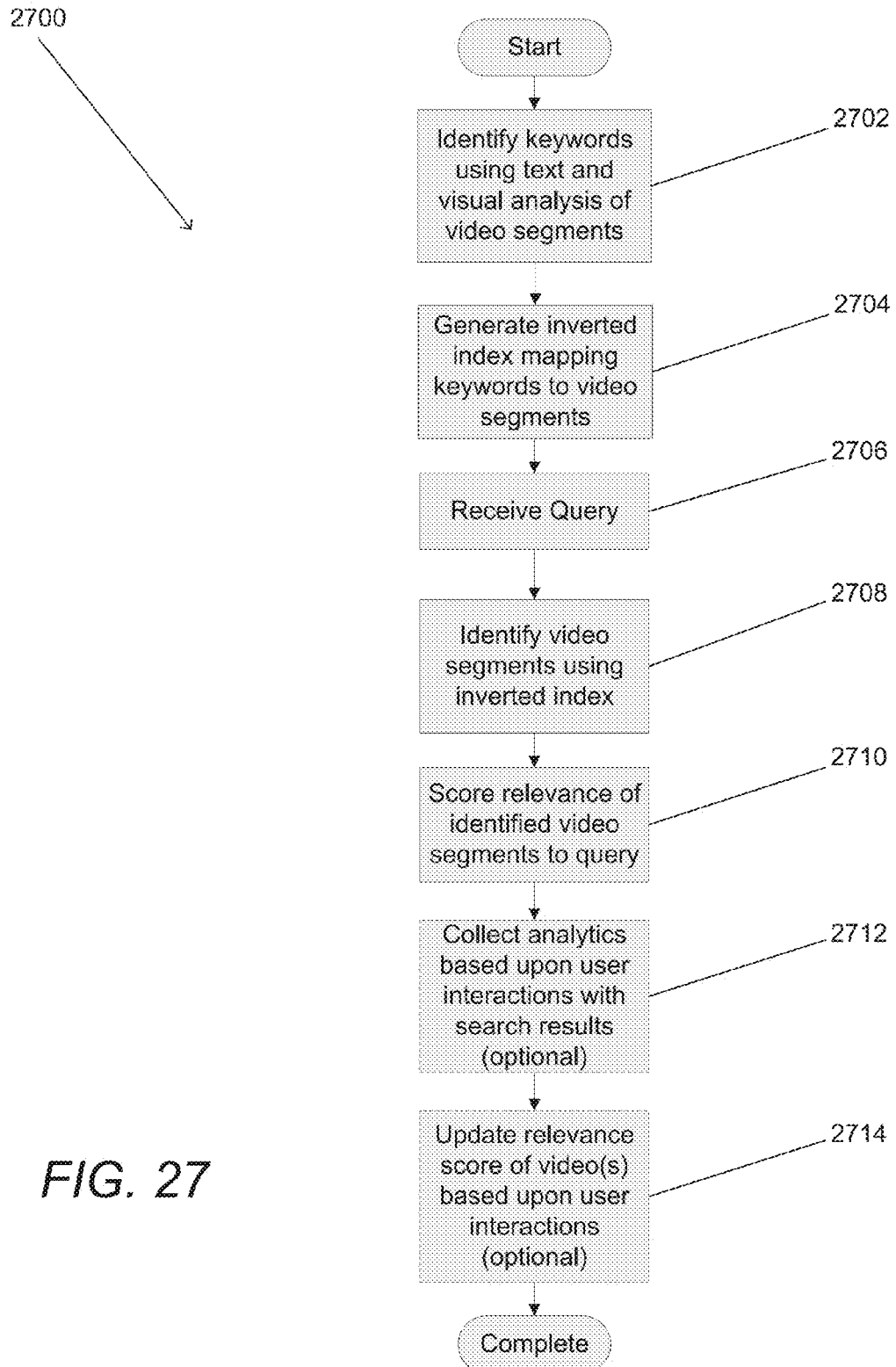
FIG. 27 is a flowchart illustrating a process for retrieving video segments relevant to a search query in accordance with an embodiment of the invention.

A process for generating multi-modal video search engine results in accordance with an embodiment of the invention is illustrated in FIG. 27. Typically, a set of video segments is provided and/or obtained by crawling video sources and the process 2700 identifies (2702) keywords related to the video segments using text and visual analysis of the video segments. The identified keywords can be utilized to generate (2704) an inverted index mapping keywords to video segments. When a search query is received (2706), keywords can be extracted from text, an image, and/or a video sequence provided as part of the search query and the keywords used to identify (2708) relevant videos from the inverted index. As noted above, a search can also be performed for one or more image portions within the frames of the indexed video segments. The relevancy of the identified video segments can be scored (2710) and search results including a listing of one or more video segments can be returned. In several embodiments, the process of annotating the video segments includes identifying additional sources of relevant data and links to the additional sources of relevant data and/or excerpts of relevant data can be returned with the search results.

In many embodiments, video segments are scored based upon a variety of factors including the number of related stories. Analysis of news story video segments reveals that related stories tend not to form fully connected graphs. Therefore, the number of related video segments (stories) can be indicative of the importance of the video segment. Time can also be an important measure of importance, the number of related video segments published within a predetermined time period can provide an even stronger indication of the relevance of a story to a particular query. In several embodiments, the relevance of a video segment to a search query can also be ranked based upon common keywords, frequency of common keywords, and/or common images. In several embodiments, a search query that includes an image, video sequence, and/or URL can be related to sources of additional data including (but not limited to) other video segments, and/or online articles. The sources of additional data can be utilized to perform keyword expansion and the expanded set of keywords utilized in scoring the relevance of a specific video segment to the search query.

In a number of embodiments, search result scores can be personalized based upon similar factors to those discussed above with respect to the generation of personalized video playlists. In this way, the most relevant search result for a specific user can be informed by factors including (but not limited to) a user's preferences with respect to content source, anchor people, and/or actors. In other embodiments, video search results can be scored and/or personalized in any of a variety of ways appropriate to the requirements of specific applications.

In several embodiments, analytics are collected (2712) concerning user interactions with video segments selected by users. In several embodiments, metrics including (but not limited to) percentage of playback duration watched can be utilized to infer information concerning the relevancy of the video segment to the search query and update (2714) relevance parameters associated with an indexed video by a video search engine service. In other embodiments, any of a variety of analytics can be collected and utilized to improve the performance of the search results in accordance with embodiments of the invention.

Although certain specific features and aspects of personalized video playlist generation systems, multi-modal video segmentation systems, and video search engine systems have been described herein, many additional modifications and variations would be apparent to those skilled in the art. For example, the features and aspects described herein may be implemented independently, cooperatively or alternatively without deviating from the spirit of the disclosure. It is therefore to be understood that the systems and methods disclosed herein may be practiced otherwise than as specifically described. Accordingly, the scope of the invention should be determined not by the described embodiments, but by the appended claims and their equivalents.

What is claimed is:

1. A multi-modal video data stream segmentation system, comprising:
    at least one processor; and
    memory containing a video segmentation application;
    wherein the video segmentation application configures at least one processor to perform a multi-modal segmentation of a video data stream including a sequence of frames of video, at least one audio track time synchronized with the sequence of frames of video, and closed caption textual data by:
        identifying visual segmentation cues within the sequence of frames of video;
        identifying audio segmentation cues within the at least one time synchronized audio track;
        performing automatic speech recognition on an audio track from the at least one audio track to generate audio track textual data that is time synchronized to the sequence of frames of video;
        identifying textual segmentation cues identified from the closed caption textual data;
        matching at least a portion of the closed caption textual data with the audio track textual data and time synchronizing the closed caption textual data to the sequence of frames of video data based upon the time synchronization of the matching audio track textual data;
        fuse the visual segmentation cues, the audio segmentation cues, and the textual segmentation cues to form a stream of segmentation cues time synchronized with the sequence of frames of video; and
        identify segmentation boundaries between frames of video within the sequence of frames of video using at least one classifier based upon the stream of segmentation cues.

2. The multi-modal video data stream segmentation system of claim 1, where at least one of the visual segmentation cues is from the group consisting of anchor frames, logo frames, and dark frames.

3. The multi-modal video data stream segmentation system of claim 1, wherein the visual segmentation cues include anchor frames.

4. The multi-modal video data stream segmentation system of claim 3, wherein the video segmentation application configures the at least one processor to detect anchor frames by:
    detecting frames in the sequence of frames of video containing a face using a face detector;
    determining color histograms for the detected faces;
    clustering the color histograms; and
    identifying anchor frames as frames that contain a face having a color histogram from within a dominant cluster of color histograms.

5. The multi-modal video data stream segmentation system of claim 1, wherein the visual segmentation cues include logo frames.

6. The multi-modal video data stream segmentation system of claim 5, wherein the video segmentation application configures the at least one processor to detect that a given frame from the sequence of frames of video is a logo frame by performing feature matching between a set of logo images and the given frame.

7. The multi-modal video data stream segmentation system of claim 1, wherein the video segmentation application configures the at least one processor to detect that a series of frames from the sequence of frames of video is a logo animation by performing feature matching between each of a series of logo animation frames and the corresponding frame in the series of frames.

8. The multi-modal video data stream segmentation system of claim 1, wherein the visual segmentation cues include dark frames.

9. The multi-modal video data stream segmentation system of claim 5, wherein the video segmentation application configures the at least one processor to detect that a given frame from the sequence of frames of video is a dark frame by detecting that the mean pixel intensity in at least one color channel of the frame is below a first threshold and the standard deviation of the pixel intensity in the at least one color channel is below a second threshold.

10. The multi-modal video data stream segmentation system of claim 1, wherein the audio segmentation cues include pauses in speech having a duration exceeding a threshold.

11. The multi-modal video data stream segmentation system of claim 1, wherein the textual segmentation cues include ">>>" markers within the closed caption textual data.

12. The multi-modal video data stream segmentation system of claim 1, wherein the textual segmentation cues include the presence of a predetermined transition phrase within the closed caption textual data.

13. The multi-modal video data stream segmentation system of claim 1, wherein:

a plurality of the segmentation cues in the stream of segmentation cues include confidence scores; and the video segmentation application configures the at least one processor to identify segmentation boundaries between frames of video within the sequence of frames of video using at least one classifier based upon the stream of time stamped segmentation cues and the confidence scores.

14. The multi-modal video data stream segmentation system of claim 1, wherein the at least one classifier is selected from the group consisting of a support vector machine, a neural-network classifier, and a decision tree classifier.

15. A method of segmenting a video data stream including a sequence of frames of video, at least one audio track time synchronized with the sequence of frames of video, and closed caption textual data, the method comprising:

identifying visual segmentation cues within the sequence of frames of video using a video data stream segmentation system;

identifying audio segmentation cues within the at least one audio track using the video data stream segmentation system;

performing automatic speech recognition on an audio track from the at least one audio track to generate audio track textual data that is time synchronized to the sequence of frames of video using the video data stream segmentation system;

identifying textual segmentation cues within the closed caption textual data using the video data stream segmentation system;

matching at least a portion of the closed caption textual data with the audio track textual data and time synchronizing the closed caption textual data to the sequence of frames of video data based upon the time synchronization of the matching audio track textual data using the video data stream segmentation system;

fusing the visual segmentation cues, the audio segmentation cues, and the textual segmentation cues to form a stream of segmentation cues that is time synchronized with the sequence of frames of video using the video data stream segmentation system; and identifying segmentation boundaries between frames of video within the sequence of frames of video using at least one classifier based upon the stream of segmentation cues using the video data stream segmentation system.

16. The method of claim 15, where at least one of the visual segmentation cues is from the group consisting of anchor frames, logo frames, and dark frames.

17. The method of claim 15, where the audio segmentation cues include pauses in speech having a duration exceeding a threshold.

18. The method of claim 15, wherein at least one of the textual segmentation cues within the closed caption textual data is from the group consisting of ">>>" markers and a predetermined transition phrase.

19. The method of claim 15, wherein:

a plurality of the segmentation cues in the stream of segmentation cues include confidence scores; and identifying segmentation boundaries between frames of video within the sequence of frames of video using at least one classifier based upon the stream of segmentation cues using the video data stream segmentation system comprises identifying segmentation boundaries between frames of video within the sequence of frames of video using at least one classifier based upon the stream of time stamped segmentation cues and the confidence scores.

20. The method of claim 15, wherein the at least one classifier is selected from the group consisting of a support vector machine, a neural-network classifier, and a decision tree classifier.

* * * * *